US007117259B1

(12) United States Patent
Rohwer

(10) Patent No.: US 7,117,259 B1
(45) Date of Patent: Oct. 3, 2006

(54) SERVER TIME WINDOW FOR MULTIPLE SELECTABLE SERVERS IN A GRAPHICAL USER INTERFACE

(75) Inventor: Cary Lane Rohwer, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 09/518,349

(22) Filed: Mar. 3, 2000

(51) Int. Cl.
*G06F 15/173* (2006.01)
*G06F 17/00* (2006.01)

(52) U.S. Cl. .................... 709/223; 715/736; 709/224
(58) Field of Classification Search ............. 709/223, 709/203, 217
See application file for complete search history.

(56) References Cited

U.S. PATENT DOCUMENTS

| 5,307,456 | A |   | 4/1994  | MacKay ............... 395/154 |
| 5,357,276 | A |   | 10/1994 | Banker et al. ............ 348/7 |
| 5,448,315 | A |   | 9/1995  | Soohoo ................ 348/722 |
| 5,461,415 | A | * | 10/1995 | Wolf et al. .............. 725/88 |
| 5,499,046 | A | * | 3/1996  | Schiller et al. ......... 725/146 |
| 5,550,966 | A |   | 8/1996  | Drake et al. ........... 395/154 |
| 5,550,982 | A | * | 8/1996  | Long et al. ............. 725/93 |
| 5,555,017 | A |   | 9/1996  | Landante et al. ........ 348/15 |
| 5,557,724 | A |   | 9/1996  | Sampat et al. ......... 395/157 |
| 5,564,005 | A |   | 10/1996 | Weber et al. ........... 395/161 |
| 5,598,208 | A |   | 1/1997  | McClintock ............ 348/159 |
| 5,629,732 | A | * | 5/1997  | Moskowitz et al. ...... 725/102 |
| 5,640,595 | A |   | 6/1997  | Baugher et al. ......... 395/830 |
| 5,729,741 | A |   | 3/1998  | Liaguno et al. ......... 395/615 |
| 5,745,126 | A |   | 4/1998  | Jain et al. ............. 345/952 |
| 5,748,499 | A |   | 5/1998  | Trueblood ........... 364/551.01 |

(Continued)

FOREIGN PATENT DOCUMENTS

EP  0 776 107 A2  5/1997
WO  WO 99/05821  2/1999

OTHER PUBLICATIONS

J. Burghardt, "Das Sony-News-System," Nov. 1996, pp. 641-646, *Fernseh Und Kino-Technik*, vol. 50.

*Primary Examiner*—Glenton B. Burgess
*Assistant Examiner*—Aaron Strange
(74) *Attorney, Agent, or Firm*—Sughrue Mion, PLLC

(57) ABSTRACT

A process is provided for managing media data in a network system. The network system includes: an administrator terminal having a display unit for displaying graphical information, and an input/output unit for receiving user input; and at least one media server communicatively coupled to the administrator terminal via a network. Each of the media servers is capable of accessing at least one corresponding memory device for storing media data, and is operative to perform operations associated with selected portions of the media data. The process provides a centralized user interface for scheduling and coordinating execution of operations performed by selected ones of the media servers. The process begins with a step of displaying a graphical user interface including a plurality of interface components on the display unit of the administrator terminal, the components enabling a user of the administrator terminal to define operations to be performed by selected ones of the media servers, the components including a server selection interface component enabling the user to select one of the media servers. User input is received via the input/output unit. The user input includes: server identification information indicative of a selected server for performing an operation associated with a selected portion of media data, and operation information specifying an operation to be performed by the selected media server on a selected portion of media data. Further steps of the process include: accessing the selected media server; and displaying graphical information indicative of a current local time at the selected media server.

53 Claims, 51 Drawing Sheets

U.S. PATENT DOCUMENTS

| | | | |
|---|---|---|---|
| 5,760,767 A | 6/1998 | Shore et al. | 345/328 |
| 5,761,417 A * | 6/1998 | Henley et al. | 709/231 |
| 5,764,901 A | 6/1998 | Skarbo et al. | 395/200.34 |
| 5,767,894 A | 6/1998 | Fuller et al. | 348/8 |
| 5,774,664 A | 6/1998 | Hidary et al. | 395/200.48 |
| 5,778,187 A * | 7/1998 | Monteiro et al. | 709/231 |
| 5,786,814 A | 7/1998 | Moran et al. | 345/328 |
| 5,795,228 A | 8/1998 | Trumbull et al. | 463/42 |
| 5,805,821 A | 9/1998 | Saxena et al. | 395/200.61 |
| 5,845,257 A * | 12/1998 | Fu et al. | 705/8 |
| 5,848,291 A | 12/1998 | Milne et al. | 395/806 |
| 5,861,906 A * | 1/1999 | Dunn et al. | 725/87 |
| 5,864,682 A | 1/1999 | Porter et al. | 395/200.77 |
| 5,875,304 A | 2/1999 | Winter et al. | 395/200.61 |
| 5,880,792 A | 3/1999 | Ward et al. | 348/722 |
| 5,884,039 A | 3/1999 | Ludwig et al. | 395/200.57 |
| 5,892,535 A | 4/1999 | Allen et al. | 348/9 |
| 5,893,053 A | 4/1999 | Trueblood | 702/187 |
| 5,935,206 A * | 8/1999 | Dixon et al. | 709/219 |
| 6,222,530 B1 * | 4/2001 | Sequeira | 707/500.1 |
| 6,225,993 B1 * | 5/2001 | Lindblad et al. | 345/716 |
| 6,332,163 B1 * | 12/2001 | Bowman-Amuah | 709/231 |
| 6,353,848 B1 * | 3/2002 | Morris | 709/203 |

* cited by examiner

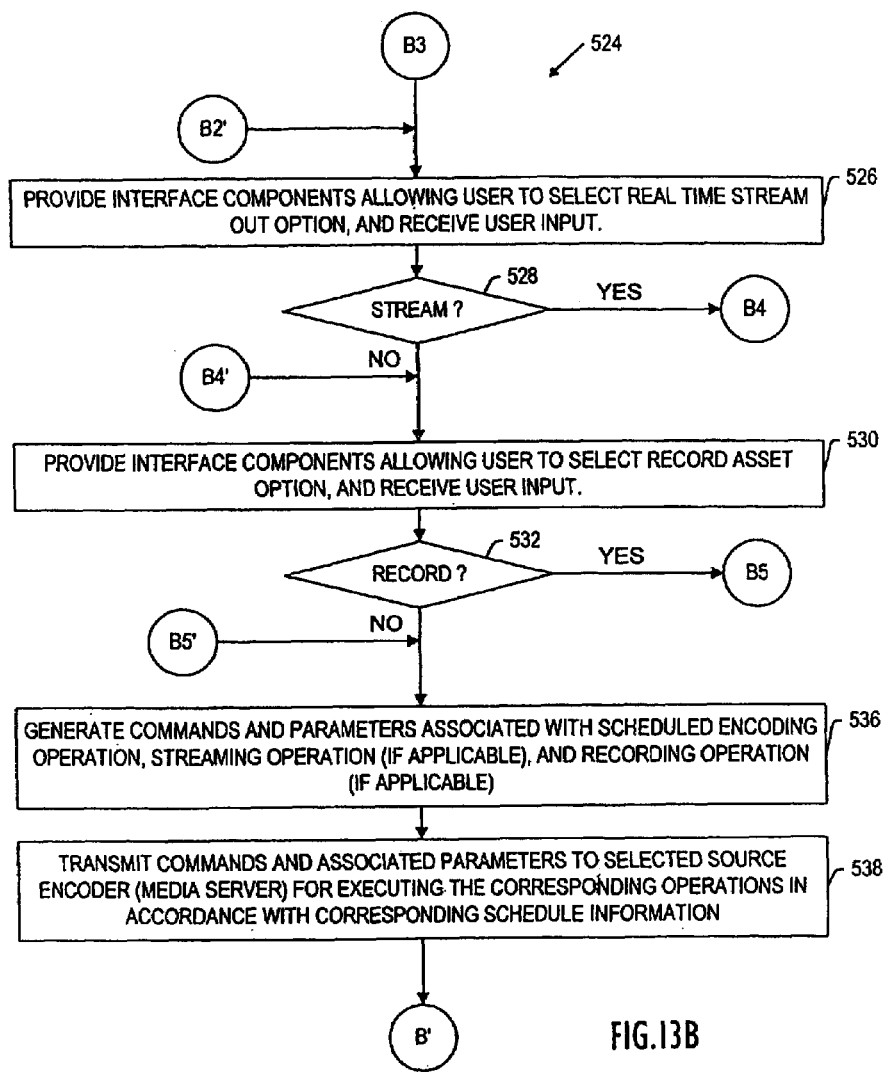

SERVER TIME WINDOW FOR MULTIPLE SELECTABLE SERVERS IN A GRAPHICAL USER INTERFACE

BACKGROUND OF THE INVENTION

1. Field of the Invention

The present invention relates generally to a method and apparatus for managing media data in computer network systems. More specifically, the present invention relates to a process and apparatus providing a centralized graphical user interface for managing media assets in a network by specifying and scheduling operations to be performed by a plurality of media servers in a computer network.

2. Description of the Prior Art

A media server is a network server system which is operative to perform various operations on media data files in a computer network system. Digital media files may include video data, audio data, text data, and graphical data. Typically, a media server is operative to perform media operations including: delete operations for deleting media assets from locations in a network; copy operations for copying media assets from source locations to destination locations in a network; multicasting operations for streaming media assets from the media server to clients via the network; and encoding operations for encoding media data, received by the media server from multimedia equipment such as a video camera, in order to create media assets.

For purposes of the present application, a media asset is defined to include parsed media data which is configured to be streamed from a media server to one or more clients in a particular type of network. One example of a media server is IBM's VideoCharger™ server and media streamer which combines functions of digital computing and the video broadcast industry into a versatile, cost-effective system for high-quality storage and delivery of multimedia content. Details of the VideoCharger™ product are disclosed in U.S. patent application Ser. No. 08/961,704, entitled "Scaleable Network Transparent Access Framework for Multimedia Serving," filed on or about Oct. 31, 1997, and U.S. patent application Ser. No. 08/961,706, entitled "Seamless Playlist," filed on or about Oct. 31, 1997, each of which is hereby incorporated.

The VideoCharger™ server, provided by International Business Machines Corp., provides one example of a media server. The VideoCharger™ server provides for the delivery of continuous time media data (i.e. audio and/or video data) to Internet or Intranet connected clients. The video is "streamed", (i.e. delivered in real-time) and does not require that the file be downloaded or saved before being played by the client software. In video parlance, the video is "pushed" by the server over the network to the client. This approach is different from most file servers where the data is "pulled" by the client issuing successive "reads" to the server. The "push" architecture is similar to a broadcast environment where a video stream is started by a play command and will continue until stopped. U.S. Pat. No. 5,918,020, issued to Blackard et al. on Jun. 29, 1999 describes a data processing system and a method for implementing a push, or streaming, model for communicating time sensitive encoded data, such as video and audio data, in a communication network. In addition to supporting industry standard file formats for audio and video, the VideoCharger media server supports the popular Internet and World Wide Web (WWW) protocols including IP and Hyper Text Transport Protocol (HTTP). This allows the product to be used with Industry standard applications like HTML Web Browsers. It also allows the product to be used on a wide variety of network types including LANs (Local Area Networks such as Ethernet, Token Ring, FDDI), WANs (Wide Area Networks such as T1, E1, T3, E3) and ATM (Asynchronous Transfer Mode).

An IP multicast feature of the VideoCharger™ media server allows it to be used as a broadcast type server in the Internet environment. This allows a single audio or video stream to be sent to multiple clients, thereby reducing the bandwidth requirements on the network. In addition, VideoCharger on Windows NT offers embedded encoder support. This allows an MPEG encoder to be installed on the server and have VideoCharger directly control the encoder for functions such as real-time IP Multicast and real-time IP Multicast with live recording of the same stream. This is a very efficient yet powerful method of providing a broadcast of a live event while recording it for later re-broadcast with minimal network load. IBM also provides a VideoCharger Server for AIX.

The functions and capabilities of media servers are very useful to archivists, film/video production groups, educational institutions, research groups, medical technologists, advertising and creative agencies, print and Web publishers, and marketing communications agencies. In accordance with prior art asset management and scheduling methods, an administrator of a media server having access rights thereto may configure the media server to execute specified media operations to be performed by that server in accordance with a specified schedule.

In accordance with one prior art asset management and scheduling method, a administrator may configure a particular media server to perform particular types of media operations by downloading hypertext markup language (HTML) Web pages via corresponding uniform resource locators (URL's) from the particular media server, each of the HTML Web pages providing an interface for scheduling a corresponding one of the particular types of media operations to be executed by the particular media server. A copy/delete HTML Web page provides rudimentary interface functions allowing the administrator to define and schedule copy operations and delete operations to be performed by the particular media server. The copy/delete HTML Web page includes: prompts and active areas enabling the user to specify a copy operation or a delete operation; and text boxes enabling the administrator to enter a path to a selected media file which the subject of the copy or delete operation. An encoding HTML Web page provides rudimentary interface functions allowing the administrator to activate an encoding operation to be performed by the particular media server. The encoding HTML Web page includes text boxes enabling the administrator to enter: a path and a selected file name for the asset to be encoded; and a duration value indicating a duration for the encoding operation. A problem associated with this prior art method of remotely activating an encoding operation is that the administrator is not provided with any view of the scene to be encoded. A multicasting HTML Web page provides rudimentary interface functions allowing the administrator to schedule a multicasting operation to be performed by the particular media server. The multicasting HTML Web page includes text boxes enabling the administrator to enter: a path indicating a selected asset to be multicasted; one internet protocol (IP) address and port number for multicasting the selected asset; a scheduled start date and start time for executing the multicasting operation; and a duration value indicating a time duration for the multicasting operation.

One problem associated with the above described prior method of configuring media servers to manage media assets and schedule media operations is that there are no mechanisms which prevent the administrator from specifying invalid options, such as specifying an invalid path or an invalid file name for a selected asset. For example, in the course of defining a copy operation using the copy HTML Web page, if the administrator specifies an incorrect path for an asset to be copied, then the copy operation will not be successfully executed at the scheduled time. Also, the prior art interface consisting of the HTML Web pages described above provides no means for notifying the administrator as to whether or not the operation is successfully completed upon passing of the scheduled time for executing the operation. Furthermore, a failure of a particular copy operation would result in a failure of a subsequently scheduled media operation which is dependent upon the particular copy operation, as further explained below.

For a variety of multimedia network applications, it is important to be able to coordinate the scheduling of media operations to be performed by a plurality of media servers. As an example, an administrator of an educational institution such as a college or university may desire to configure one or more media servers to create, store, manage, and stream media assets. In this example, the media assets may include video data and audio data comprising a lecture given by a professor in a class room. The administrator may configure a first server, that is an encoding server, to encode media data received from multimedia equipment, such as a video camera, at a scheduled time. Alternatively, the administrator may manually control the encoding media server using a local programming interface residing at the server site to start, stop, and pause encoding of the media data generated by the camera while viewing a local screen which displays the lecture being recorded. However, there is no means provided in the prior art for remotely controlling the encoding of media assets by a media server. After the administrator encodes a new asset at an encoding media server, or schedules an encoding operation to be performed at the encoding server, the administrator may configure the encoding server to execute further operations including: storing the encoded asset in a storage device; and multicasting the encoded asset to a selected group of clients either in real time or at a later time in accordance with a programmed schedule. Further, the administrator may configure the encoding server to transfer the encoded asset to a second media server via a network.

In the above described prior art asset management and scheduling method, in order to coordinate the scheduling of media operations at the first and second servers, the administrator must access and configure each server separately. As the number of scheduled operations increases, and the number of configured media servers increases, it becomes more and more difficult for the administrator to coordinate the scheduling of the operations between the multiple servers because there is no centralized location provided in the prior art for automatically logging those operations which are specified and scheduled by the administrator to be executed at the multiple servers. A log of operations scheduled to be executed by each particular media server is stored in a log file maintained by the operating system of the particular media server (e.g., a Windows NT log file, or an AIX log file). However, the administrator must access the log file of each particular server separately in order to review operations to be performed by the particular media server.

In one particular scenario, an administrator may wish to configure a first server to: encode media data to create a new asset; and then copy the new asset at a later scheduled time to a second server. Provided that the administrator has access to the second server, the administrator may: configure the second server to multicast the encoded asset to a selected group of clients in accordance with a programmed schedule; and configure the second server to subsequently remove the encoded asset from the catalog of the second server so that the new asset cannot be accessed after a certain period of time. The administrator may wish to configure the two servers to perform the steps of creating a new asset at the first media server, transferring the new asset to the second server, and multicasting it from the second server in order to achieve the goal of minimizing network congestion problems which would arise in streaming directly from the first encoding server to the selected clients. Note that the success of the multicasting operation scheduled for execution by the second server is dependent upon the success of the copy operation scheduled for execution by the first server. As mentioned above, a failure of the copy operation would result in a failure of the subsequently scheduled multicasting operation which is dependent upon the copy operation. Because there is no means for notifying the administrator as to whether or not the copy operation is successfully completed, the administrator also would have no warning that the dependent multicasting operation would inevitably fail as well.

In the above described prior art asset management and scheduling method, in order to coordinate the scheduling of media operations at the first and second servers, the administrator could separately access the log files of the first and second servers, and review each. However, this process is very cumbersome. If the administrator needs to coordinate and schedule events at a multiplicity of media servers, which may be residing in different time zones, the coordination and management of the scheduled events at the multiplicity of servers becomes very difficult.

Therefore, one problem with the prior art asset management and scheduling processes is that an administrator of a plurality of media servers is required to interface separately with each media server in order to read the log files for the purposes of coordinating scheduled operations at each of the media servers. Another problem is that the administrator is prone to specify invalid paths for assets to be operated upon thereby resulting failure of media operations. A further problem is that there is no notification system for notifying the administrator in the event of success or failure of the scheduled operations.

SUMMARY OF THE INVENTION

It is an object of the present invention to provide a graphical user interface process providing a centralized interface for remotely managing media asset scheduling media operations to be performed by a plurality of media servers in a computer network system, the media operations including deleting media assets from a source location in a network, copying media assets from selected source locations to selected destination locations; multicasting operations for streaming media assets from selected media servers to selected clients via the network; and encoding operations for encoding media assets.

Briefly, a presently preferred embodiment of the present invention provides a process for managing media data in a network system. The network system includes: an administrator terminal having a display unit for displaying graphical information, and an input/output unit for receiving user input; and at least one media server communicatively coupled to the administrator terminal via a network. Each of the media servers is capable of accessing at least one corresponding memory device for storing media data, and is operative to perform operations associated with selected portions of the media data.

The process of the present invention provides a centralized user interface for scheduling and coordinating execution of operations performed by selected ones of the media servers. The process begins with a step of displaying a graphical user interface including a plurality of interface components on the display unit of the administrator terminal, the components enabling a user of the administrator terminal to define operations to be performed by selected ones of the media servers, the components including a server selection interface component enabling the user to select one of the media servers. User input is received via the input/output unit of the administrator terminal. The user input includes: server identification information indicative of a selected media server for performing an operation associated with a selected portion of media data, and operation information specifying an operation to be performed by the selected media server on a selected portion of media data. Further steps of the process include: accessing the selected media server; and displaying graphical information indicative of a current local time at the selected media server.

The server selection interface component includes a source selection interface component enabling the user to select a source location by browsing a list of available locations including predetermined mapped ones of the media servers and predetermined mapped ones of the memory devices. If the selected source location is a memory device, then the selected server is a media server corresponding with the selected memory device.

In an embodiment wherein the user input further includes schedule information specifying a schedule for performing the specified operation, the process further comprises the steps of: generating commands and associated parameters based on the operation information and the schedule information, the commands and associated parameters for instructing the selected media server to execute the specified operation in accordance with the specified schedule; and transmitting the commands and the associated parameters to the selected media server via the network.

The administrator terminal also includes a processing unit, and a browser application executed by the processing unit. The process is initiated by performing the steps of: transmitting an applet to the administrator terminal via the network; and executing the applet over the processing unit of the administrator terminal; whereby the graphical user interface is displayed within a browser window generated by the browser application on the display unit.

The operations include: delete operations for removing media data from a catalog of a predetermined mapped one of the media servers; copy operations for copying portions of media data from selected source ones of the locations to selected destination ones of the locations; multicasting operations for streaming portions of media data from selected media servers to selected end user terminals via the network; and encoding operations for encoding media data received by selected media servers.

An important advantage of the present invention is that it provides centralized interface provides for managing and scheduling the execution of media operations by a plurality of media servers in different locations.

Another important advantage of the present invention is that the displayed local time at the selected media server is very useful because the user may be residing in a different time zone from the time zone which the selected server resides in. Also, the displayed local time at the selected media server helps the user to coordinate and schedule operations at a plurality of different media servers which may be residing in different time zones.

The foregoing and other objects, features, and advantages of the present invention will be apparent from the following detailed description of the preferred embodiment which makes reference to the several figures of the drawing.

IN THE DRAWINGS

FIG. 1 is a block diagram illustrating a networked computer system including a plurality of network locations for storing and operating on media data, and an administrator terminal communicatively coupled with the locations via a network, the administrator terminal providing an asset management and scheduling graphical user interface (GUI) process in accordance with the present invention for remotely managing operations including generating, copying, and streaming media data at and between selected ones of the locations;

FIGS. 13A and 13B are flow diagrams illustrating a sub-process of encoding and optionally recording media data in accordance with the present invention using the GUI screen of FIG. 12;

DETAILED DESCRIPTION OF THE PREFERRED EMBODIMENTS

Figure 1:
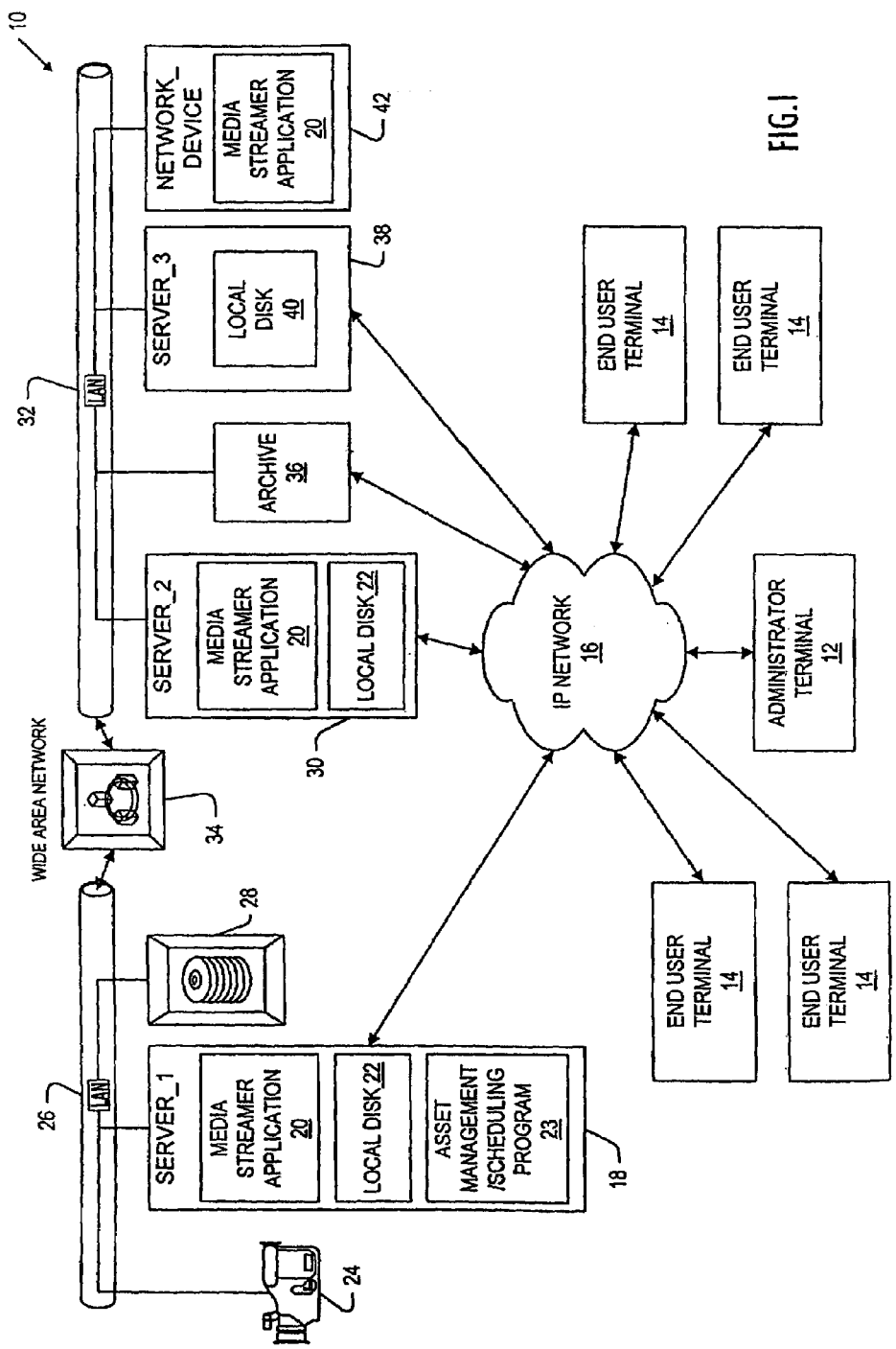

FIG. 1 shows a block diagram illustrating an exemplary networked computer system at including an administrator terminal 12 configured in accordance with the present invention for implementing an asset management and scheduling GUI process for remotely managing and scheduling media operations including generating, copying, and multicasting media assets at and between a plurality of locations in the system 10 as further explained below.

The depicted system 10 also includes: a plurality of end user terminals 14 communicatively coupled with the administrator terminal 12 via an Internet protocol (IP) network 16 such as the public Internet or a private internet; a first media server 18 designated SERVER_1 communicatively coupled with the administrator terminal 12 via the IP network, the first media server having a media streamer application 20 which is executed by the server, an asset management and scheduling program 23 in accordance with the present invention which is executed by the server, and a local disk 22 providing memory storage for media data including audio data, video data, and text; a video camera 24 for generating media data having video data and audio data, the camera 24 being communicatively coupled with the first media server 18 via a first local area network (LAN) 26; a remote disk 28 communicatively coupled with the first media server 18 via the first LAN 26; a second media server 30 designated SERVER_2 communicatively coupled with the administrator terminal 12 via the IP network, the second server having a media streamer application 20 which is executed by the server, and a local disk 22 for storing media data; an archive data storage unit 36 communicatively coupled with SERVER_2 via a second LAN 32 which is communicatively coupled with the first LAN 26 via a wide area network (WAN) 34; a server 38 designated SERVER_3 communicatively coupled with the administrator terminal 12 via the IP network, and also being coupled with the second LAN 32, the third server having a local disk 40 for storing media data; and a network device 42 having a media streamer application 20 which is executed by the network device 42, the device 42 being communicatively coupled with SERVER_2 via the second LAN 32.

Each of the media streamer applications 20 is operative to encode and parse portions of media data to create a media asset, and is also operative to stream assets to selected groups of the plurality of end user terminals 14. The parsing of the media data includes adding headers and attributes to packets of the media data in order to allow for the detection of failures in staging, that is copying, of media assets from one media server to another media server via the IP network 16 or via the WAN 34. Each of the media streamer applications 20 is executed by a corresponding processing unit (not shown) of the corresponding one of the media servers 18 and 30, and the network device 42.

As further explained below, the end user terminals 14 include plug-in applications which, when executed along with a viewing application such as a browser, are operative to decode and play the assets in real time.

In accordance with the present invention, an asset management and scheduling graphical user interface (GUI) process is provided at the administrator terminal 12 as described in detail below. In general, the asset management and scheduling GUI process allows for a user of the administrator terminal 12 to remotely define and schedule the execution of a variety of operations on media data at selected locations (e.g., selected servers, archives, and networked devices) in the networked computer system 10.

In accordance with the asset management and scheduling GUI process, interface components are displayed on a display unit of the administrator terminal 12, the components prompting a user of the administrator terminal to define and schedule operations to be performed by selected ones of the media servers on corresponding selected assets. In response to the interface components, user input is received via an input/output of the administrator terminal 12. The user input generally includes: operation information specifying details of a selected event, or operation, to be performed by a selected one of the media servers 18 and 30 on a selected asset which is accessible by the selected media server; and schedule information associated with the operation information, the schedule information indicating an associated schedule for performing the selected operation. In accordance with the asset management and scheduling GUI process, commands and associated parameters are generated based on the operation information and the associated schedule information. The commands and associated parameters are transmitted to the corresponding selected one of the media servers 18 and 30 for execution of the specified operation in accordance with the associated schedule.

Operations which may be remotely managed and scheduled by the asset management and scheduling GUI include: remotely controlling encoding operations for encoding media assets at selected locations in the system 10 by manual remote control, or by scheduling one or more time delayed encoding operations; streaming assets from a selected source media streamer to a selected group of destination end users; "copying" media data from a selected source location in the system 10 setting to a selected destination location; and "deleting" media assets from selected locations.

The media streamer applications 20 are operative to execute several different types of copy actions for copying media assets-including: "adding" media files or assets from a local disk 22 to a "catalog" of a corresponding media streamer application 20, the catalog being a list of files and/or assets which the media streamer application may access; "loading" media files or assets from the remote disk 28 to the catalog of the corresponding media streamer application 20 at SERVER_1; and "staging" media assets from a selected-source one of the media servers 18 and 30 to a selected destination one of the media servers. In the preferred embodiment, in order to allow for detection of a failure in a staging operation, only media assets which include parsed media data, as opposed to media files which include unparsed media data, are staged via the IP network 16 or via the WAN 34.

The "delete" operations include removing selected assets from the catalog of a selected media streamer application 20 at the selected media server. Media files often comprise intellectual property, and therefore, it is desirable to be able to remove asset from the catalogs of media servers so that the assets cannot be retrieved by persons who are not authorized to do so.

In a scheduled encoding mode, the asset management and scheduling GUI provides for defining and scheduling the activation of the camera 24 in accordance with a user defined schedule to generate video data which is encoded by the media streamer application 20 at SERVER_1. The user may schedule a later date and time for activating the video camera and the encoding process; specify a location to which the encoded data is to be recorded, or stored; specify that the media data is to be streamed out in real time to selected destination locations; and specify that e-mail messages are to be sent to selected end users upon success or failure of the streaming. In a manual encoding mode, the user of the asset management and scheduling GUI controls the encoding process at SERVER_1 while viewing the scene to be encoded from the administrator terminal 12.

In the preferred embodiment of the present invention, the asset management and scheduling GUI process is implemented as a Java applet executed at the administrator terminal 12, the applet being received from the asset management and scheduling program 23 at SERVER_1. In an alternative embodiment of the present invention, the asset management and scheduling GUI process is implemented as a Java application executed at the administrator terminal 12, the application being implemented by executing computer readable instructions stored at the administrator terminal 12. In yet another embodiment of the present invention, the asset management and scheduling GUI process is implemented by logic shared between the administrator terminal 12 and SERVER_1 so as to maximize efficiency.

As further explained below, each of the plurality of end user terminals 14 includes a browser application running thereon for viewing assets including media data (e.g., an MPEG video clip) streamed to the end user terminal from corresponding ones of the media servers 18 and 30. In one embodiment of the present invention, each of the end user terminals 14 has a media player stored therein, and the browser running on the end user terminal loads the media player in order to view the media data. The media player includes a decoder for decoding the media data. In another embodiment, the browsers running on the end user terminals 14 natively understand the encoding format of the asset streamed thereto and a plug-in is not required.

Figure 2:
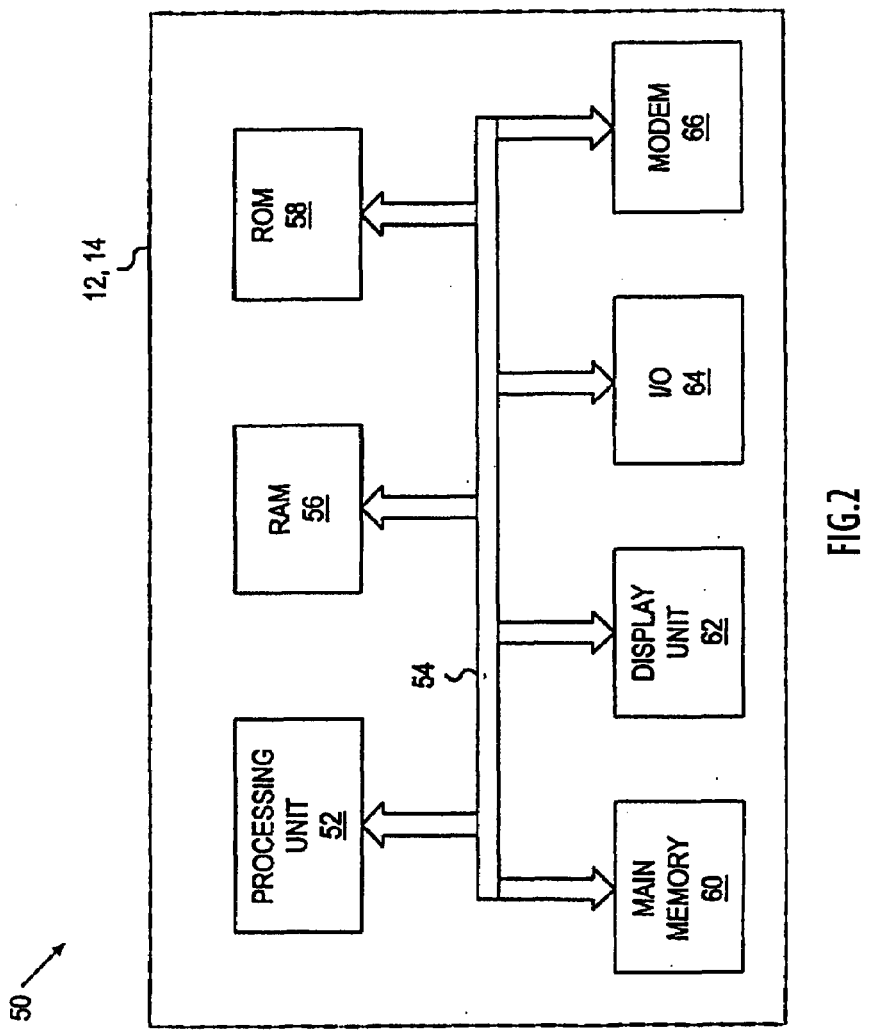
FIG. 2 is a block diagram illustrating an exemplary computer system used to implement the administrator terminal of FIG. 1.

FIG. 2 shows a block diagram illustrating an exemplary general purpose computer system at 50 which may be used to implement each of the administrator terminal 12, the end user terminals 14, the media servers 18 and 30, and the network device 42 (FIG. 1). The computer system 50 includes: a processing unit 52 communicatively coupled to a bus 54; a random access memory (RAM) unit 56 communicatively coupled to the processing unit via the bus; a read only memory (ROM) unit 58 communicatively coupled to the processing unit via the bus; a main memory unit 60, such as a hard disk or other memory storage device, communicatively coupled to the processing unit via the bus; a display unit 62, such as a cathode ray tube or flat panel display, communicatively coupled to the bus for displaying graphical information; an input/output unit (I/O unit) 64, such as a keyboard and mouse, coupled with the processing unit via the bus, and providing an interface for a user to provide input; and a modem 66 coupled with the bus, and providing communication with remote devices via a computer network such as the IP network (FIG. 1).

In the preferred embodiment of the present invention, the main memory unit 60 (FIG. 2) of the administrator terminal 12 (FIG. 1) stores computer readable instructions for implementing a viewing application supporting a Java interpreter (e.g., Netscape Navigator, Microsoft Explorer, or Sun's HotJava browser). The Java interpreter is operative to execute compiled Java byte code, also called J-code. In the preferred embodiment of the present invention, the asset management and scheduling GUI process is implemented as a Java applet which is provided to the administrator terminal 12 (FIG. 1) via the IP network 16 (FIG. 1) as executable content inside of a Web document.

Also, in the preferred embodiment of the present invention, the main memory unit 60 (FIG. 2) of each of the end user terminals 14 (FIG. 1) stores computer readable instructions for implementing a viewing application such as a Web browser (e.g., Netscape Navigator, Microsoft Explorer), and computer readable instructions for implementing a plug-in. Further, in the preferred embodiment of the present invention, the main memory unit 60 (FIG. 2) of each of the media servers 18 and 30 (FIG. 1) stores computer readable instructions for implementing the media streamer application 20 (FIG. 1), and instructions for implementing the asset managing and scheduling program 23 (FIG. 1).

With reference back to FIG. 1, initializing steps of the asset management and scheduling process of the present invention include sending a request for a predetermined Web page from the Web browser running on the administrator terminal 12 to the asset management and scheduling program 23 at SERVER_1 via the IP network 16. The management and scheduling program 23 packages the predetermined Web page, along with an asset management and scheduling GUI process applet in accordance with the present invention, for transmission to the Web browser running on the administrator terminal 12. The asset management and scheduling applet is operable to create and manage an embedded menu in a displayed Web page when the Web page is displayed and the applet is executed by the Web browser running on the administrator terminal 12. In the preferred embodiment of the present invention, the asset management and scheduling applet is coded in Java™ and the Web browser supports a Java interpreter.

In a preferred embodiment, each of the media streamer applications 20 provides for encoding media data and parsing the media data to create media assets including encoded and parsed media data. Also in the preferred embodiment, the media players loaded by the browsers running on the end user terminals 14 are configured to decode and display the media assets streamed thereto by the media streamer application 20.

The asset management and scheduling GUI provided by the administrator terminal 12 is described below with reference to flow diagrams. In the preferred embodiment, the GUI process is implemented as a Java applet executed by the processing unit 52 (FIG. 2) of the administrator terminal 12 (FIG. 1) to display a series of GUI screens within a Web browser window on the display unit 62 (FIG. 2) of the administrator terminal. A user of the administrator terminal 12 (FIG. 1) may interface with the below described GUI using the I/O units 64, such as a keyboard and mouse, to provide user input by activating various buttons and check boxes, and by entering and editing text as required and prompted by the GUI screens.

In the below described embodiment of the present invention, each of a plurality of interface functions provided by each of the GUI screens is implemented using a corresponding GUI component selected from a variety of GUI components including radio buttons, check boxes, drop-down lists, spin buttons, editable text boxes, non-editable text boxes, etc. However, as is well understood to one of ordinary skill in the art, each of the interface components of each of the GUI screens described below may alternatively be implemented using other types of GUI components. The asset management and scheduling GUI process of the present invention is more generally described with reference to the flow diagrams while the depicted GUI screens illustrate a currently preferred embodiment.

Figure 3:
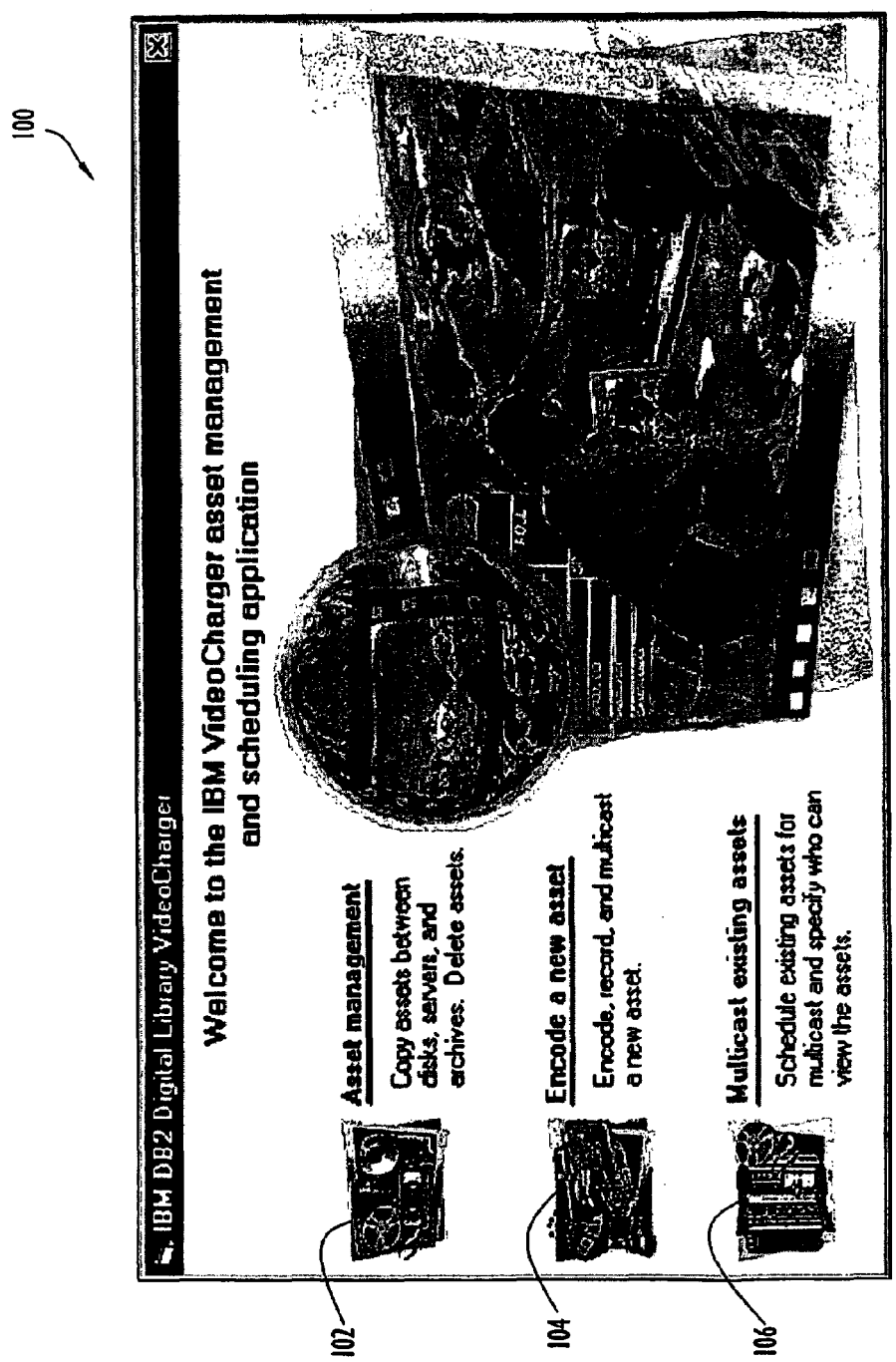
FIG. 3 is a block diagram illustrating a main GUI screen of the asset management and scheduling GUI process, the main GUI screen providing for a user to select from management and scheduling options including managing assets, encoding assets, and multicasting existing assets.

FIG. 3 shows a block diagram illustrating a main graphical user interface screen (GUI screen) at 100, the screen 100 being used in the asset management and scheduling GUI process of the present invention. The main GUI screen 100 includes an asset management icon 102, an "encode a new asset" icon 104, and a multicast existing assets icon 106.

Figure 4:
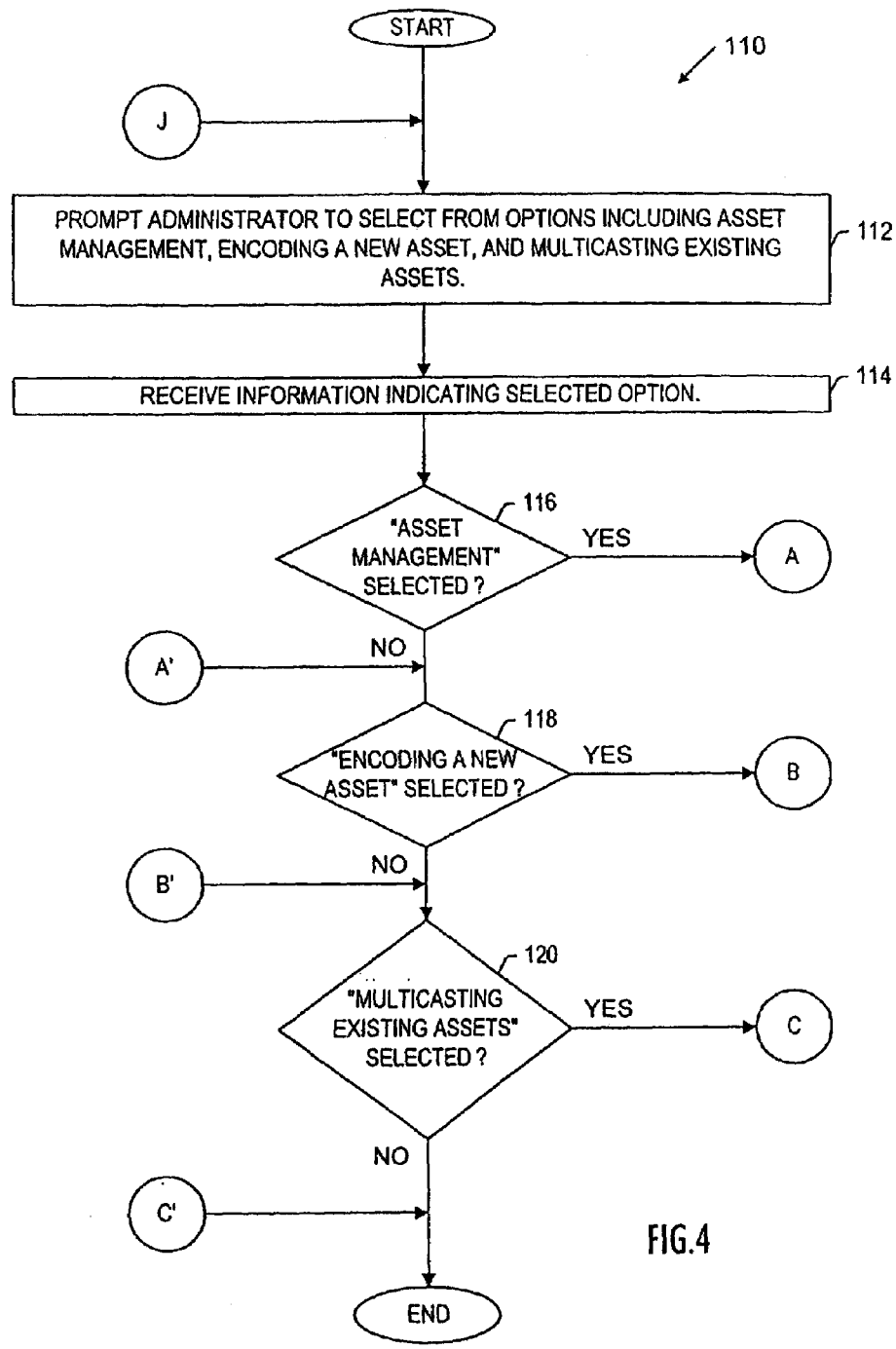
FIG. 4 is a flow diagram illustrating a sub-process for implementing the main GUI screen of FIG. 3.

FIG. 4 shows a flow diagram illustrating a sub-process at 110 for providing a graphical user interface allowing for a user to select from a plurality of main options of the asset management and scheduling GUI. In the preferred embodiment, sub-process 110 is implemented using the main GUI screen 100 (FIG. 3). The depicted process begins with step 112 in which a user of the administrator terminal 12 (FIG. 1) is prompted to select from main options including an asset management option, an option for encoding a new asset, and an option for multicasting existing assets. In step 114, user input indicating a selected one of the main options is received in response to the user selecting one of the three icons 102, 104, and 106 of the main GUI screen (FIG. 3).

From step 114, the process proceeds to 116 at which it is determined whether the asset management icon 102 (FIG. 3) has been selected, and if so, the process proceeds to "A" (to FIG. 206) to execute an asset management and scheduling GUI sub-process as further explained below. If it is determined at 116 that the asset management option has not been selected, the sub-process proceeds to 118 at which it is determined whether the icon 104 (FIG. 3) for encoding a new asset has been selected, and if so, the depicted process proceeds to "B" (to FIG. 13A) to execute a GUI sub-process for encoding a new asset as further explained below. If is determined at 116 and 118 that neither of the icons 102 and 104 (FIG. 3) of the main GUI screen have been selected, the sub-process proceeds to 120 at which it is determined whether the icon 106 (FIG. 3) for multicasting existing assets has been selected, and if so, the depicted process proceeds to "C" (to FIG. 33A) to execute a GUI sub-process for multicasting existing assets.

Figure 5:
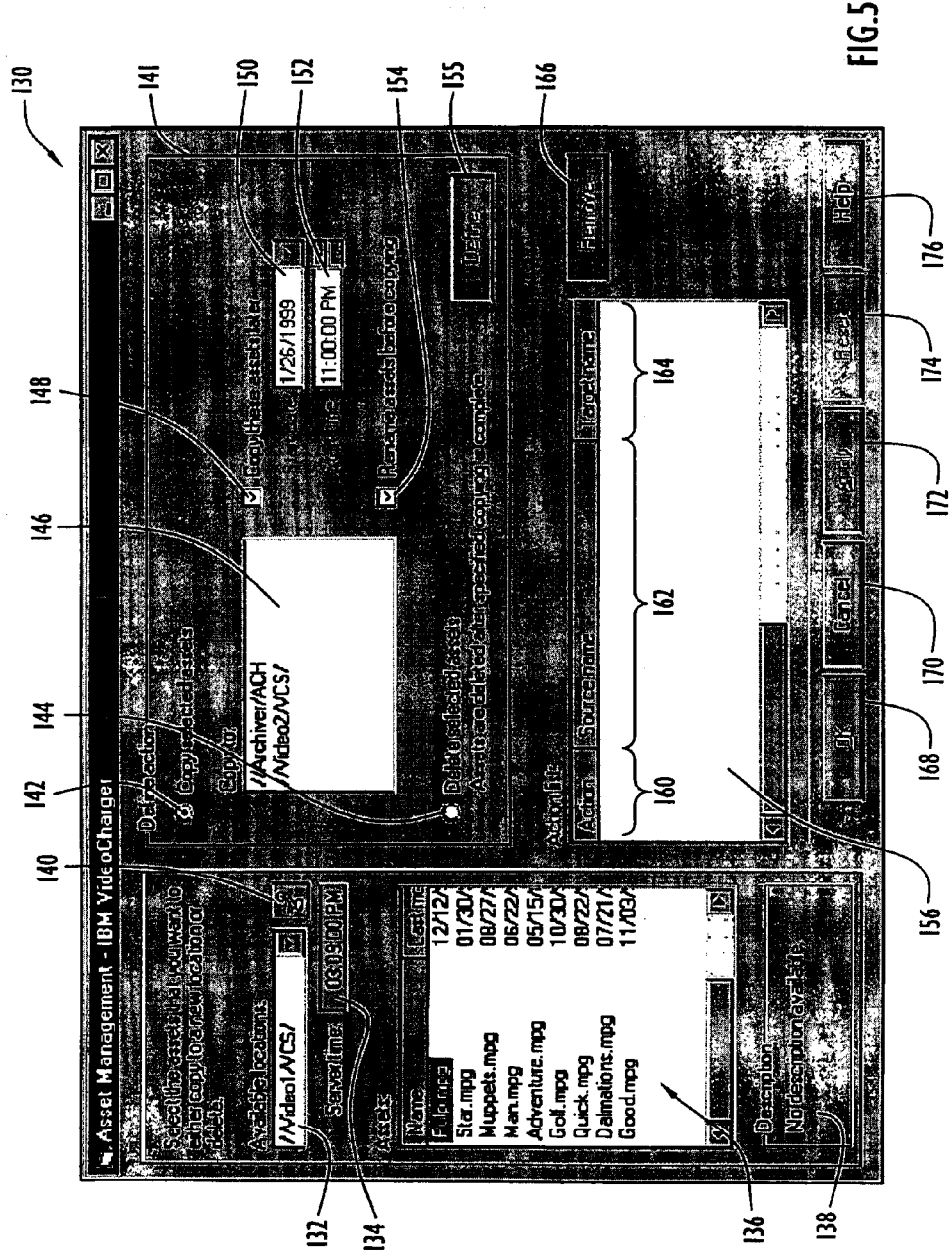
FIG. 5 is a block diagram illustrating an asset management GUI screen providing for the user to select from asset management options including mapping new locations, deleting available locations, and copying and deleting selected assets.

FIG. 5 shows a block diagram illustrating an asset management GUI screen at 130, the screen providing an interface for the user to select from asset management options including: mapping, or identifying, new locations (e.g., servers, local and remote disks and archives) to be added to an available locations list; deleting locations from the available locations list; "copying" selected assets from selected source locations to selected destination locations; and "deleting" selected assets from selected locations as further explained below. As mentioned above, types of locations include local disks, remote disks, media servers, and archives.

The asset management GUI screen 130 includes: an available locations drop-down list 132 for displaying graphical information indicative of the list of available locations from which the user may select a location; a server time display window 134 for displaying the local time at a selected location if the selected location, selected via the drop down list 132, is a server; and an assets list box 136 for displaying graphical information indicative of the names of assets available at the selected one of the available locations indicated in the drop down list 132, the assets in the assets list box 136 being multi-selectable so that the user may select one or more of the listed assets, the assets list box also providing for the display of graphical information indicative of the date and time that each of the listed assets was last modified.

If the selected location, selected via the drop down list 132, is a media server 18, 30 (FIG. 1), or an archive 36 (FIG. 1), then the assets list box 136 displays a list of catalogued assets. "Catalogued" assets include assets in the catalog of a media server, that is assets which are identified by the corresponding media streamer application 20 (FIG. 1) as being accessible. If the scheduled location is a disk (e.g., one of the local disks 22 or the remote disk 28 of FIG. 1), then the assets list box 36 displays all files and assets stored at the selected location. As mentioned above, media files or assets may be added from a local disk 22 (FIG. 1) to a "catalog" of a corresponding media streamer application 20 (FIG. 1), and media files or assets may be loaded from the remote disk 28 (FIG. 1) to the catalog of the corresponding media streamer application 20 (FIG. 1). Upon loading or adding a media file, which includes unparsed media data, the media streamer application 20 (FIG. 1) must parse the media data in order to convert the media file into a media asset which is formatted for staging and streaming operations.

Note that the server time window 122 is useful to the user because the GUI process is implemented as a Java applet and the user may be residing in a different time zone from the time zone which the selected server resides in. The server time window 122 allows the user to schedule actions for an appropriate time in another time zone.

The screen 130 also includes: a description display box 138 for displaying graphical information indicative of a description of the currently selected asset listed in the assets list box 136; an add/remove locations button 140 for adding locations to the list of available locations and removing locations from the list of available locations as further explained below; a define action box 141 for defining copy actions and delete actions, the box 141 including: a copy assets button 142 for defining a copy action for "copying" a currently selected asset, indicated in the assets list box 136, from a selected source location, identified in the available locations drop down list 132; a delete selected assets button 144 for defining a "delete" action for deleting selected assets at the selected location; and a "copy to" list box 146 allowing for the user to select a destination location from a dynamically created list of possible destination locations, as further explained below.

The asset management and scheduling GUI process includes logic for determining possible destinations for a copy action from a corresponding selected source location. As mentioned above, copy actions for copying media assets include "adding" media files or assets from a local disk 22 (FIG. 1) to a catalog of a corresponding local media streamer application 20 (FIG. 1), "loading" media files or assets from a remote disk 28 (FIG. 1) to the catalog of corresponding media streamer application 20 (FIG. 1), and "staging" media assets from a source media server or a source archive to a destination media server or a destination archive. As mentioned, only media assets, as opposed to media files which include unparsed media data, may be staged. If the selected source location is a media server or an archive, then it is assumed that the copy action is a staging of the selected asset from the source location a destination location which is to either an archive or another media server. Therefore, if the selected source location is a media server or an archive, then the list of possible destination locations includes only media servers and archives. Alternatively, if the selected source location is a local disk or a remote disk, then it is assumed that the corresponding copy action is an "add" operation or a "load" operation, and the list of possible destination locations includes only media servers because if the scheduled portion of media data is a media file, then the destination media server must parse the media file in order to convert it to an asset and add it, or load it, to the catalog of the destination location.

Note that if a selected destination location is a server or other type of location requiring a log-in name and password, the user is required to enter the log-in name and password.

Note that the delete button 144 is only enabled if the selected location is a media server and the selected portion of media data is an asset. Note also that execution of a "delete" action results in a corresponding selected asset being removed from the catalog of a corresponding media streamer application 20 (FIG. 1) at the corresponding media server.

The GUI screen 130 further includes: a check box 148 for specifying delayed, or scheduled, copying wherein the selected assets are to be copied from the selected source location to the selected destination location at a later time; a start date drop down list, or drop down date picker 150 enabled by checking the check box 148 and providing for the user to select a start date for the scheduled copy action; a start time spin button time picker 152 enabled by checking box 148 and providing for the user to select a start time for the associated schedule copy action; a check box 154 for specifying that the selected asset is to be renamed before copying as further explained below; and a "define" button 155 for adding copy actions and delete actions to the action list box 156 as further explained below. If box 154 is checked, the GUI process displays a "rename-as" GUI screen (not shown) for the user to enter a target name for the asset upon copying it to the destination location.

The GUI screen 130 further includes an action list box 156 for displaying a list of copy actions and delete actions to be executed as further explained below. The action list box 156 is used for displaying graphical information indicative of a plurality of copy actions and delete actions 160. For each of the actions 160, the action list box 156 also includes: a source name field for displaying graphical information indicative of the corresponding selected asset; a target name 164 for displaying graphical information indicative of the target name, if applicable; a "from" field (not shown) for displaying the selected source location, selected using the drop down list 132; a "to" field (not shown) for displaying the selected destination location, selected via the "copy to" list box 146; and a schedule field (not shown) displaying graphical information indicative of scheduled associated information including the start date and start time selected via components 150 and 152.

The asset management GUI 130 screen further includes: a remove button 166 for removing, or deleting, selected actions from the action list box 156; an OK button 168 for presently causing the execution of, or scheduling the execution of, the actions listed in the actions list 156; a cancel button 170 for canceling execution of the listed actions; an apply button 172 for executing or scheduling execution of the actions listed in the action list 156 without departing from the GUI screen 130; a reset button 174 for returning the GUI process to the state it was in when the user entered the screen or to the state it was in immediately after selecting the apply button (Note that no actions are sent to the server); and a help button 176 for displaying help instructions for using the GUI screen 130. Upon activation of the OK button 168, or the apply button 172, the asset management and scheduling process generates commands and associated parameters specifying the action listed in the action list 156. In the preferred embodiment, the commands and associated parameters are generated by the asset management and scheduling applet executed by the administrator terminal 12 (FIG. 1) in response to the above described user input. The commands and associated parameters are communicated to the asset management and scheduling program 23 (FIG. 1)

at SERVER_1, which then executes the defined copy actions and delete actions for example, the copy actions are executed by copying the selected asset from the source location to the selected destination location on the selected date and time in accordance with the selected renaming option. Delete actions are executed after all copy actions have been executed so that selected assets are not deleted before copying.

Figure 6:
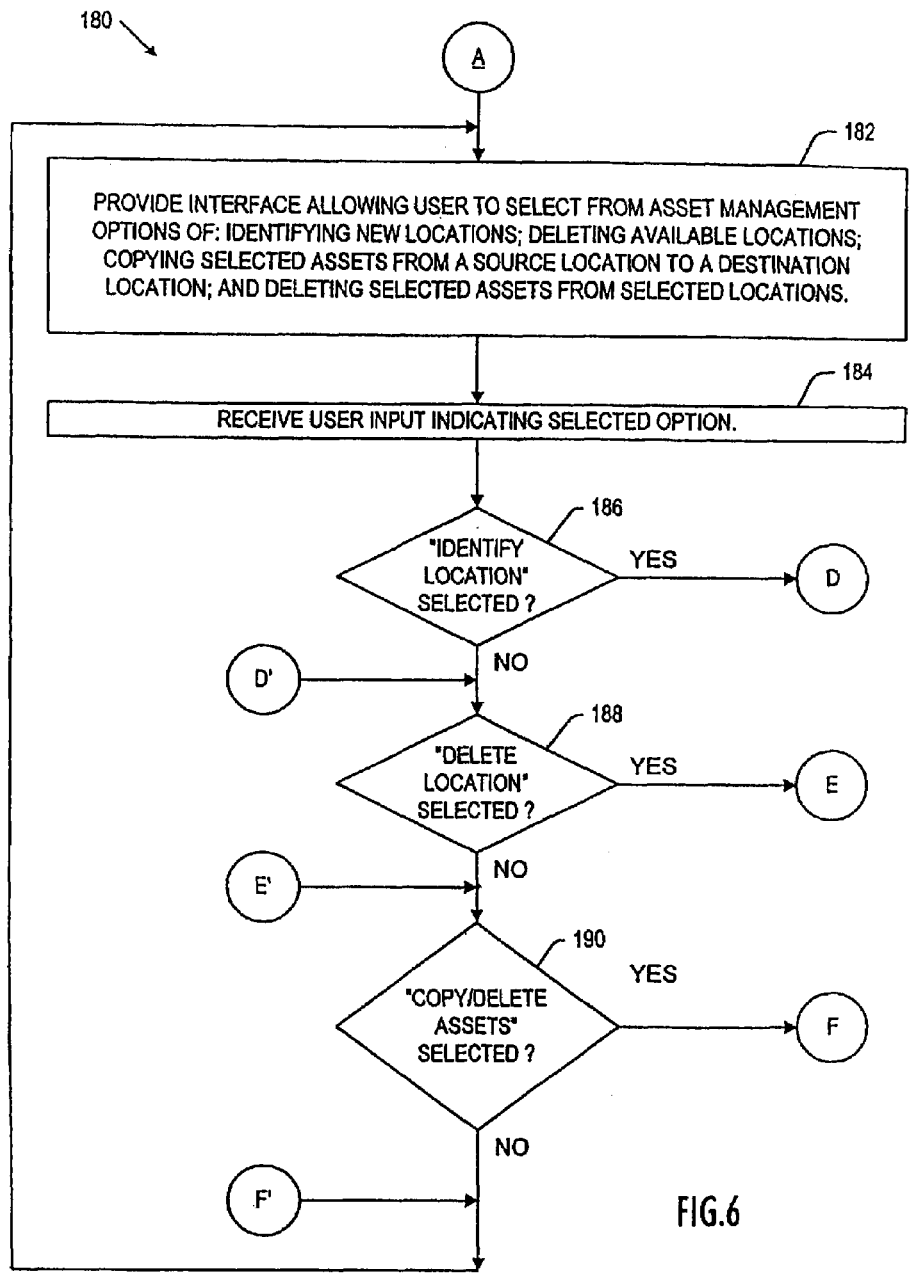
FIG. 6 is a flow diagram illustrating a sub-process of the GUI process of the present invention for managing assets using the asset management GUI screen of FIG. 5.

FIG. 6 shows a flow diagram illustrating an asset management sub-process at 180. The depicted sub-process proceeds from "A" (from FIG. 4) to step 182 in which an interface is provided, the interface allowing the user to select from asset management options including: mapping, or identifying, new locations in the networked computer system 10 (FIG. 1); deleting available locations listed in the available locations drop down list 132 (FIG. 5); "copying" selected assets from a selected source location to a selected destination location; and "deleting" selected assets from selected locations. In the preferred embodiment, the interface provided in step 182 is implemented using the asset management GUI screen 130 (FIG. 5).

From step 182, the sub-process proceeds to step 184 in which user input indicating a selected one of the asset management options is received. From step 184, the sub-process proceeds to 186 at which it is determined whether the option for mapping a new location has been selected, and if so, the sub-process proceeds to "D" (to FIG. 8A) to execute a location mapping sub-process as further explained below. The location mapping option may be selected by the user by activating the add/remove locations button 140 of the asset management GUI screen 130 (FIG. 5) which causes the asset management process to display an identify location GUI screen as further explained below.

If it is determined at 186 that the identify location option has not been selected, the sub-process proceeds to 188 at which it is determined whether the delete locations option has been selected, and if so, the process proceeds to "E" (to FIG. 9) to execute a location deleting sub-process as further explained below. Alternatively, if it is determined at 188 that the delete location has not been selected, the sub-process proceeds to 190 at which it is determined whether the option for copying and deleting assets has been selected, and if so the process proceeds to "F" (to FIG. 10A) to execute a sub-process of "copying" and "deleting" selected assets. The user may select the copy option or the delete option by activating the copy button 142 (FIG. 5) or the delete button 144 (FIG. 5) of the asset management GUI screen.

Figure 7A:
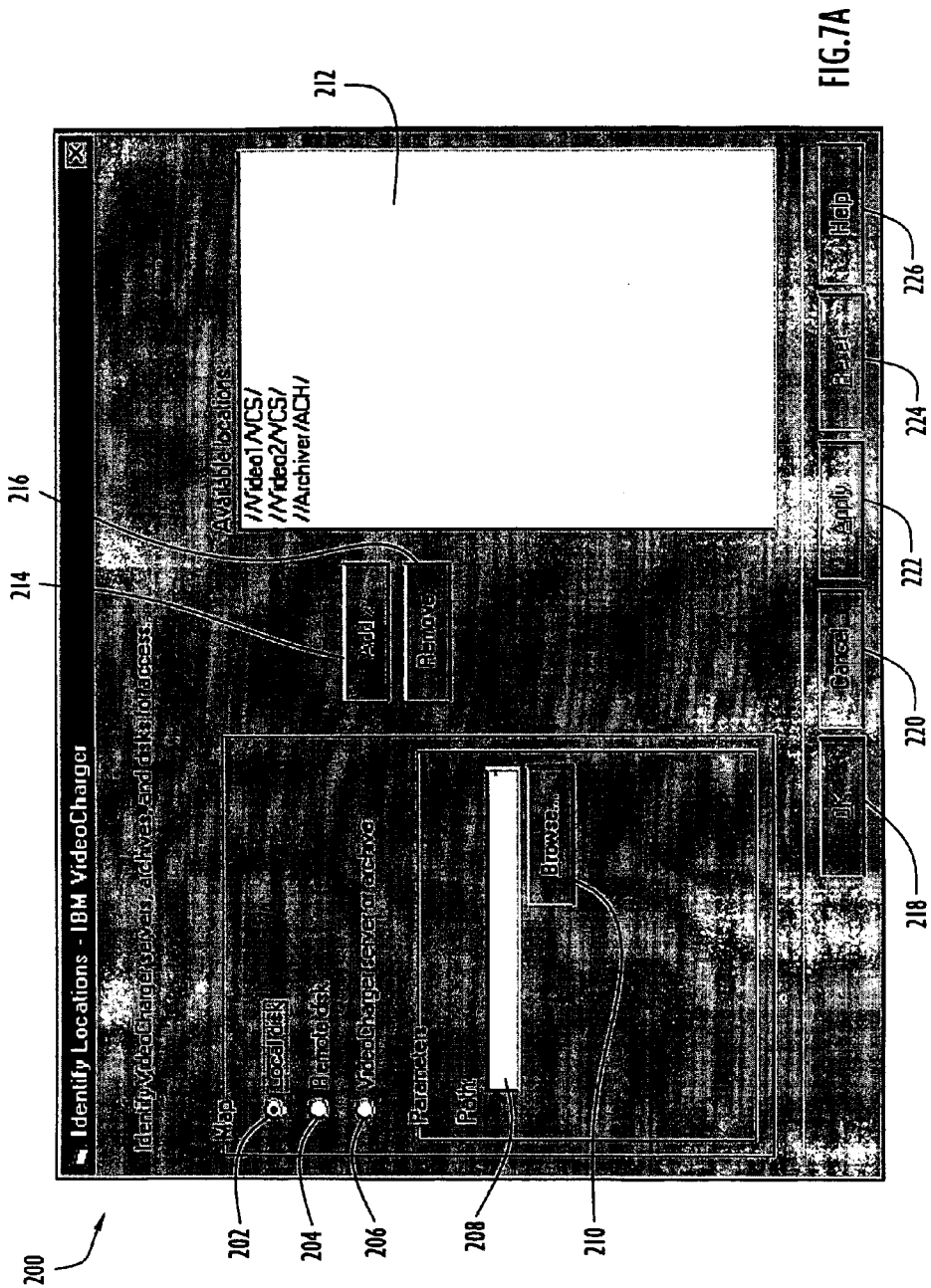
FIGS. 7A through 7D are a block diagrams illustrating location mapping GUI screens providing for the user to map locations including local and remote storage units, media servers, and archives.

FIG. 7A shows a block diagram illustrating an identify locations GUI screen 200 for mapping new locations for storing assets. The screen 200 is displayed upon activation of the add/remove locations button 140 (FIG. 5) of the asset management GUI screen. The identify locations GUI screen 200 includes: a local disk button 202 for indicating that a local disk (e.g., local disk 22 of SERVER_1 of FIG. 1) is to be mapped; a remote disk button 204 for indicating that a remote disk (e.g., remote disk 28 of FIG. 1) is to be mapped; a media server or archives button 206 for indicating that a media server (E.g., SERVER_1 or SERVER_2 of FIG. 1) or for indicating that an archive (e.g., archive 36 of FIG. 1) is to be mapped; a mapping path window 208 providing for entry and display of graphical information indicating a selected path to a new location; a browse button 210 for browsing predefined paths associated with corresponding ones of the buttons 202, 204, and 206; an available locations display window 212 for displaying available locations; an add button 214 enabled when the path window 208 is not blank, the add button 214 for adding a location, indicated by the path displayed in the path window 208, to the available locations list and window 212; and a remove button 216 for specifying that a location is to be deleted from the available locations window 212 and the drop down list 132 (FIG. 5).

The identify locations GUI screen 200 also includes an OK button 218 for executing the selected add and remove actions defined using the above described GUI components of screen 200, an apply button 222 for executing the add and remove actions without departing from the screen 200, and a reset button 224, each of which is enabled when the add button 214 is selected. Upon activation of the OK button 218, or the reset button 224, the newly mapped locations are added to the available location drop down list 132 (FIG. 5).

Figure 7B:
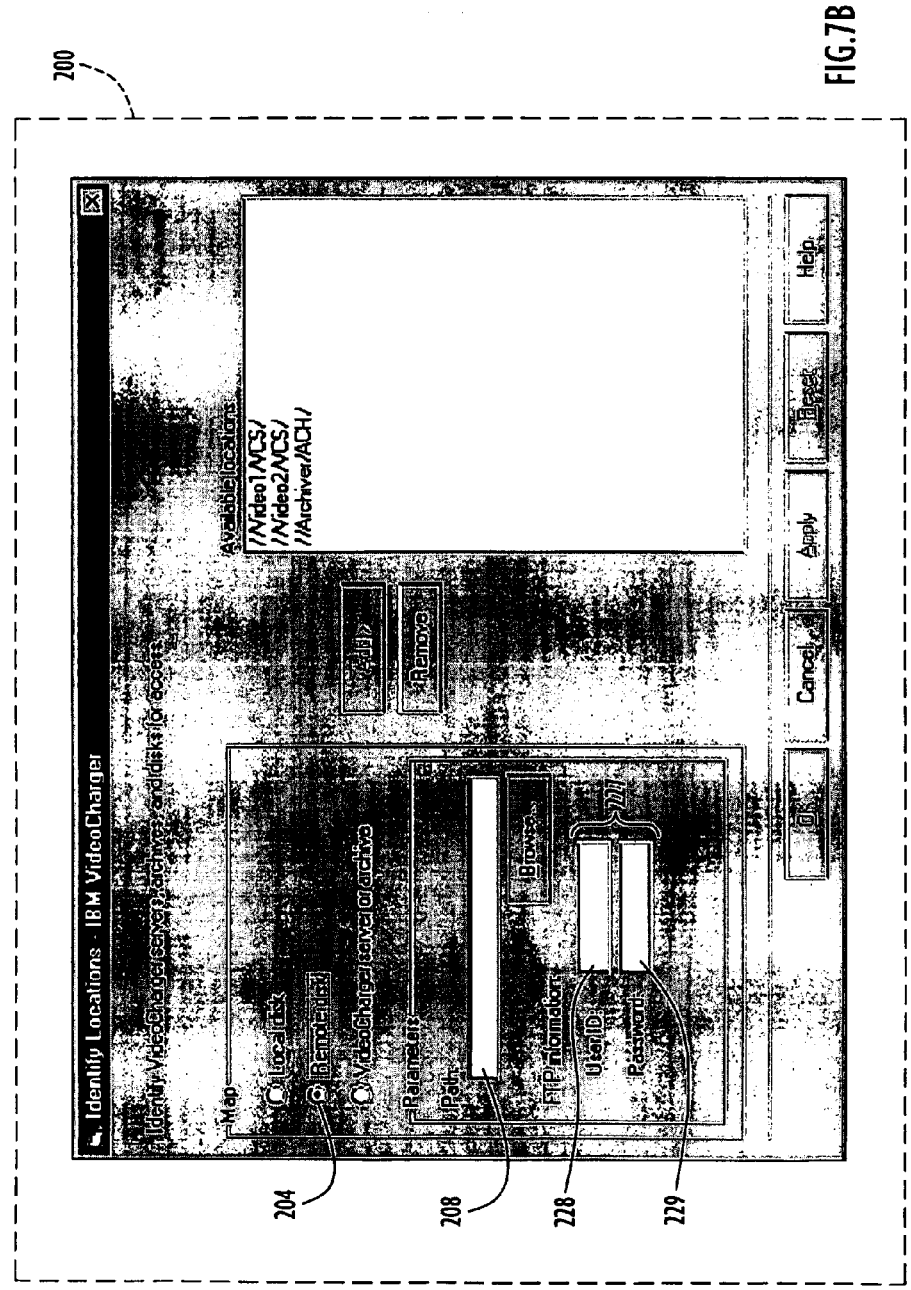

FIG. 7B shows a block diagram illustrating file transfer protocol (FTP) information interface components 227 of the identify locations GUI screen 200, the components 227 being displayed and enabled upon activation of the remote disk button 204 which indicates that a remote disk is to be mapped. The FTP information interface components 227 include: a user ID text entry box 228 providing for the user to enter a user ID for accessing a remote disk indicated by the path entered in the path window 208; and a password entry box 228 providing for the user to enter a password for accessing the remote disk.

Figure 7C:
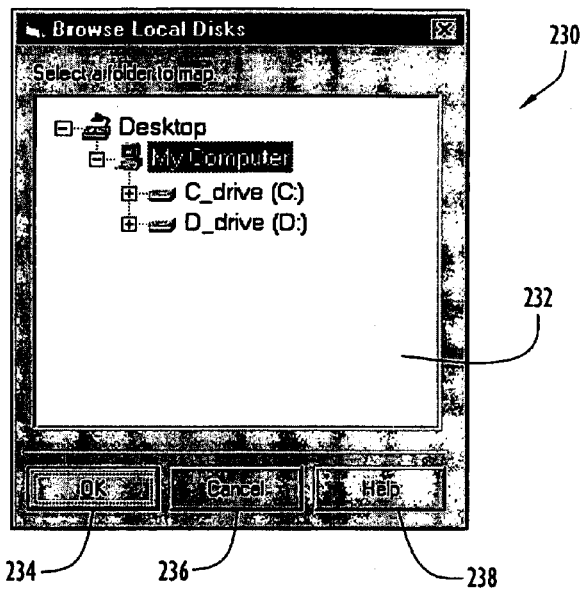

FIG. 7C shows a block diagram illustrating a "browse local disks" GUI screen 230 for mapping a path to a local disk and directory, such as for one of the local disks 22 (FIG. 1) of the media servers 18 and 30 (FIG. 1). The "browse local disk" GUI screen 230 is activated and displayed in response to the user activating the browse button 210 (FIG. 7A) of the identify location screen while the local disk button 202 (FIG. 7A) is activated. The "browse local disk" GUI screen 230 includes: a display window 232 for displaying graphical information indicative of folders to be mapped in a directory of a local disk, the folders being selectable by the user; an OK button 234; a cancel button 236; and a help button 238. The user may select a folder from the folders displayed in window 232, the selected folder being identified as a mapped location. Activating the OK button 234 after one of the folders has been selected causes the GUI process to map the selected folder and then return to the identify locations GUI screen 200 (FIG. 7A), and a path to the selected folder is displayed in the path window 208 (FIG. 7A). The user may then add the selected folder to the available location list box 212 (FIG. 7A) of the identify location GUI screen by activating the add button 214 (FIG. 7A). Activating the cancel button 236 cancels the users selections, if any, and returns the GUI process to the identify location GUI screen 200 (FIG. 7A) without any action. Activating the help button 238 provides graphical information for assisting the user in operating the GUI process.

Figure 7D:
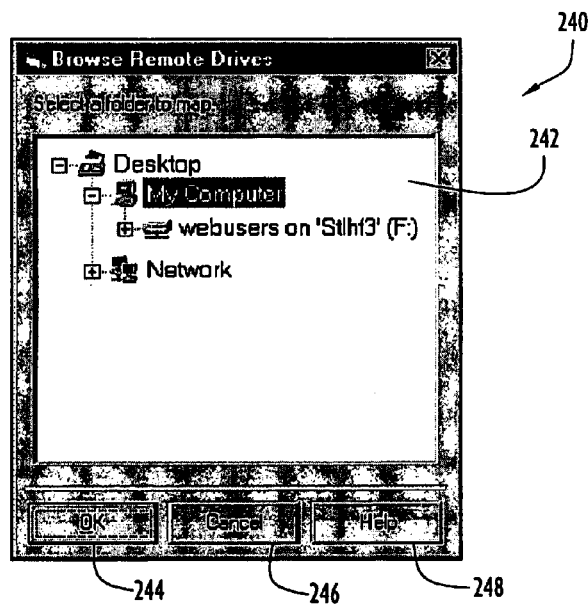

FIG. 7D shows a block diagram illustrating a "browse remote drives" GUI screen 240 for mapping a path to a remote disk and directory (e.g., remote disk 28 of) FIG. 1. The "browse remote drives" GUI screen 240 is activated and displayed in response to the user activating the browse button 210 (FIG. 7A) of the identify locations screen while the remote disk button 204 (FIG. 7A) is activated. The "browse remote drives" GUI screen 240 includes: a display window 242 for displaying graphical information indicative of folders in a directory of a remote disk, the folders being selectable by the user; an OK button 234; a cancel button 236; and a help button 238. The user may select a folder from the folders displayed in window 242, the selected folder being identified as a mapped location. Activating the OK button 244 returns the GUI process to the identify locations GUI screen 200 (FIG. 7A), and a path to the selected folder is displayed in the path window 208 (FIG. 7A). The user may then add the selected folder to the available location list box 212 (FIG. 7A) by activating the add button 214 (FIG. 7A). Activating the cancel button 246 cancels the users selections, if any, and returns the GUI process to the identify location GUI screen 200 (FIG. 7A) without any action.

Figure 8A:
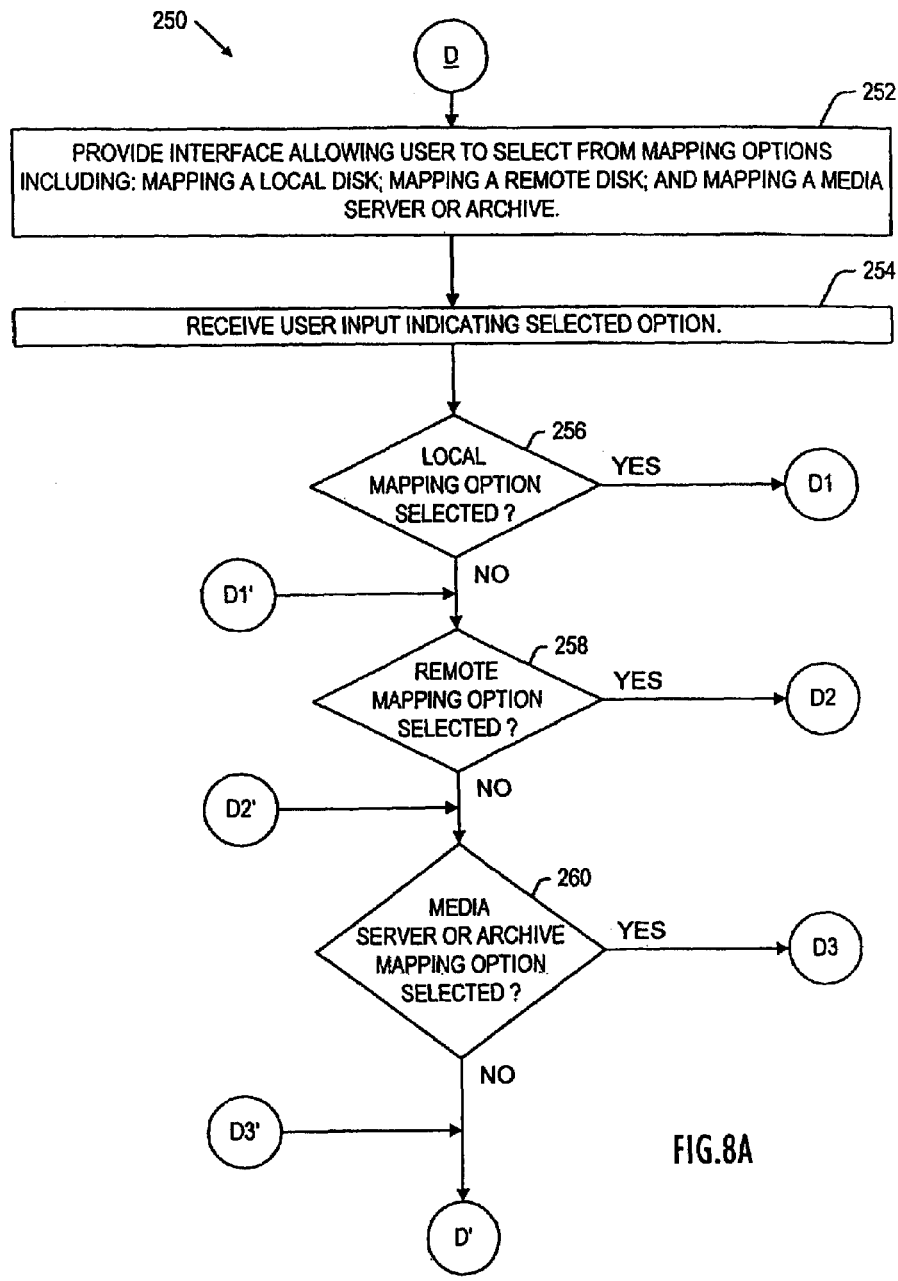
FIGS. 8A through 8D are flow diagrams illustrating sub-processes for mapping locations using the GUI screens of FIGS. 7A through 7D.

FIG. 8A shows a flow diagram illustrating an identify location sub-process 250 in accordance with the present invention. The depicted sub-process proceeds from "D" (from FIG. 6) to step 252 in which an interface is provided for allowing the user to select from mapping options including: mapping a path to a local disk such as one of the local disks 22 (FIG. 1) of the media servers 18 and 30 (FIG. 1); mapping a path to a remote disk such as the remote disk 28 (FIG. 1) associated with SERVER_1 (FIG. 1); and a mapping a media server (e.g., SERVER_1 or SERVER_2 of FIG. 1) or archive (e.g., archive 36 of FIG. 1). From step 252, the sub-process proceeds to step 254 in which user input indicative of a selected one of the mapping options is received. In the preferred embodiment, the GUI screen 200 (FIG. 7A) prompts the user to select one of the buttons 202, 204, and 206 (FIG. 7A) in steps 252 and 254.

Figure 8B:
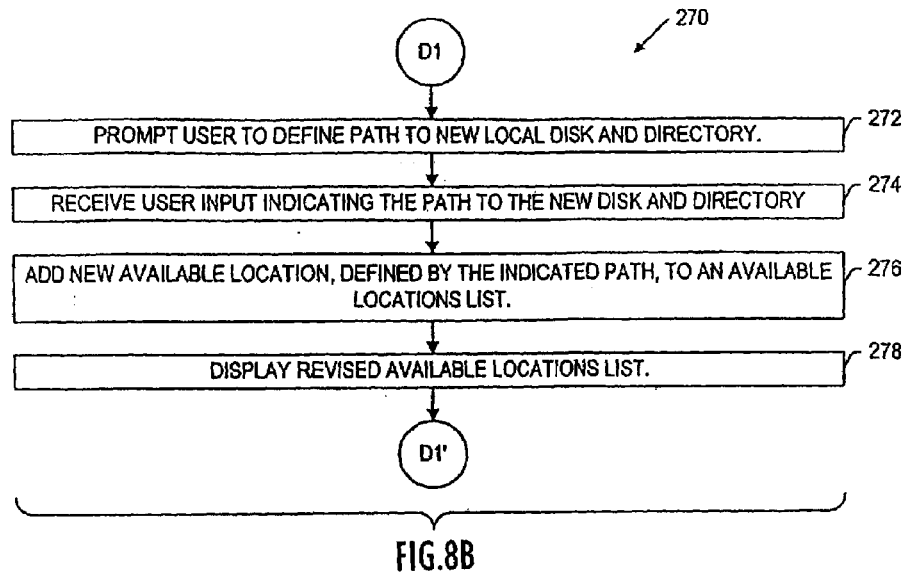

From step 254, the sub-process proceeds to 256 at which it is determined whether the local mapping option has been selected, that is whether button 202 (FIG. 7A) has been selected, and if so, the process proceeds to "D1" (to FIG. 8B). If it is determined at 256 that the local mapping option has not been selected, the process proceeds to 258 at which it is determined whether the remote mapping option has been selected, that is whether button 204 (FIG. 7A) has been selected. If it is determined at 258 that the remote mapping option has been selected, the process proceeds from 258 to "D2" (to FIG. 8C). If it is determined at 256 and 258 that neither the local mapping option nor the remote mapping option has been selected, the sub-process proceeds to 260. At 260, it is determined whether the "media server or archive mapping option" has been selected, that is whether button 206 (FIG. 7A) has been activated, and if so, the process proceeds to "D3" (to FIG. 8D). Alternatively if it is determined at 260 that the media server or archive mapping option has not been selected, the process proceeds to "D1" (back to FIG. 6).

FIG. 8B shows a flow diagram illustrating a sub-process at 270 for mapping a path to a local disk for storing media assets. The sub-process 270 proceeds from "D1" (from FIG. 8A) to step 272 in which the user is prompted to define a path to a new local disk, and directory if applicable. From step 272, the sub-process proceeds to 274 in which information indicative of a path to the new local disk and directory is received. In the preferred embodiment, steps 272 and 274 are implemented using the identify locations GUI screen 200 (FIG. 7A) wherein the user provides user input indicating a path to a new local disk by entering text indicative of a path in the path window 208 (FIG. 7A). Also in the preferred embodiment, the user may optionally activate the browse button 210 (FIG. 7A) which causes the GUI process to display the browse local disks screen 230 (FIG. 7C) which assists the user in indicating a path to a new local disk as explained above. From step 274, the sub-process proceeds to step 276 in which a new available location defined by the path is added to an available location list. From step 276, the sub-process proceeds to step 278 in which a revised available locations list is displayed. In the preferred embodiment, the revised available locations list is displayed in the available locations window 212 (FIG. 7A).

Figure 8C:
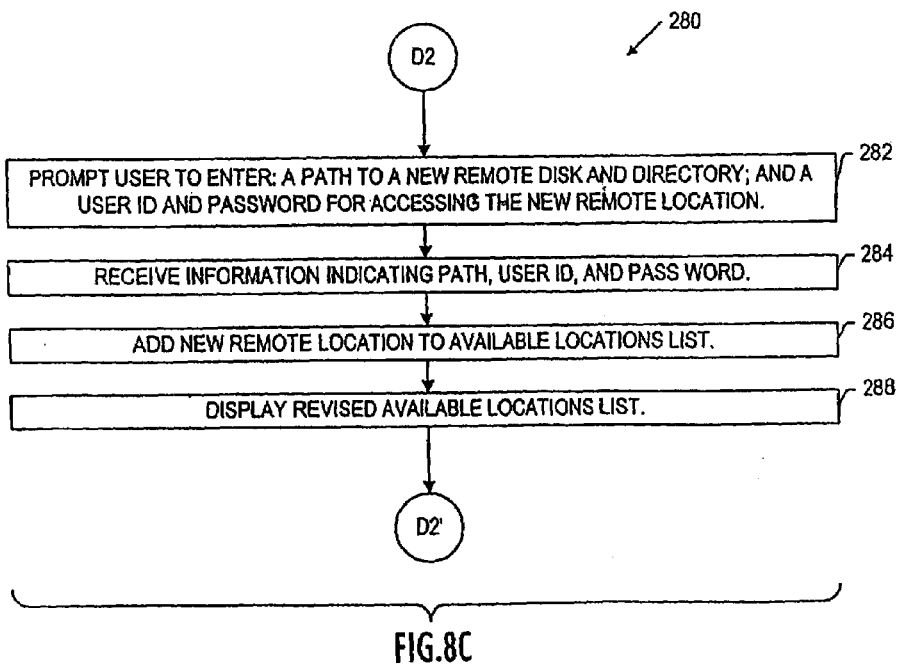

FIG. 8C shows a flow diagram illustrating a sub-process at 280 for mapping and identifying a new remote disk as one of the available locations. The depicted sub-process proceeds from "D2" (from FIG. 8A) and proceeds to step 282 in which the user is prompted to enter: a path to a new remote disk and directory; and a user ID and password for accessing the new remote disk if required. From step 282, the sub-process proceeds to step 284 in which user input indicative of a path, a user ID, and a password is received. From step 284, the sub-process proceeds to step 286 in which a new remote location is added to the available location list. In step 288, a revised location list is displayed. From step 288, the process proceeds back to step "D" (back to FIG. 8A). In the preferred embodiment, the sub-process 280 is implemented using the identify locations GUI screen 200 (FIG. 7B).

Figure 8D:
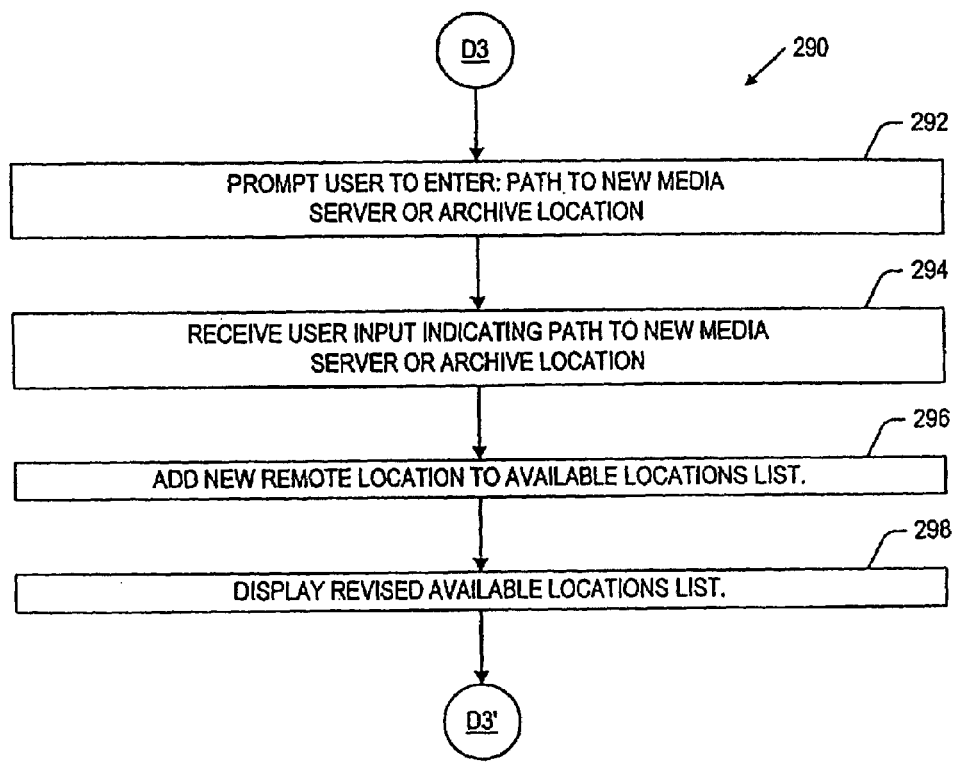

FIG. 8D shows a flow diagram illustrating a sub-process at 290 for defining a path to a media server, such as one of the media servers 18 and 30 (FIG. 1), or an archive such as the archive 36 (FIG. 1). The sub-process 290 proceeds from "D3" (from FIG. 8A) to step 292 in which the user is prompted to enter a path to a new media server or archive location. From step 292, the sub-process proceeds to step 294 in which user input indicative of a path to a new media server or archive location is received. In the preferred embodiment, steps 292 and 294 are implemented using the identify locations GUI screen 200 (FIG. 7A) wherein the user provides user input indicating a path to a new media server or archive location by entering information in the parameter path window 208 (FIG. 7A). From step 294, the sub-process proceeds to step 296 in which the path to the new remote location specified in step 294 is added to the available locations list displayed in the available locations window 212 (FIG. 7A) by activating the add button 214 (FIG. 7A). In step 298, the revised available location list is displayed in window 212 (FIG. 7A). From 298, the sub-process proceeds to "D3'" (back to FIG. 8A). Note that a user of the asset management and scheduling GUI process at the administrator terminal must be authorized to access locations such as servers. Particular locations (e.g., SERVER_1, archive 36, and SERVER_2) may require a log-in name and password in order to access the location. The user is required to enter a log-in name and password upon commiting/defining an action to a server.

Figure 9:
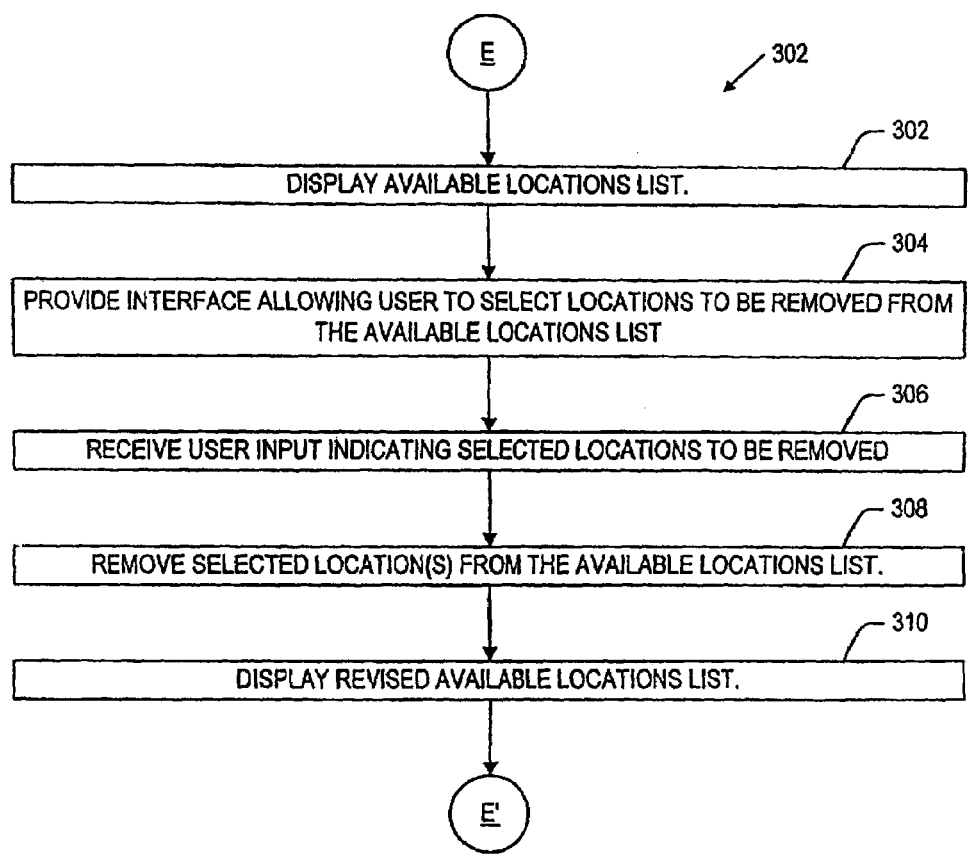
FIG. 9 is a flow diagram illustrating a sub-process for deleting selected locations from an available locations list.

FIG. 9 shows a flow diagram illustrating a sub-process at 302 for deleting selected locations from the available locations list displayed in window 212 (FIG. 7A) of the identify locations GUI screen 200. The sub-process 302 proceeds from "E" (from FIG. 6) to step 302 in which a list of available locations is displayed. In the preferred embodiment, the available locations list is displayed in window 212 (FIG. 7A) of the identified location GUI screen. From step 302, the sub-process proceeds to step 304 in which an interface is provided allowing the user to select locations to be removed from the available locations list. From step 304, the sub-process proceeds to step 306 in which user input indicating a selected one of the locations to be removed is received. From step 306, the sub-process proceeds to step 308 in which the selected location, or locations, are removed from the available locations list. In step 310, a revised available locations list is displayed. In the preferred embodiment, the sub-process 302 is implemented using the identify locations GUI screen 200 (FIG. 7A) wherein the user selects one or more locations from the locations displayed in the window 212 (FIG. 7A) and activates the remove button 216 which causes the selected locations to be removed from the list, and window 212 (FIG. 7A) then displays the revised available locations list. From step 310, the process proceeds back to "E'" (back to FIG. 6).

Figure 10A:
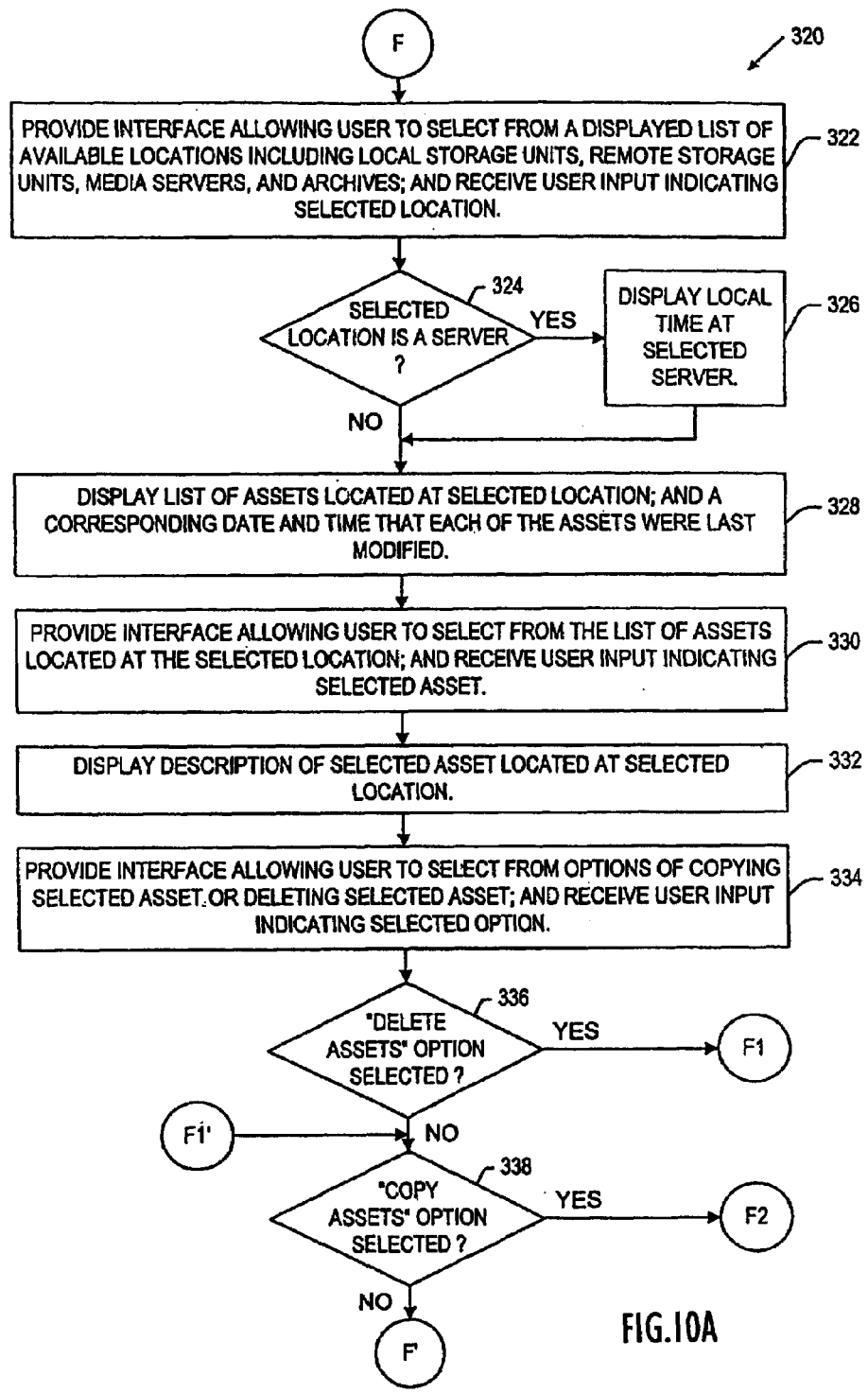
FIGS. 10A through 10D are flow diagrams illustrating sub-processes for copying and deleting selected assets located at selected locations using the asset management GUI screen of FIG. 5.

FIG. 10A shows a flow diagram illustrating a sub-process at 320 for "copying" and "deleting" selected assets. The sub-process 320 proceeds from "F" (from FIG. 6) to step 322 in which an interface allowing the user to select from a displayed list of available locations is provided. The displayed list includes: locations of local disks such as local disk 22 (FIG. 1); locations of remote disks such as remote disk 28 (FIG. 1); locations of media servers such as SERVER_1 or SERVER_2 (FIG. 1); and locations of archives such as archive 36 (FIG. 1). Also in step 322, user input indicating a selected one of the locations is received. In the preferred embodiment, the sub-process 320 of is implemented using the asset management GUI screen 130 (FIG. 5). Therefore, in the preferred embodiment, step 322 is implemented using the available locations drop down list 132 (FIG. 5) which provides the list of available locations from which the user may select as described above.

Note that upon selecting a location, if the user has not already logged on to the server associated with the selected location, the asset management and scheduling process executes instructions at the user terminal 12 (FIG. 1) for accessing the selected server associated with the selected location (e.g., SERVER_1 or SERVER_2 of FIG. 1). Note that the user may be required to enter a log-in name and password in order to establish a connection with the selected server.

From step 322, the sub-process proceeds to 324 at which it is determined whether the location selected in step 322 is a server, and if so, the sub-process proceeds to step 326 in which the local time at the selected server is displayed. In the preferred embodiment, the local time of the selected server is displayed in the server time window 134 (FIG. 5) of the asset management GUI screen. As mentioned above, the server time window 122 is useful to the user because the GUI process is implemented as a Java applet and the user may be residing in a different time zone from the time zone which the selected server resides in. The server time window 122 allows the user to schedule actions for an appropriate time in another time zone.

From step 326, the sub-process proceeds to step 328 in which a list of assets located at the selected location is displayed along with a corresponding date and time that each of the displayed assets were last modified. In the preferred embodiment, these assets are displayed in the assets window 136 (FIG. 5) of the asset management GUI screen. In step 330, an interface allowing the user to select from the list of assets located at the selected location is provided, and user input indicating a selected one of the assets is received. In the preferred embodiment, the user may select one of the assets in the assets list box 136 (FIG. 5) by clicking on it. Note that the assets list box 136 (FIG. 5) is multi-selectable.

In step 332, a description of the selected one of the assets located at the selected location is displayed. In the preferred embodiment, the description of the selected asset is displayed as graphical information in the description window 138 (FIG. 5) of the asset management GUI screen. From step 332, the sub-process proceeds to step 334 in which an interface is provided, the interface allowing the user to select from copy/delete options including "copying" the selected asset, and "deleting" the selected asset. Also in step 334, user input indicating a selected one of the copy/delete options is received. In the preferred embodiment, the user may select the option of copying selected assets by activating the copy button 142 (FIG. 5) of the asset management screen, or the user may select the delete selected assets option by activating the delete button 144 (FIG. 5) of the asset management GUI screen. The delete option is only possible if the selected location, selected via the drop down list 132 (FIG. 5), is a media server. As mentioned above, the execution of the delete action does not actually delete the selected asset from the selected location, but rather removes the selected asset from the catalog of the corresponding media streamer application 20 (FIG. 1). The user of the asset management and scheduling GUI generally does not have authority to actually delete assets. Generally, only a local administrator of the corresponding server may actually delete files.

From step 334, the sub-process proceeds to 336 at which it is determined whether the delete assets option has been selected, and if so, the GUI process proceeds to "F1" (to FIG. 10B) to execute a sub-process for deleting a selected asset from a selected location as described below. Alternatively, if it is determined at 336 that the delete assets option has not been selected, the sub-process proceeds to 338 at which it is determined whether the copy option has been selected, and if so, the process proceeds to "F2" (to FIG. 10C). If it is determined at 336 and 338 that neither the copy option nor the delete option has been selected, the process proceeds back to "F'" (back to FIG. 6).

Figure 10B:
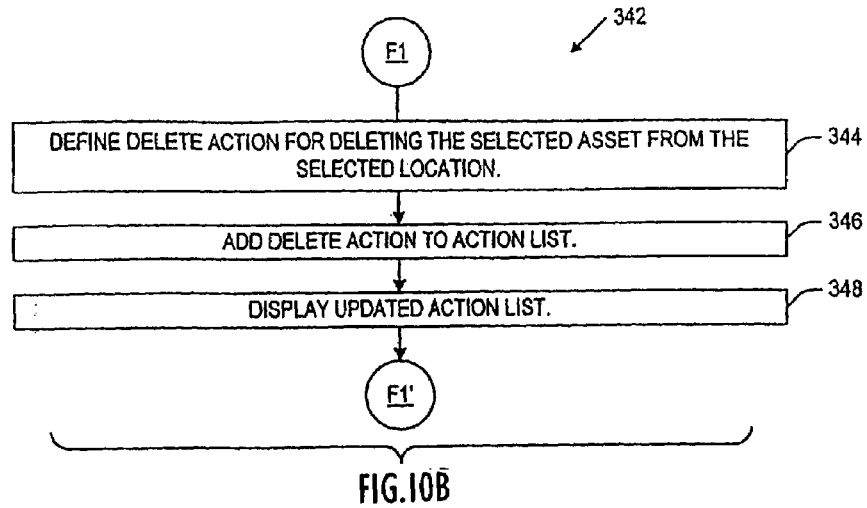

FIG. 10B shows a flow diagram illustrating a sub-process at 342 for defining a delete action for "deleting" a selected asset from a selected location. The sub-process 342 proceeds from "F1" (from FIG. 10A) to step 344 in which a delete action, associated with instructions for deleting the currently selected asset from the selected location, is defined. From step 344, the sub-process proceeds to step 346 in which the delete action defined in step 344 is added to an action list. In step 348, an updated action list is displayed after which the process proceeds back to "F1'" (back to FIG. 10A). In the preferred embodiment, the sub-process 342 is implemented using the asset management GUI screen 130 (FIG. 5) wherein the user may delete a selected asset, which has been selected via the assets window 136 (FIG. 5), by activating the delete button 144 (FIG. 5) of the asset management GUI screen 130, and then activating the define button 158 (FIG. 5) which adds the defined delete action to the action list box 156 (FIG. 5).

Figure 10C:
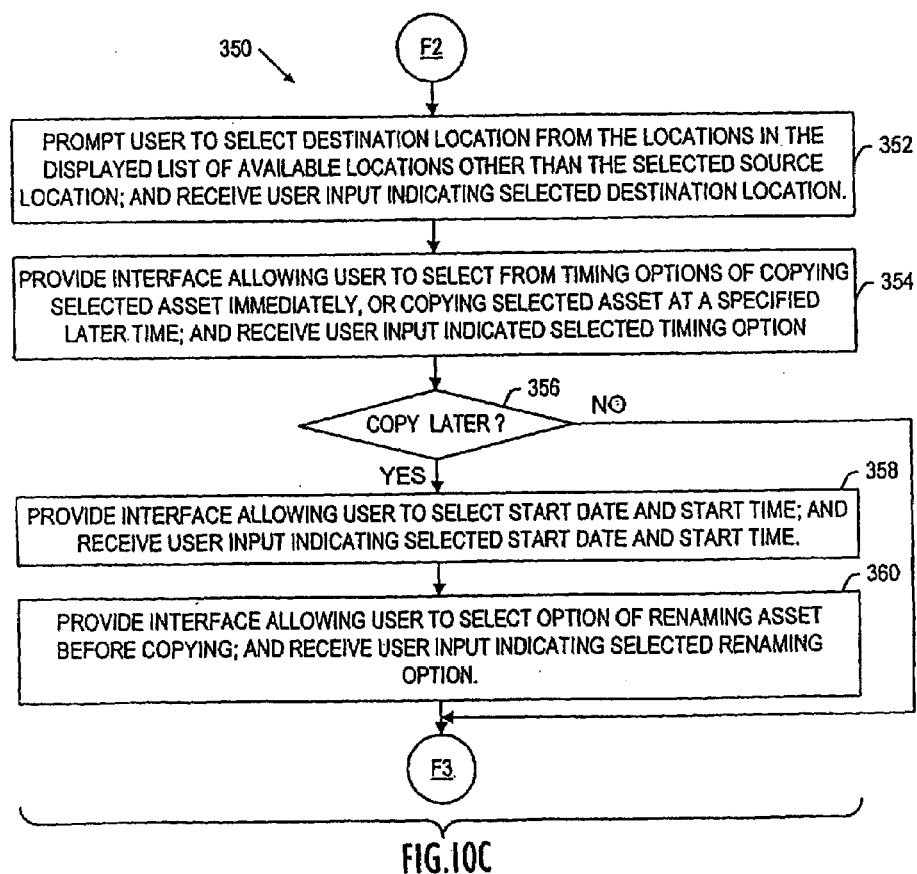

FIG. 10C shows a flow diagram illustrating a sub-process at 350 for "copying" a selected asset from a selected source location to a selected destination location. The sub-process 350 proceeds from "F2" (from FIG. 10A) to step 352 in which the user is prompted to select a destination location. Also in step 352, user input indicating the selected destination location is received, the source location having been selected in step 322 (FIG. 10A). In the preferred embodiment, sub-process 350 is implemented using the asset management GUI screen 130 (FIG. 5) wherein the user selects the destination location from the list of possible destination locations listed in the "copy-to" window 146 (FIG. 5) as explained above.

Note that upon selecting a destination location, if the user has not already logged on to the server associated with the selected destination location, the asset management and scheduling process executes instructions at the user terminal 12 (FIG. 1) for accessing the selected server associated with the selected destination location (e.g., SERVER_1 or SERVER_2 of FIG. 1). At this point, the user may be required to enter a log-in name and password in order to establish a connection with the selected destination server. A connection with the selected destination server is required in order to verify that the user has authority to copy media data to the destination media server.

From step 352, the sub-process proceeds to step 354 in which an interface is provided, the interface allowing the user to select from timing options including an immediate copying option, and a delayed copying option wherein selected assets are scheduled for copying at a specified later time. Also in step 354, user input indicating the selected timing option is received. From step 354, the sub-process proceeds to 356 at which it is determined whether the timing option of copying a selected asset at a specified later time has been selected. In the preferred embodiment, the user may select displayed copying option by checking the "copy assets later" box 148 (FIG. 5).

If the delayed copying option is selected, the sub-process proceeds from 356 to step 358 in which an interface allowing the user to select a start date and start time is provided. Also at step 358, user input including scheduling information associated with the copy action is received, the scheduling information including a selected start date and start time. In the preferred embodiment, the user selects the start date and start time using the start date drop down window 150 (FIG. 5) and the start time spin button 152 (FIG. 5) respectively. If the delayed copying option is not selected, then it is assumed that scheduling information associated with the defined copy action specified that the copy action is to be executed presently.

From step 358, the sub-process proceeds to step 360 in which an interface, allowing the user to select an option of renaming the asset before copying, is provided. Also in step 360, user input indicating a selected renaming option is received. In the preferred embodiment, the user may select the option of renaming assets before copying by checking box 154 (FIG. 5) of the asset management GUI screen 130 (FIG. 5). From step 360, the process proceeds to "F3" (to FIG. 10D) to execute further steps of the copy/delete selected assets sub-process.

Figure 10D:
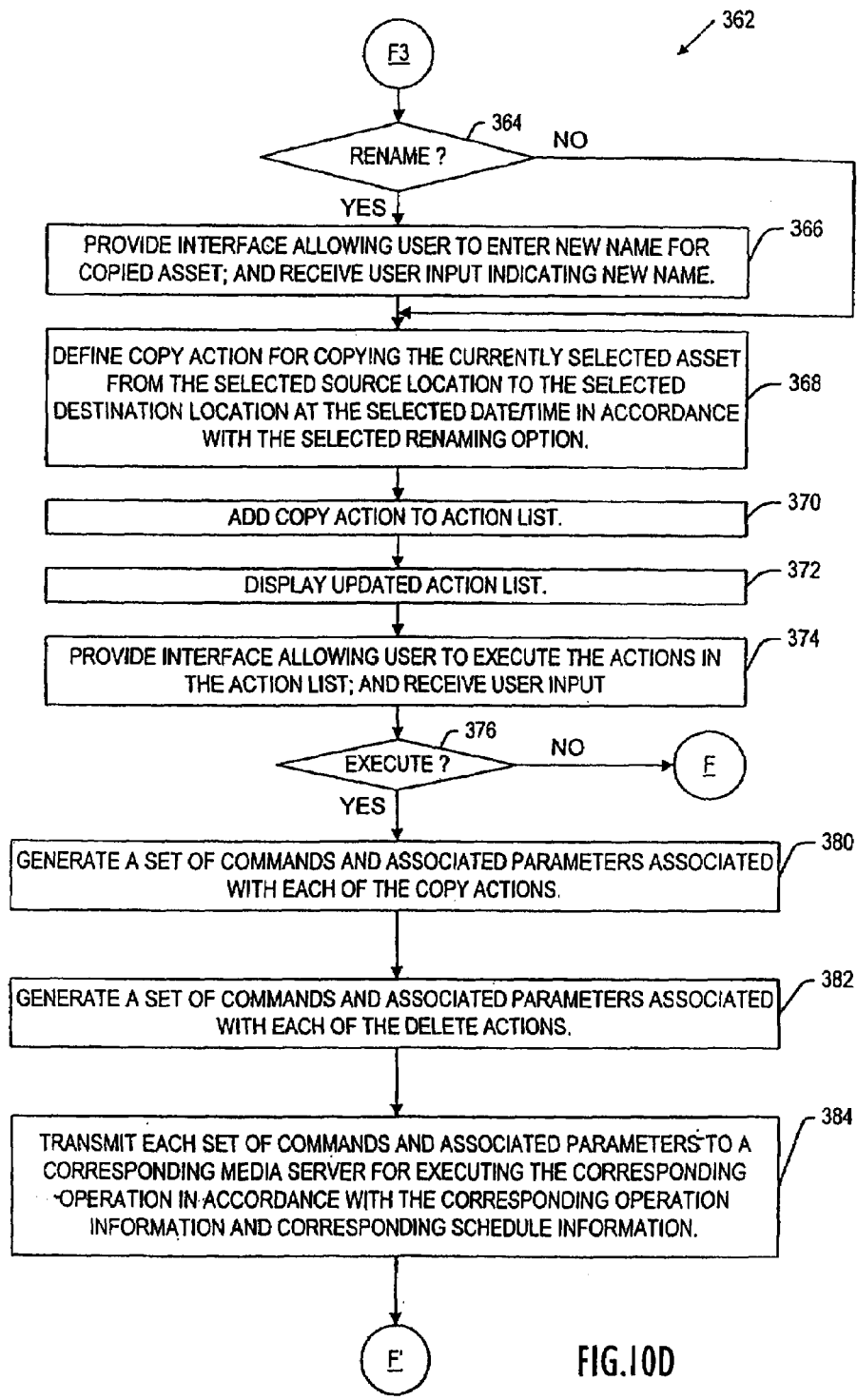
Figure 11:
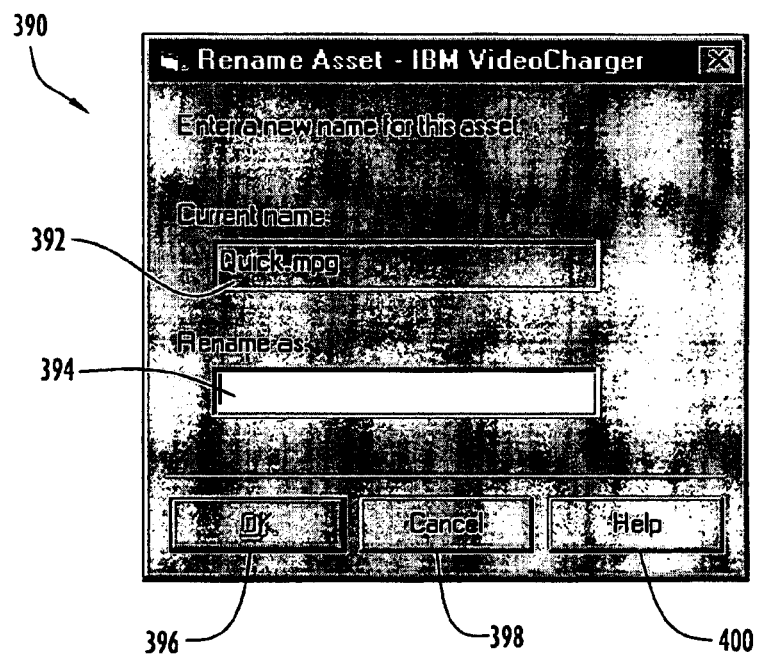
FIG. 11 is a block diagram illustrating a rename GUI screen for renaming a selected asset before copying the selected asset.

FIG. 10D shows a flow diagram at 362 illustrating further steps of the copy/delete selected assets sub-process 320 (FIG. 10A). Sub-process 362 proceeds from "F3" (from FIG. 10C) to 364 at which it is determined whether the renaming option has been selected, and if so, the sub-process proceeds to step 366 in which an interface allowing the user to enter a target name for the copied asset is provided. Also in step 366, user input indicating a target name is received. In the preferred embodiment, the user provides input indicating a target name for the selected asset using a rename asset GUI screen 390 shown in FIG. 11. With reference to FIG. 11, the rename asset GUI screen 390 includes a current name window 392 for displaying a current name of the selected asset; a "rename as" window 394 allowing for the user to enter a target name for the selected asset; an OK button 396; a cancel button 398; and an help button 400.

Referring back to FIG. 10D, the sub-process proceeds from 366 to step 368 in which a copy action is defined, the copy action being associated with instructions for copying the currently selected asset, or assets, from the selected source location to the selected destination location in accordance with the specified scheduling information (at the selected date and time if the delayed copying option has been selected, or presently if the delayed copy option has not been selected) in accordance with the selected renaming option. In the preferred embodiment, the copy action is defined using the GUI components of the asset management GUI screen 130 (FIG. 5) as explained above.

From step 368, the sub-process proceeds to step 370 in which the copy action defined in step 368 is added to an action list, and then to step 372 in which an updated action list is displayed. In the preferred embodiment, copy actions are added to the action list by activating the define button 155 (FIG. 5) of the asset management GUI screen which adds the defined copy action to the action list displayed in window 156 (FIG. 5). In step 374, an interface allowing the user to execute the actions listed in the action list is provided, and user input is received. In the preferred embodiment, the user may execute the actions listed in the action list 156 (FIG. 5) of the asset management GUI screen by activating the OK button 168 (FIG. 5), or the apply button 172 (FIG. 5), after actions have been defined.

From step 374, the sub-process proceeds to 376 at which it is determined whether the option of executing the defined actions has been selected. It is important that all copy actions associated with a particular asset be executed before any delete actions associated with the particular asset so that the particular asset is not deleted before it may be copied. If it is determined at 376 that the defined actions are to be executed, the sub-process proceeds to step 380 in which, for each listed copy action, a set of copy commands and associated parameters is generated, each set of copy commands and associated parameters specifying that the corresponding selected asset is to be "copied" from the corresponding selected source location to the corresponding selected destination location in accordance with the corresponding selected renaming option and in accordance with the specified scheduling information. From step 380, the sub-process proceeds to step 382 in which, for each listed delete action, a set of delete commands and associated parameters is generated, each set of delete commands and associated parameters specifying that the corresponding selected asset is to be "deleted" from the corresponding selected source location as defined by the corresponding delete action.

From step 382, the sub-process proceeds to step 384 in which each set of copy commands and associated parameters, and each set of delete commands and associated parameters is transmitted to the corresponding media server (e.g., SERVER_1 or SERVER_2 of FIG. 1) which is identified by the corresponding source location. In response to the sets of commands and associated parameters, the media streaming application 20 (FIG. 1) of the corresponding media server is operative to schedule execution of, or presently execute, the corresponding copy and delete operations as defined by the actions specified by the commands and associated parameters. For example, the media streamer application 20 (FIG. 1) of the media server associated with the selected source location is operative to copy the corresponding selected assets from the corresponding selected source location to the corresponding selected destination location in accordance with the selected renaming option and the specified scheduling information. In one embodiment, the asset management and scheduling GUI process, executed at the administrator terminal, transmits the sets of commands and associated parameters to the corresponding media servers via the IP network 16 (FIG. 1). Note that connections with the selected source locations and destination locations were previously made at which time user names and passwords were provided, if required. The connections with the locations need not be continuously maintained but may be re-established when required. From step 384, the process proceeds back to "F'" (back to FIG. 6).

Figure 12:
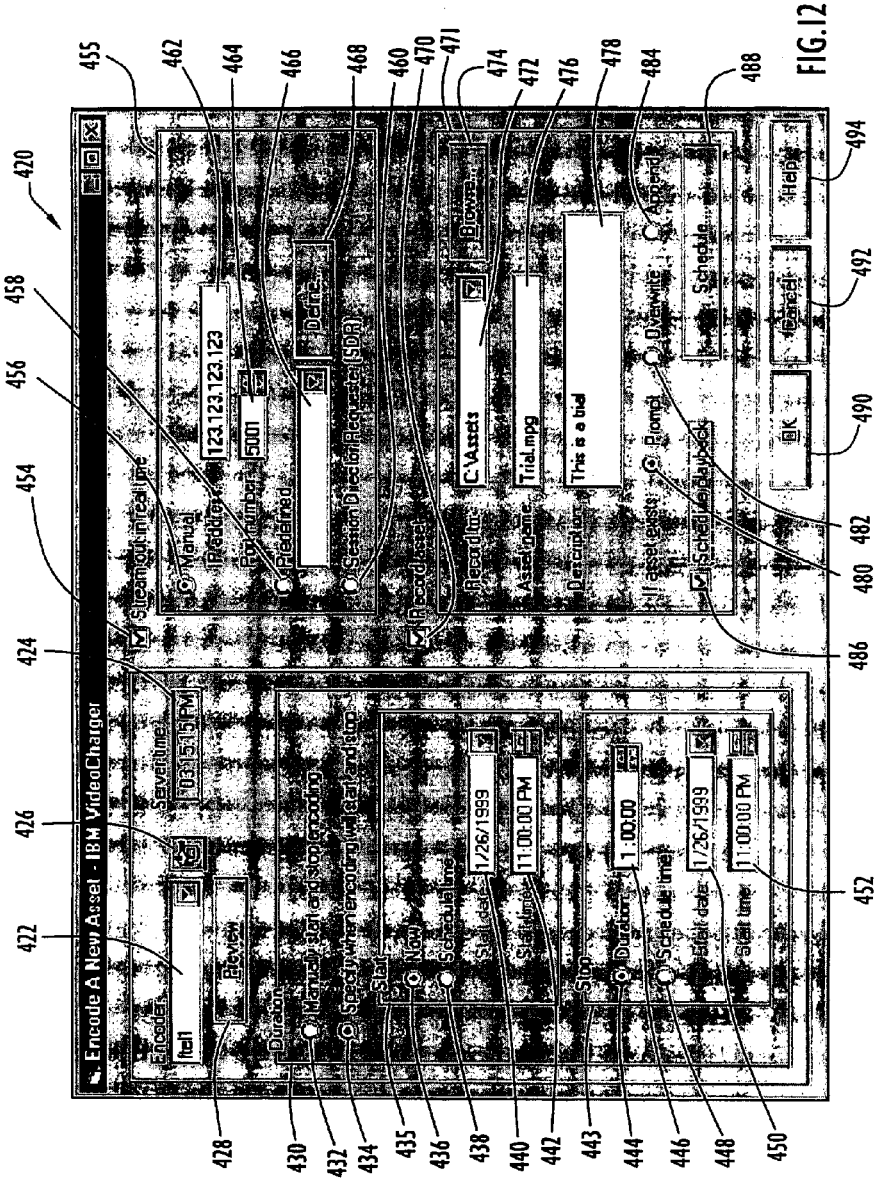
FIG. 12 is a block diagram illustrating an encoding GUI screen for encoding a new media asset.

FIG. 12 shows a block diagram illustrating an encoding GUI screen 420 for encoding a new media asset as further explained below. The GUI screen 420 is displayed to the user at the administrative terminal 12 (FIG. 1) when the "encode a new asset icon" 104 (FIG. 3) is selected. The GUI screen 420 includes: an encoder drop down list 422 allowing the user to select an encoder for encoding a new asset (e.g., SERVER_S1 which is connected to camera 24 of FIG. 1); an encoder time display box 424 for displaying the local time at the selected encoder which is a selected one of the media servers; an encoder attributes button 426 for selecting audio and video encoding attributes for the encoding process as further explained below; a preview button 428 for activating a browser plug-in at the administrator terminal 12 (FIG. 1) for displaying a scene to be encoded by the selected encoder; and a duration window 430 for defining schedule information specifying a schedule for the encoding operation as further explained below, the GUI screen 420 also provides for the user to define and schedule streaming operations, recording operations, and playback operations to be performed on the newly encoded asset.

The duration window 430 includes: a manual option button 432 for specifying manual mode operation which allows for the user to manually start and stop encoding as further explained below; and a timed encoding option button 434 for specifying scheduling information associated with the encoding operation, the scheduling information indicating when the encoding operation is to start and stop. The duration window 430 also includes GUI components associated with the timed encoding mode of operation, the components including: a start group box 435 having a start-now button 436 for specifying that encoding is to start immediately, and a schedule time button 438 which enables a start date drop down date-picker 440 and a start time spin button 442 further explained below; and a stop group box 443 having a duration button 444 which enables a duration spin button and window 446, and a schedule time button 448 which enables a start date drop down window 450, and a start time spin button 452, further explained below. Note that when the manual option button 432 is activated, the contents of the start and stop group boxes 435 and 443 are disabled. Also, activating the duration button 444 disables the start date and start time GUI components 450 and 452. When the timed encoding button 434 is activated, the user is prompted to provide scheduling information via the start and stop group boxes 435 and 443. The timed encoding may be scheduled to begin immediately by activating the start now button 436, or at a scheduled date and time by selecting via components 440 and 442. The timed encoding may be scheduled to stop either after a specified duration selected via the duration window 446, or at a specified time and date selected via the GUI components 450 and 452.

The encoding GUI screen 420 further includes: a streaming check box 454 for specifying that the asset is to be streamed from the encoder to one or more selected end users in real time that is, within a minimal time delay after which the asset is encoded; and a stream box 455 having interface components which are enabled upon checking box 454. The stream box 455, which allows for the user to specify destination end user terminals to which newly encoded asset is to be streamed, includes: a manual option button which enables the user to specify one destination IP address and port number via an IP address text box 462, and a port number text box 464; a predefined option button 458 which enables the user to select from predefined groups of destination IP addresses and port numbers listed in a drop down list 466, the option button 458 also enabling a define button 468 which allows the user define a new group of destination IP addresses and port numbers as further explained below; and a session director requester (SDR) option button 460 which is enabled if the user has third party software. In reponse to the user providing a start time and duration, SDR determines an available IP adress and port number.

The encoding GUI screen 420 further includes: a record asset check box 470 for specifying that an asset is to be recorded as it is encoded; and a record asset box 471 having interface components which are enabled upon checking box 470. The record asset box 471 includes: a "record to" drop down combination box 472 allowing the user to select a record path from previously defined record paths, the selected record path specifying a selected "record to" memory device and directory to which the asset is to be stored; a browse button 474 which displays the "browse local disks" GUI screen 230 (FIG. 7C) for defining a path for a local disk and directory, such as for the local disk 22 of SERVER_1 (FIG. 1); an asset name text box 476 providing for the user to enter text indicative of a name (e.g., "Trial.mpg") for the new asset; a description text box 478 providing for the user to enter textual information describing the new asset; and three overwrite option buttons explained below.

The three file option buttons include: a prompt option button 480 which, when activated, specifies that the user is to be prompted if an asset having the name indicated in the asset name text box 476 already exists at the selected "record to" memory device; an overwrite option button 482 which, when activated, specifies that any asset having the same name as that indicated in the asset name text box 476 which exists a the "record to" memory device is to be overwritten with the new encoded asset; and an append option button 484 which, when activated, specifies that any asset having the same name as that indicated in the asset name text box 476 is to be appended with the encoded and parsed media data comprising the new asset.

The encoding GUI screen 420 further includes: a schedule playback check box 486, enabled if the manual option button 432 is not selected for scheduling a play-back (streaming or multicasting) operation to be executed on the newly encoded asset in accordance with a play-back schedule. The check box 486 enables a schedule play-back button 488 for activating GUI components for specifying a play-back schedule as further explained below; an OK button 490; a cancel button 492; and a help button 494.

Figure 13A:
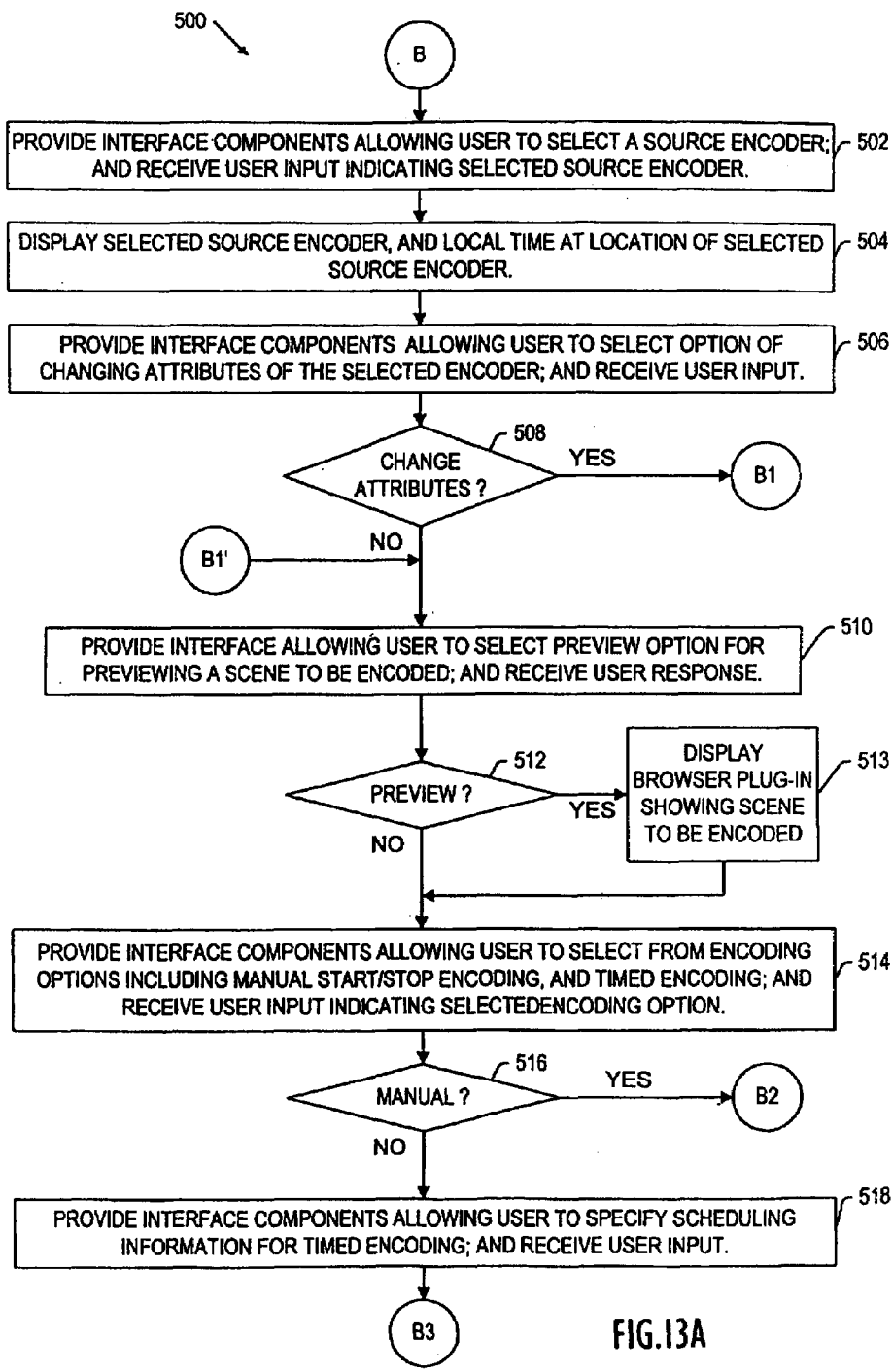

FIG. 13A shows a flow diagram illustrating an encoding sub-process at 500. The depicted sub-process proceeds from "B" (from FIG. 4) to step 502 in which an interface, allowing the user to select a source encoder, is provided. Also in step 502, user input indicating a selected source encoder is received. In the preferred embodiment of the present invention, the encoding sub-process 500 is implemented using the encoding GUI screen 420 (FIG. 12). From step 502, the sub-process proceeds to step 504 in which graphical information indicative of the selected source encoder is displayed, and local time at the location of the selected source encoder is also displayed. In the preferred embodiment, steps 502 and 504 are implemented using the encoder drop down list 422 (FIG. 12), and the server time window 424 (FIG. 12).

From step 504, the depicted sub-process proceeds to step 506 in which an interface allowing the user to select the option of changing attributes of the selected encoder is provided, and user input indicative of the selected option is received. In the preferred embodiment, step 506 is implemented using the encoder attributes button 426 (FIG. 12) of the encoding GUI screen. From step 506, the sub-process proceeds to 508 at which it is determined whether the option of changing attributes of the selected encoder has been selected, and if so, the process proceeds to "B1" (to FIG. 15) to execute a sub-process of defining encoder attributes.

If it is determined at 508 that the option of changing encoder attributes has not been selected, the sub-process proceeds to step 510 in which an interface allowing user to select a preview option, for previewing a scene to be encoded, is provided. Also in step 510, user input indicative of the selected preview option is received. In the preferred embodiment, step 510 is implemented using the preview button 428 (FIG. 12) of the encoding GUI screen. From step 510, the sub-process proceeds to step 512 at which it is determined whether the preview option has been selected, and if so, the sub-process proceeds to step 513 in which a browser plug-in, showing a scene to be encoded, is displayed. The browser plug-in may be implemented in accordance with any of the variety of well known methods. In step 513, preview commands are transmitted from the administrator terminal 12 (FIG. 1) to the selected encode via the IP network. In response to the preview commands, the selected encoder generates media data associated with a scene to be encoded, and streams the media data back to the administrator terminal. For example, if the selected encoder specifies SERVER_1 (FIG. 1) and camera 24 (FIG. 1), then the camera 24 is activated by SERVER_1 in response to preview commands sent to SERVER_1, and media data is generated by camera 24 (FIG. 1) and transmitted to the administrator terminal 12 (FIG. 1) at which the media data is displayed to the user in a plug-in displayed within a browser window on the display unit 62 (FIG. 2) of the administrator terminal.

From step 513, the sub-process proceeds to step 514 in which an interface allowing the user to select from encoding options is provided. The encoding options include a manual encoding option, and a timed encoding option. Also in step 514, user input indicating a selected encoding option is received. In the preferred embodiment, step 514 is implemented using the manual option button 432 (FIG. 12) and the timed encoding option button 434 (FIG. 12) of the encoding GUI screen. From step 514, the sub-process proceeds to 516 at which it is determined whether the manual encoding option has been selected, and if so, the process proceeds to "B2" (to FIG. 17). Alternatively, if it is determined at 516 that the manual option encoding has not been selected, the sub-process proceeds to step 518 in which an interface, allowing the user to specify scheduling information for timed encoding is provided. Also in step 518, user input including scheduling information for a timed encoding operation is received. In the preferred embodiment, step 518 is implemented using the GUI components of the start group box 435 (FIG. 12) and the stop group box 443 (FIG. 12) of the encoding GUI screen as described above.

FIG. 13B shows a flow diagram illustrating further steps of the encoding sub-process 500 (FIG. 13A). The sub-process proceeds from "B3" (from FIG. 13A) to step 526 in which: an interface allowing the user to select a real time streaming option is provided; and user input indicative of the selected streaming art option is received. In the preferred embodiment, step 526 is implemented using the streaming check box 454 (FIG. 12) of the encoding GUI screen. From step 526, the sub-process proceeds to step 528 at which it is determined whether the real time streaming option has been selected, and if so, the process proceeds to "B4" (to FIG. 18) to execute a sub-process of defining destination locations to which the encoded asset is to be streamed in real time.

Alternatively, if it is determined at 528 that the real time streaming option has not been selected, the sub-process proceeds to step 530 in which: an interface allowing the user to select a record asset option is provided; and also user input, indicative of whether the record asset option has been selected, is received. In the preferred embodiment, step 530 is implemented using the record asset option check box 470 (FIG. 12) of the encoding GUI screen. From step 530, the sub-process proceeds to 532 at which it is determined whether or not the recording option has been selected, and if so, the process proceeds to "B5" (to FIG. 21) to execute a sub-process of specifying a location to which the newly encoded asset is to be stored, as well as providing other recording options including naming the encoded asset, providing a description of the encoded asset, and specifying overwrite options for recording the asset, all of which are described below. Alternatively, if it determined at 532 that the record asset option has not been selected, the process proceeds to step 536 in which commands and parameters associated with scheduled encoding operations, streaming operations (if specified), and recording operations (if specified) are generated. Scheduled encoding commands and associated parameters are generated based on encoding operation information and encoding scheduling information specified by the user via the encoding GUI components 422 through 452 (FIG. 12) of the encoding GUI screen. Streaming commands and associated parameters are generated based on real time streaming operation information specified by the user via the GUI components of the streaming group box 455 (FIG. 12) of the encoding GUI screen. Recording commands and associated parameters are generated based on recording operation information specified by the user via the GUI components 470 through 484 (FIG. 12) of the encoding GUI screen.

From step 536, the process proceeds to step 538 in which the scheduled encoding commands and associated parameters (as well as the streaming and recording commands and associated parameters, if applicable) are transmitted to the selected source encoder. In response to the received commands, the selected source encoder, which is a selected one of the media servers 18, 30 (FIG. 1) executes the specified scheduled encoding operations (as well as the recording and real time streaming operation, if selected, in accordance with the specified operation information and schedule information. From step 538, the process proceeds to "B'" (back to FIG. 4).

Figure 14:
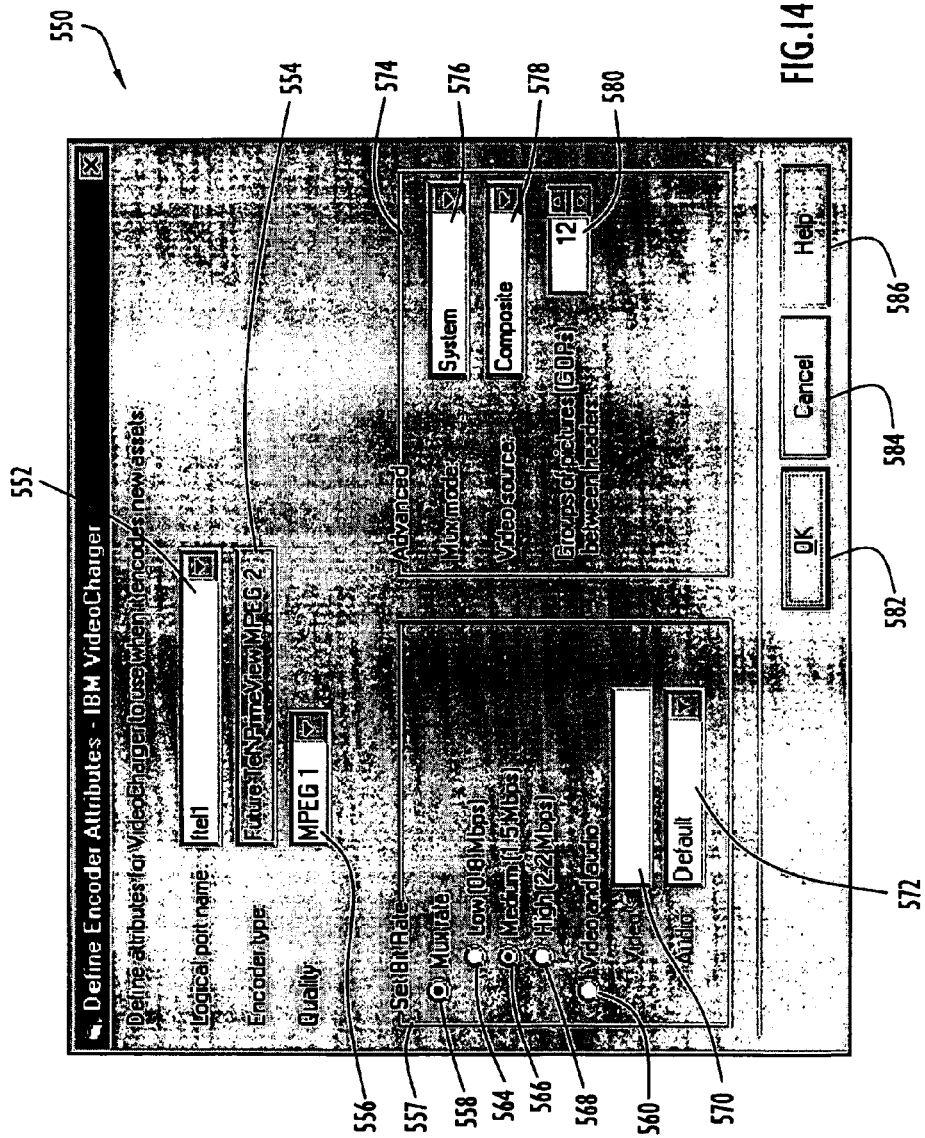
FIG. 14 is a block diagram illustrating a GUI screen in accordance with the present invention for defining encoder attributes.

FIG. 14 shows a block diagram illustrating an encoder attributes defining GUI screen 550 in accordance with the present invention. The screen 550 is displayed upon activation of the encoder attributes button 426 (FIG. 12) of the encoding GUI screen 420 (FIG. 12). The GUI screen 550 includes: a logical port name drop down list 552 allowing the user to select an alias name for the selected encoder; an encoder type display window for displaying graphical information indicative of a type of the selected encoder, the window 554 being non-editable; an encoder quality drop down list 556 allowing the user to select an encoding quality such as MPEG1, MPEG2, and other video encoding types; and a set bit rate box 557 for specifying a bit rate for an encoding operation.

The set bit rate box 557 includes: a mux rate option button 558 which enables a low bit rate option button 564 (0.8 Mbps), a medium bit rate option button 566 (1.5 Mbps), and a high bit rate option button 568 (2.2 Mbps); and a video and audio option button 560 which enables a video label and text box 570, and an audio drop down list 572.

The VideoCharger media server offers a solution for both the Internet environments as well as the Intranet. For the Internet clients, especially the home Internet users which are typically connected via slower network connections, Video-Charger will support the delivery of Low Bit Rate video (LBR). The LBR video is based on the Industry Standard H.263 video and G.723 audio from the video conferencing industry. This technology allows audio and video to be served to home Internet users connected with 28.8 Kb modems. Using ~16 Kb/s, the LBR video will offer 8 KHz 16 bit PCM audio and 160×120 video at 7.5 frames per second. The LBR video can be encoded at higher quality rates to provide higher resolution or more frames per second for those clients which are connected via ISDN modems, cable modems or an Intranet network. For the Intranet environment, the VideoCharger media server provides support for higher quality (and higher bit rate) videos. In this environment, both MPEG-1 and MPEG-2 content can be supported at rates up to 8 Mb/s. Near CD quality single-channel audio is supported at 24 KHz. This flexible support for higher quality video will allow a multitude of applications to be enhanced with video in the Intranet environment. VideoCharger includes transcoders that can convert either Windows AVI or .WAV files into low bit-rate format. The compressed data is stored in a unique file format (.IBA) optimized for UDP protocol.

The GUI screen 550 further includes: an advanced box 574 having a mux mode drop down list 576 for specifying how to combine video and audio data, a video source drop down list 578, and a group of pictures (GOP) spin button 580 providing for the user to select from groups of pictures between headers. The GUI screen 550 further includes: an OK button 582 for making everything okay; a cancel button 584; and a help button 586.

Figure 15:
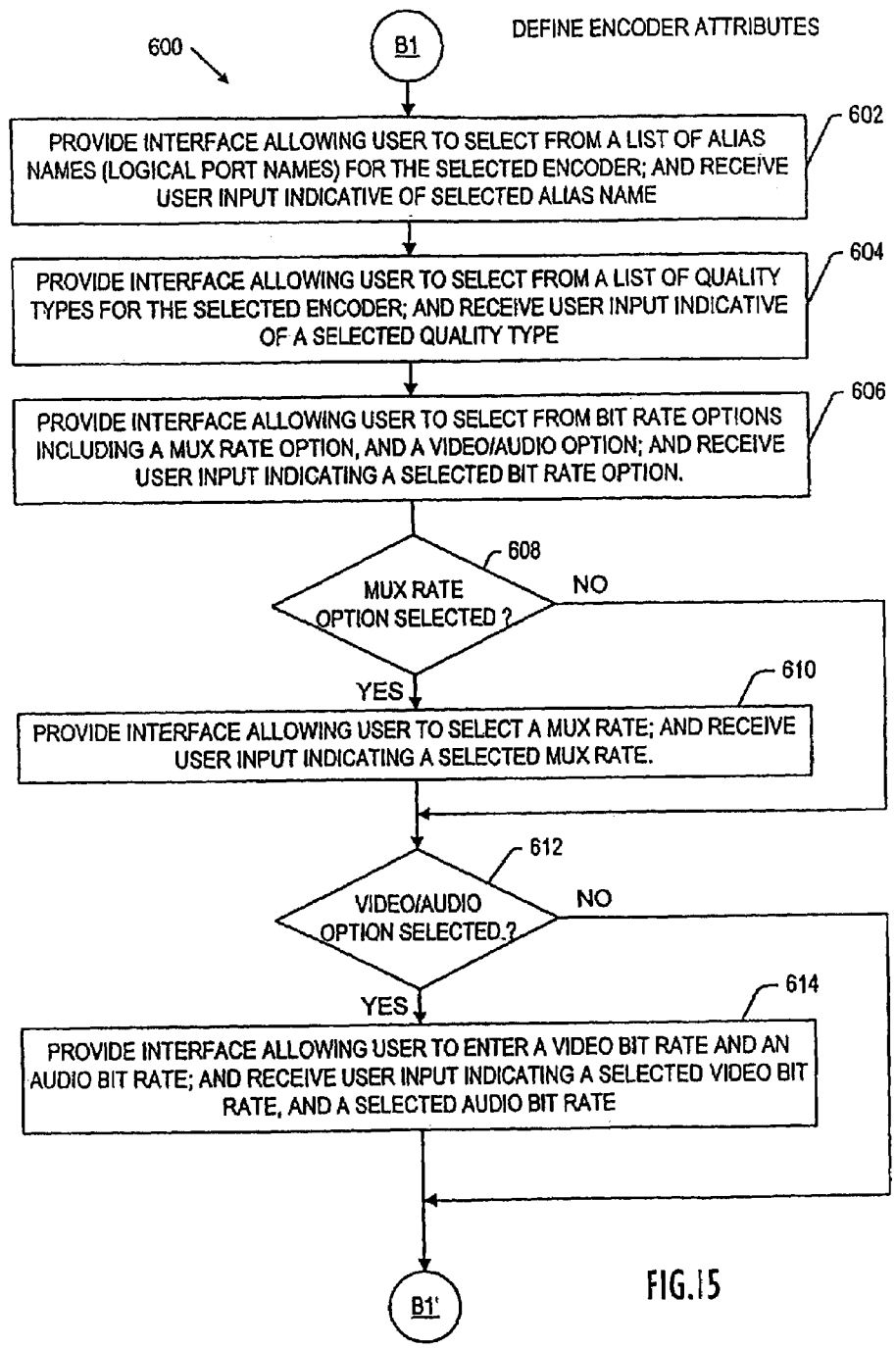
FIG. 15 is a flow diagram illustrating a sub-process of defining encoder attributes using the GUI screen of FIG. 14.

FIG. 15 shows a flow diagram illustrating a sub-process for defining encoder attributes at 600. The depicted sub-process proceeds from "B1" (from FIG. 13A) to step 602 in which an interface, allowing the user to select from a list of alias names (logical port names) for the selected encoder is provided. Also in step 602, user input indicated of the selected alias name is received. In the preferred embodiment, the sub-process 600 is implemented using the encoder attributes GUI screen 550 (FIG. 12). Specifically, step 602 is implemented using the logical port name drop down list 552 (FIG. 12). From step 602, the sub-process proceeds to step 604 in which an interface, allowing the user to select from the list of quality types for the selected encoder, is provided. Also in step 604, user input indicative of a selected quality type is received. In the preferred embodiment, step 604 is implemented using the encoder quality drop down list 556 (FIG. 14).

From step 604, the sub-process proceeds to step 606 in which an interface, allowing a user to select from bit rate options including a mux rate option and a video/audio option, is provided. Also in step 606, user input indicative of a selected bit rate option is received. In the preferred embodiment, step 606 is implemented using the set bit rate box 557 (FIG. 14) in which the user may select the mux rate option button 558 or the video/audio option button 560 (FIG. 14). From step 606, the sub-process proceeds to step 608 at which it is determined whether the mux rate option has been selected, and if so, the sub-process proceeds to step 610 in which an interface allowing the user to select a mux rate, is provided. Also in step 610, user input indicative of the selected mux rate is received. In the preferred embodiment, step 610 is implemented using the low, medium, and high buttons 564, 566, and 568 (FIG. 14) of the GUI screen 550.

Alternatively, if it is determined at 608 that the mux rate option has not been selected, the sub-process proceeds directly to step 612 at which it is determined whether the video/audio option has been selected. If the video/audio option has been selected, the sub-process proceeds to step 614 in which an interface, allowing the user to enter a video bit rate and an audio bit rate value is provided. Also in step 614, user input indicative of a selected video bit rate and a selected audio bit rate is received. In the preferred embodiment, step 614 is implemented using the video rate text box 570 and the audio rate drop down list 572 (FIG. 14). From step 614, the process proceeds to "B1'" (back to FIG. 13A).

Figure 16:
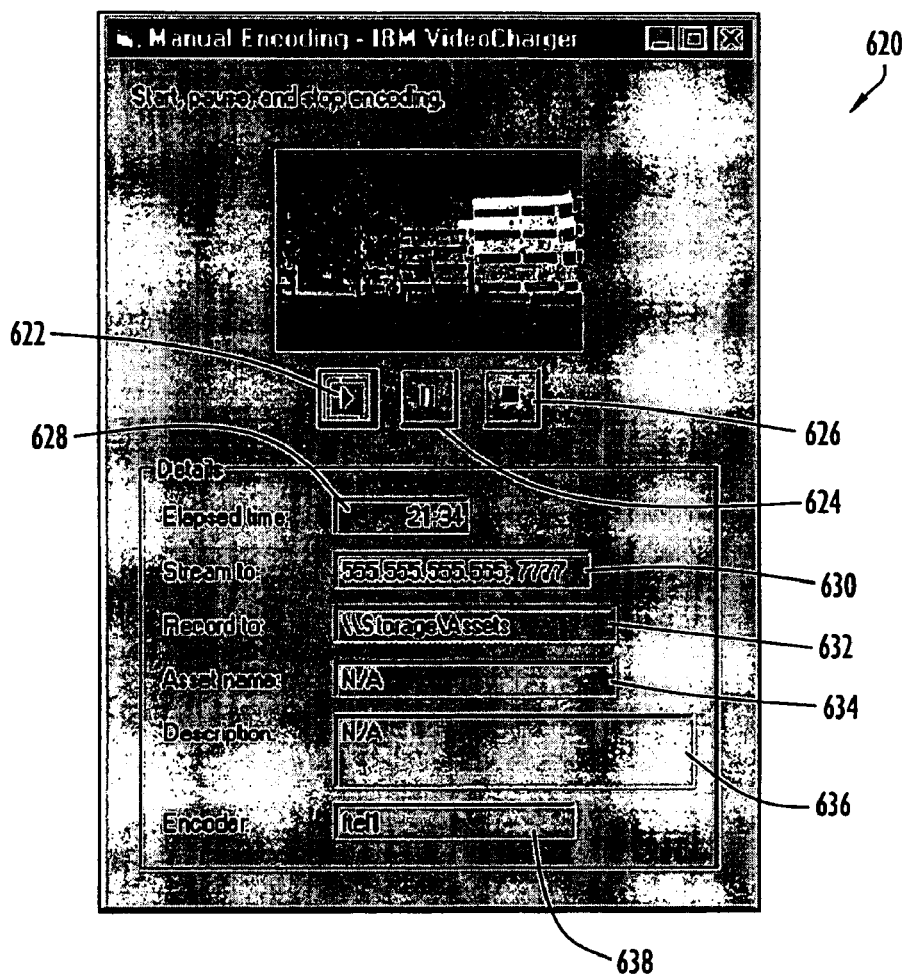
FIG. 16 is a block diagram illustrating a GUI screen for manually and remotely controlling the encoding of a new asset.

FIG. 16 shows a block diagram illustrating a GUI screen 620 for manually encoding a new asset. The GUI screen 620 is activated, and displayed upon selection of the manual option button 432 (FIG. 12) of the encoding asset GUI screen. The manual encoding GUI screen 620 provides an interface allowing for the user to remotely start, pause, and stop encoding of video data at the selected encoder, selected via the encoder drop down list 422 (FIG. 12). In accordance with the GUI process of the present invention, manual encoding commands and associated parameters are generated at the administrator terminal 12 (FIG. 1) and transmitted to the selected encoder via the IP network 16 (FIG. 1). In response to the manual encoding commands, the media streamer application 20 (FIG. 1) of the encoder is operative to start, stop, and pause encoding of media data received from the video camera.

The manual encoding GUI screen 620 includes: a record button 622 for starting encoding of the asset; a pause button 624 for pausing the encoding of the asset; a stop button 626 for stopping the encoding of the asset; an elapsed time window 628 for displaying an elapsed time clock which is running while the asset is being encoded, the elapsed time clock being started, paused, and stopped upon activation of buttons 622, 624, and 626 respectively; a "stream to" window 630 for displaying an IP address and port number to which the encoded asset is being streamed in real time, if applicable; a "record to" window 632 for displaying a path of a location to which the encoded asset is being is recorded to, if applicable; an asset name window 634 for displaying an asset name specified for the encoded asset; a description window 636 for displaying a description of the encoded asset; and an encoder window 638 for displaying a name indicative of the selected encoder.

Figure 17:
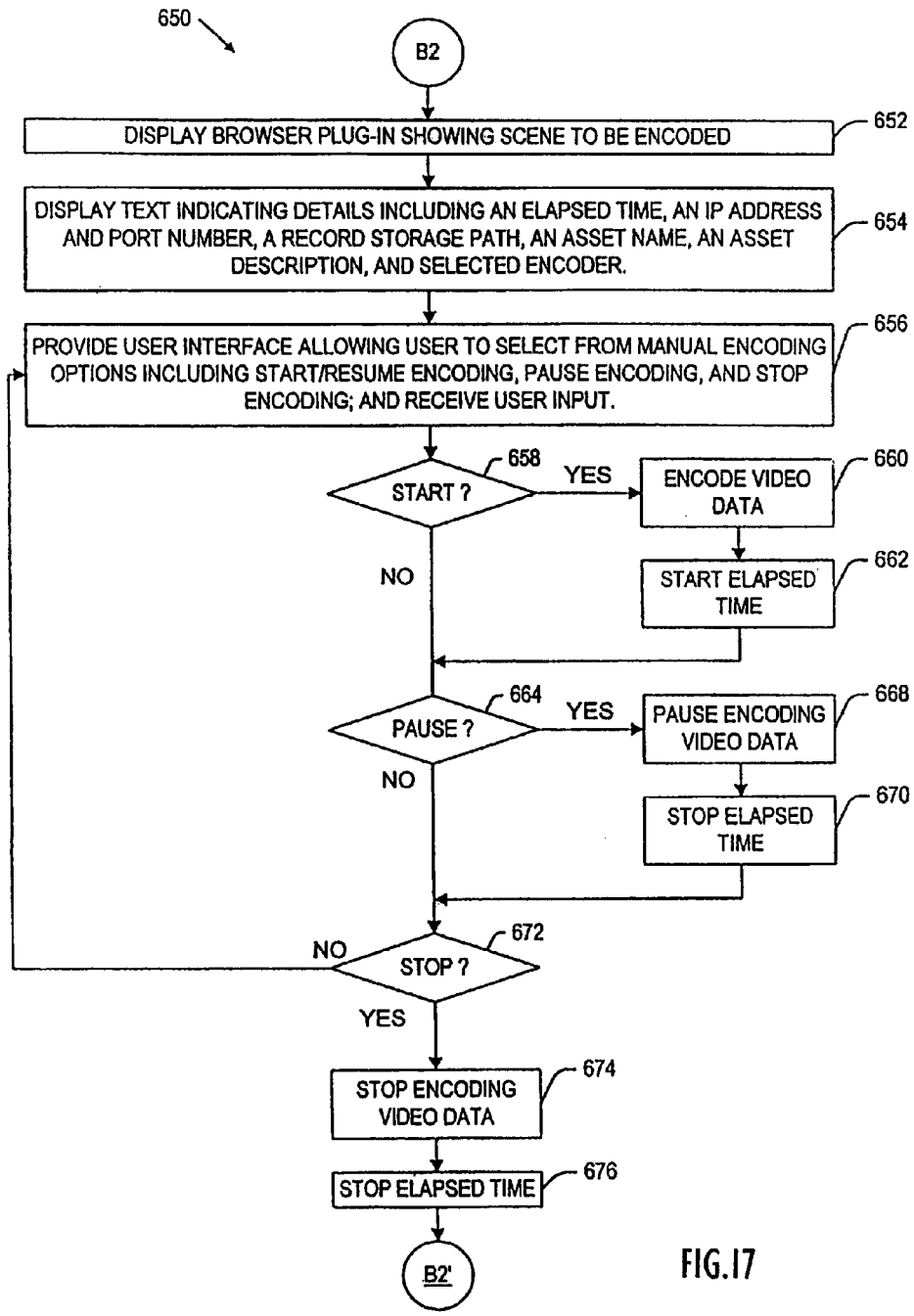
FIG. 17 is a flow diagram illustrating a sub-process of manually controlling the encoding of an asset from a remote location in accordance with the present invention.

FIG. 17 shows a flow diagram illustrating a sub-process at 50 of manually and remotely controlling a process of encoding an asset. The sub-process 50 proceeds from "B2" (from FIG. 13A) to step 652 in which a browser plug-in showing a scene to be encoded is displayed. In the preferred embodiment, the sub-process 650 is implemented using the manual encoding GUI screen 620 (FIG. 16) which is displayed in a browser window displayed on the display device of the administrator terminal 12 (FIG. 1).

From step 652, the sub-process proceeds to step 654 in which text indicating details is displayed. The displayed details include an elapsed time, a destination IP address and port number to which the encoded data is to be streamed in real time, a record storage path location for storing the encoded asset, the asset name, an asset description, and a selected encoder. In the preferred embodiment, step 654 is implemented using the GUI screen 620 which displays the details 628 through 638 (FIG. 16). From step 654, the sub-process proceeds to step 656 in which a user interface, allowing a user to select from manual encoding commands including start/resume encoding, pause encoding, and stop encoding is provided. Also in step 656, a user input indicative of a selected one of the manual encoding commands is received.

From step 656, the sub-process proceeds to 658 at which it is determined whether the start manual encoding option has been selected, and if so, the sub-process proceeds to step 660 in which commands for starting encoding of video data are generated and communicated from the administrator terminal 12 (FIG. 1) to the selected encoder via the IP network (FIG. 1). From step 660, the sub-process proceeds to step 662 in which an elapsed time clock is started. In the preferred embodiment, the elapsed time is displayed in the elapsed time window 628 of the manual encoder GUI screen 620 (FIG. 16).

If it is determined at 658 that the start encoding option has not been selected, the sub-process proceeds to 664 at which it is determined whether the pause encoding option has been selected. If it is determined at 664 that the pause encoding option has been selected, the sub-process proceeds to step 668 in which commands for pausing the process of encoding video data are generated and communicated from the administrator terminal 12 (FIG. 1) to the selected encoder via the IP network (FIG. 1). From step 668, the sub-process proceeds to step 670 in which the elapsed time clock is paused.

If it is determined at 664 that the pause encoding option has not been selected, the sub-process proceeds to 672 at which it is determined whether the stop encoding option has been selected. If it is determined at 672 that the stop encoding option has been selected, the sub-process proceeds to step 674 in which commands for stopping the encoding of video data are generated and communicated from the administrator terminal 12 (FIG. 1) to the selected encoder via the IP network (FIG. 1). From step 674, the sub-process proceeds to step 676 in which the elapsed time clock is stopped.

Figure 18:
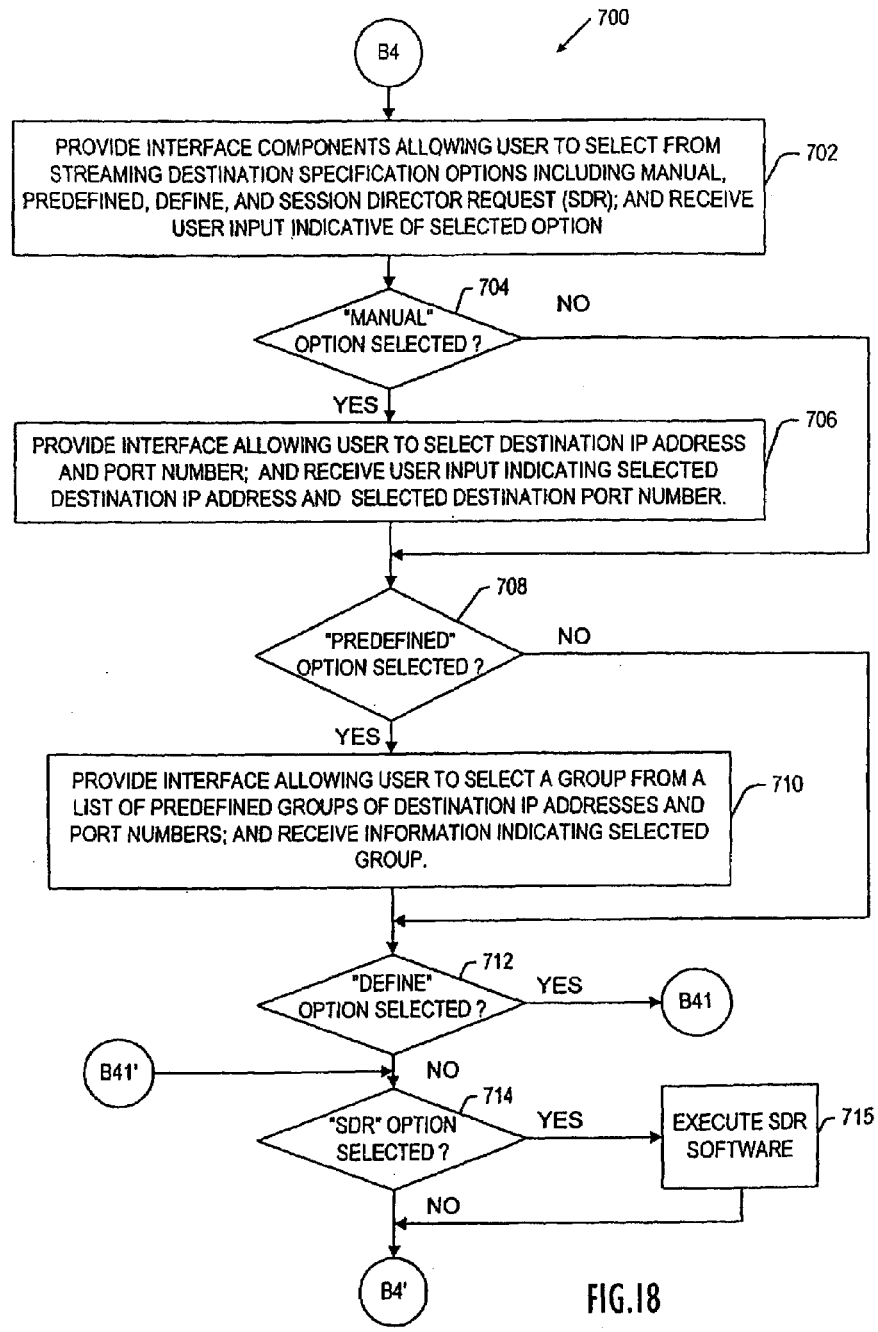
FIG. 18 is a flow diagram illustrating sub-process of defining and scheduling streaming operations in accordance with the present invention.

FIG. 18 shows a flow diagram illustrating a streaming sub-process at 700 in accordance with the present invention. The streaming sub-process 700 proceeds from "B4" (from FIG. 13B) to step 702 in which an interface, allowing the user to select from streaming destination specification options is provided. The destination specification options include a manual option, a predefined option, a define option, and a session director request option. Also in step 702, user input indicative of the selected destination specification option is received. In the preferred embodiment, step 702 is implemented using the IP address window 462 (FIG. 12) and the port number drop down list 464 (FIG. 12). In the preferred embodiment, the sub-process 700 is implemented using the encoding GUI screen 420 (FIG. 12), and in particular, the GUI components of the stream out group box 455 which is enabled by the stream out check box 454 (FIG. 12). The manual option, predefined option, define option, and SDR option may be selected by the user using the manual option button 456, predefined option button 458, define button 468, and SDR button 460 (FIG. 12) respectively.

From step 702, the depicted sub-process proceeds to 704 at which it is determined whether the manual option has been selected, and if so, the sub-process proceeds to step 706 in which an interface, allowing the user to select a destination IP address and port number, is provided. Also in step 706, user input indicative of the selected destination IP address and selected destination port number is received. From step 706, the sub-process proceeds to 708 at which it is determined whether the predefined option has been selected. Also if it is determined at 704 that the manual option has not been selected, the sub-process proceeds directly from 704 to 708. If it is determined at 708 that the predefined option has been selected, the sub-process proceeds to step 710 in which a user interface, allowing the user to select a group from a list of predefined groups of destination IP addresses and port numbers, is provided. Also in step 710, user input indicative of selected groups is received. In the preferred embodiment, step 710 is implemented using the GUI component 466 (FIG. 12) described above.

Figure 20:
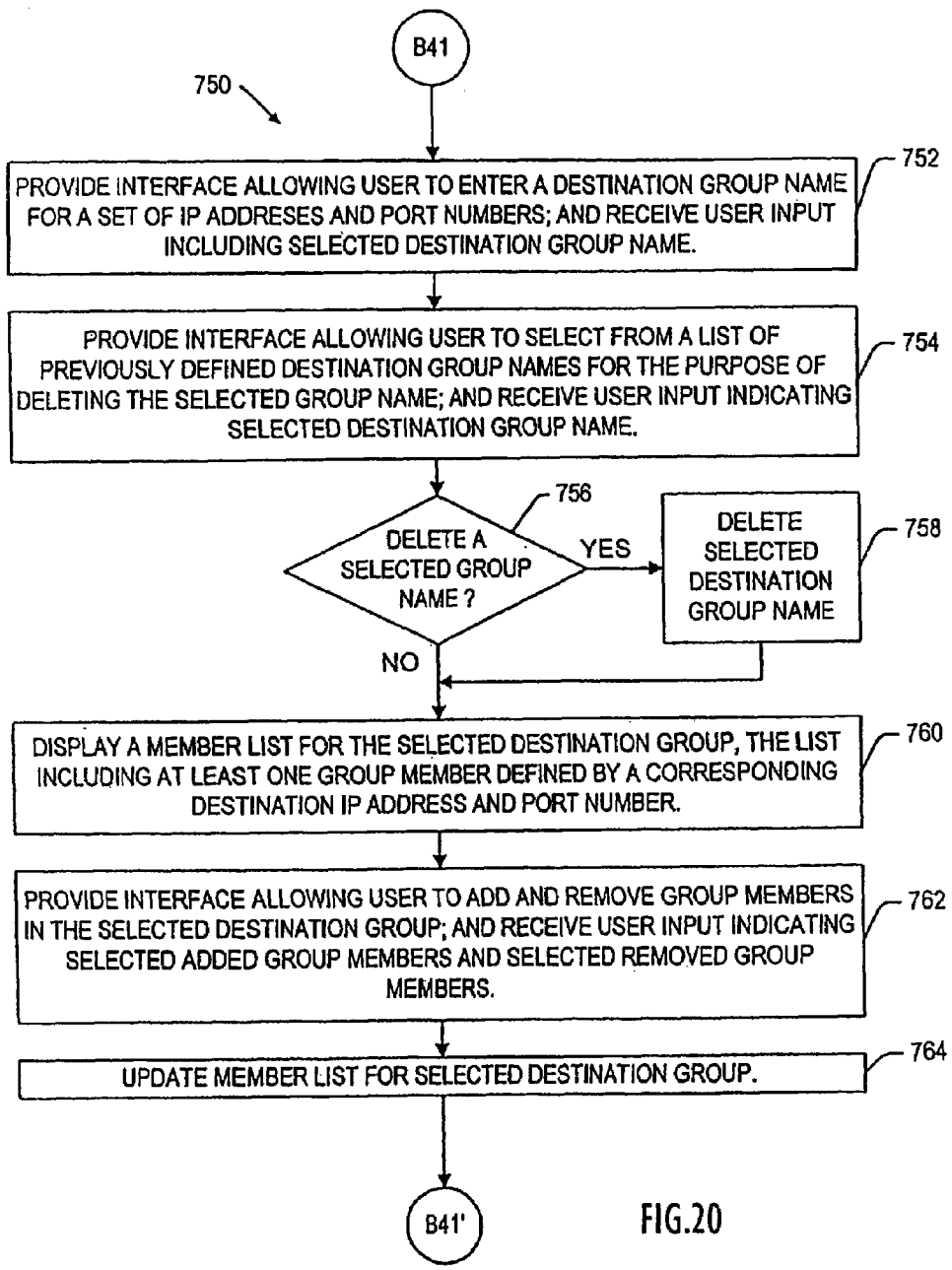
FIG. 20 is a flow diagram illustrating a sub-process of defining the destination group of IP addresses and port numbers using the GUI screen of FIG. 19.

From step 710, and also from 708 in the case that the predefined option has not been selected, the sub-process proceeds to 712 at which it is determined whether the define option has been selected, and if so, the sub-process proceeds to "B41" (to FIG. 20). If is determined at 712 that the define option has not been selected, the sub-process proceeds to 714 at which it is determined whether or not the SDR option has been selected, and if so, the process proceeds to "B42" (to FIG. ?). Alternatively, if it is determined at 714 that the SDR option has not been selected, the process proceeds to step 715 in which session director request software is executed after which the process proceeds to "B4," (back to FIG. 12B).

Figure 19:
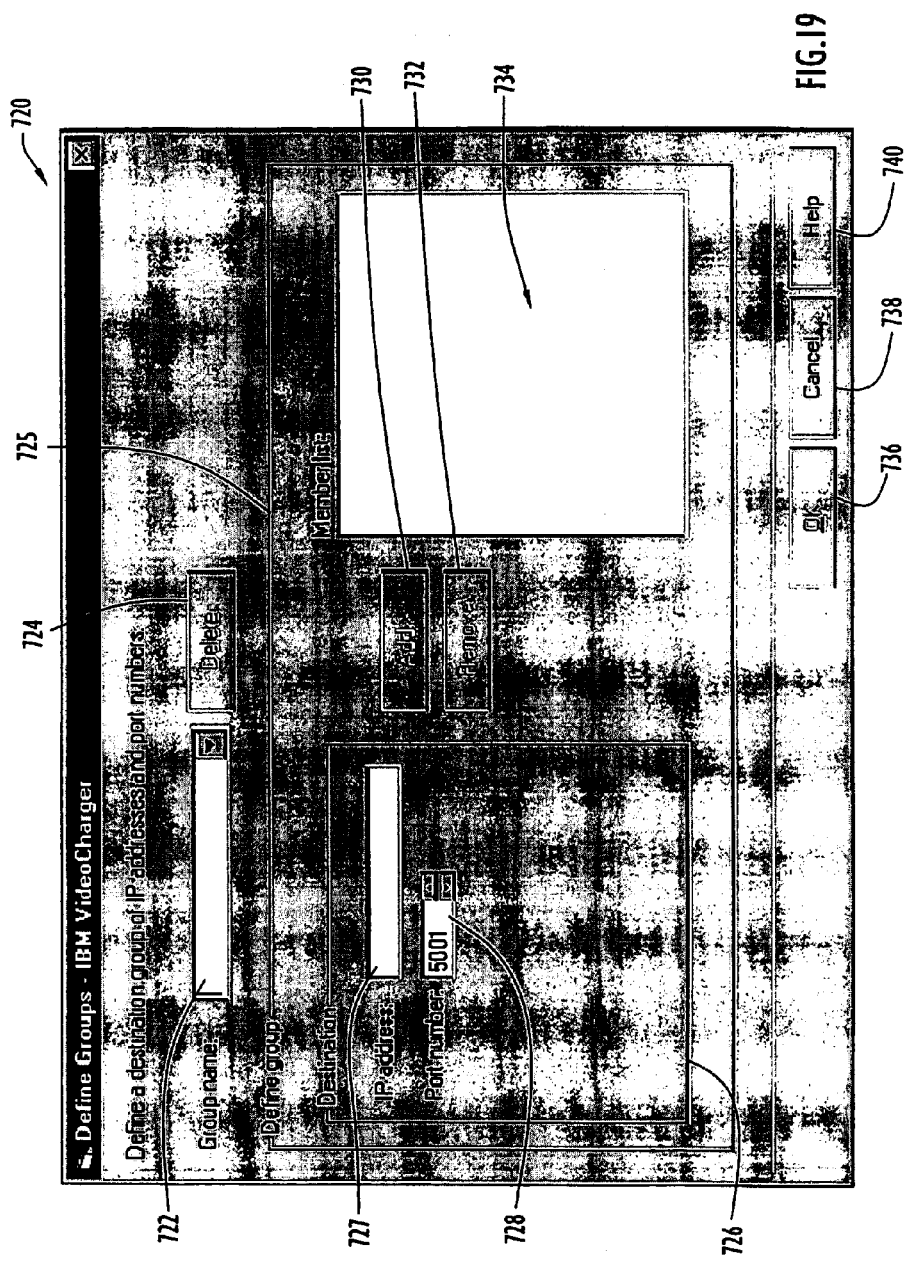
FIG. 19 is a block diagram illustrating a GUI screen for defining a destination group of IP addresses and port numbers for streaming operations.

FIG. 19 shows a block diagram illustrating a GUI screen 720 for defining a destination group of IP addresses and port numbers. The define group GUI screen 720 includes: a group name text box 722 providing for the user to enter a name for set of IP addresses and port numbers; a delete button 724 which is enabled if there are previously defined groups; and a define group box 725.

The define group box 725 includes: a destination group box 726 having an IP address text box 727 providing for the user to enter one destination IP address, the text box 727 enabling an add button as further explained below, and a port number text box 728 having a spin button providing for the user to select a destination port number, the spin button allowing the user to select values limited to a valid range of port numbers reserved for a multicast operation; an add button 730 for adding the IP address and port number specified in text boxes 727 and 728 to a member list, the add button resetting the IP address text box 727 to be blank, thereby disabling the add button; a remove button 732 allowing the user to remove selected members from the member list; a member list box 734 for listing IP addresses and port numbers for each member in a format "123.123.123.123.123;5001"; an OK button 736 for adding a group of IP addresses and port numbers to the list of predefined groups displayed in the drop down list 466; a cancel button 738; and a help button 740. The member list box 734 is multi-selectable (shift-contiguous selection; control-disjoint selection). The remove button 732 removes the selected row of IP addresses and port number from the number list. If the member list is empty, the remove button 732 is disabled.

FIG. 20 shows a flow diagram illustrating a sub-process at 750 for defining a destination group of IP addresses and port numbers for the purpose of defining a streaming operation. The sub-process 750 proceeds from "B41" (from FIG. 18) to step 752 in which a user interface allowing the user to enter a destination group name for a set of IP addresses and port numbers is provided. Also in step 752, user input indicating a selected destination group name is received. In the preferred embodiment, the sub-process 750 is implemented using the define group GUI screen 720 (FIG. 19). Step 752 is implemented using the group name text box 722 (FIG. 19). From step 752, the sub-process proceeds to step 754 in which an interface allowing the user to select from a list of previously defined destination group names for the purpose of deleting a selected group name, is provided. Also in step 754, user input indicative of a selected destination group name is received. In the preferred embodiment, step 754 is implemented using the delete button 724 (FIG. 19).

From step 754, the sub-process 750 proceeds to 756 at which it is determined whether the delete option has been selected, and if so, the sub-process proceeds to step 758 in which the selected destination group name is deleted from a member list. From step 758, the sub-process proceeds to step 760 in which a member list of the selected destination group is displayed, the list including at least one group number defined by a corresponding destination IP address and port number. In the preferred embodiment, the member list is displayed in the member list box 734 (FIG. 19) of the GUI screen for defining groups. From step 760, the sub-process proceeds to step 762 in which an interface, allowing a user to add and remove group members in the selected destination group, is provided. Also in step 762, user input indicative of selected added group members, and selected removed group members is received. In the preferred embodiment, step 762 is implemented using the add and remove button 730 and 732 (FIG. 19) of the GUI screen for defining groups. From step 762, the sub-process proceeds to step 764 in which the member list for the selected destination group is updated. In the preferred embodiment, step 764 is implemented by revising the member list that is displayed in the member list box 734 (FIG. 19). From step 764, the sub-process proceeds to "B41" (back to FIG. 18).

Figure 21:
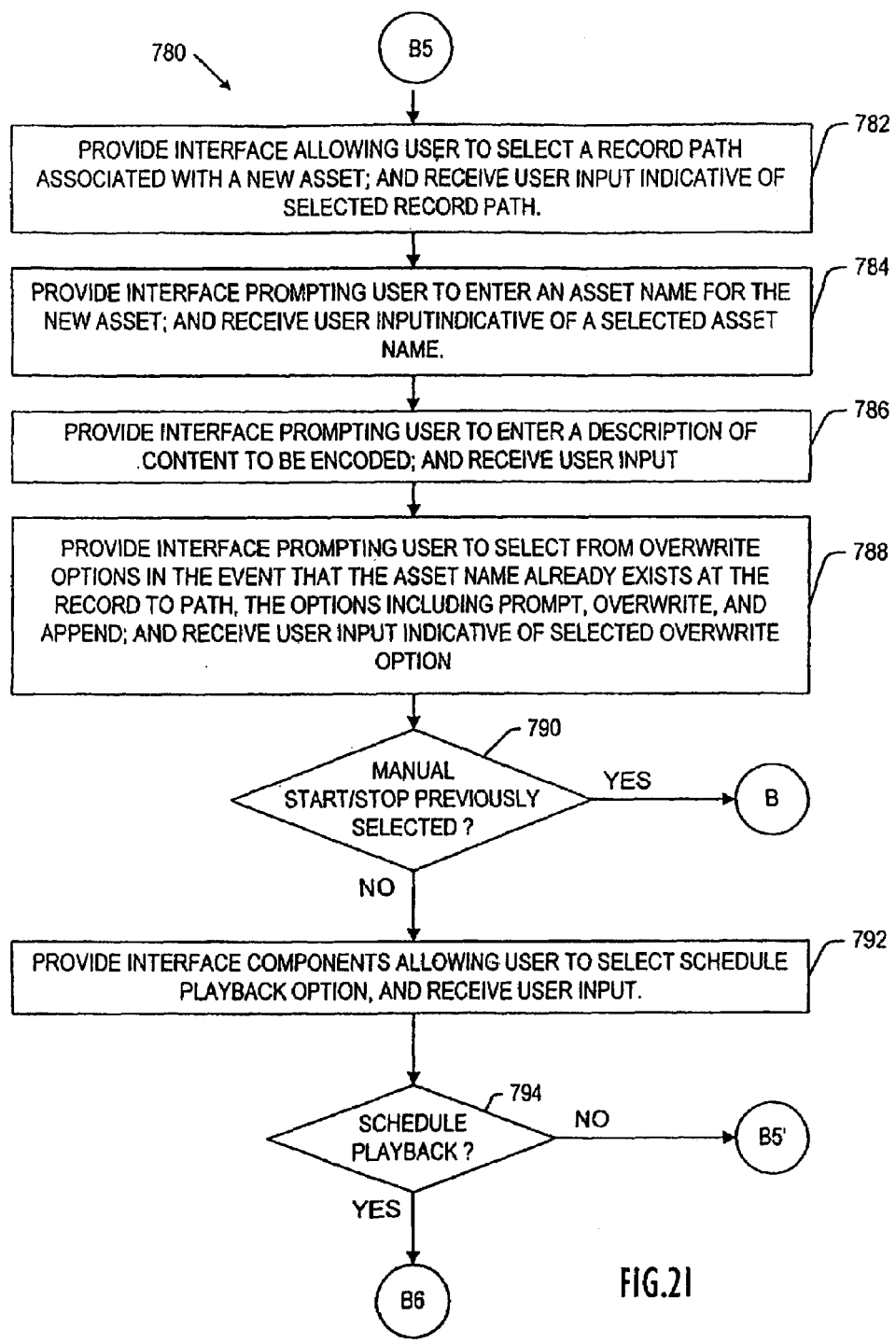
FIG. 21 is a flow diagram illustrating a sub-process of specifying and scheduling a recording operation for recording an asset.

FIG. 21 shows a flow diagram illustrating a sub-process 780 of recording a new asset. The depicted sub-process proceeds from "B5" (from FIG. 13B) to step 782 in which an interface allowing users to select a record path, associated a "record-to" storage unit, is provided, the path indicating a memory storage location for storing the new asset, that is the asset to be encoded and recorded. Also in step 782, user input indicative of a selected record path is received. In the preferred embodiment, the sub-process 780 is implemented using the encoding GUI screen 420 (FIG. 12). Specifically, step 782 is implemented using the "record-to" text box and drop down list 472 of the record asset group box 471 (FIG. 12). From step 782, the sub-process proceeds to step 784 in which an interface prompting the user to enter an asset name for new asset is provided. Also in step 784, user input indicative of a selected asset name is received. In the preferred embodiment, step 784 is implemented using the asset name text box 476 (FIG. 12) of the encoding GUI screen.

From step 784, the sub-process proceeds to step 786 in which an interface prompting the user to enter a description of content to be encoded is provided. Also in step 786 user input indicative of such a description is received. In the preferred embodiment, step 786 is implemented using the description text box 478 (FIG. 12) which provides for the user to enter a description of the asset to be encoded. From step 786, the sub-process proceeds to step 788 in which an interface prompting the user to select from overwrite options for specifying what to do in the event that the asset name already exists at the record to path, is provided. The override options include a prompt option, an override option, and an append option. Also in step 788, user input indicative of a selected overwrite option is received. In the preferred embodiment, step 788 is implemented using the prompt, overwrite, and append buttons 480, 482, and 484 (FIG. 12) of the encoding GUI screen 420 (FIG. 12).

From step 788, the sub-process proceeds to 790 at which it is determined whether the manual start/stop option was previously selected, and if so, the process proceeds back to "B" (back to FIG. 3). In the preferred embodiment, the manual start and stop option, which is selected using the manual option 432 (FIG. 12), precludes the process from executing the remaining steps 792 and 794 which provide for playing back the newly encoded asset as further explained below.

If it is determined at 790 that the manual option has not been selected, the sub-process proceeds to step 792 in which: an interface, allowing the user to select a schedule playback option, is provided; and user input indicative of the schedule playback option is received. From step 792, the sub-process proceeds to 794 at which it is determined whether the schedule playback option has been selected, and if so, the process proceeds to "B6" (to FIG. 23A). Alternatively, if it is determined at 794 that the scheduled playback option has not been selected, the process proceeds to "B5," (back to FIG. 13B).

Figure 22:
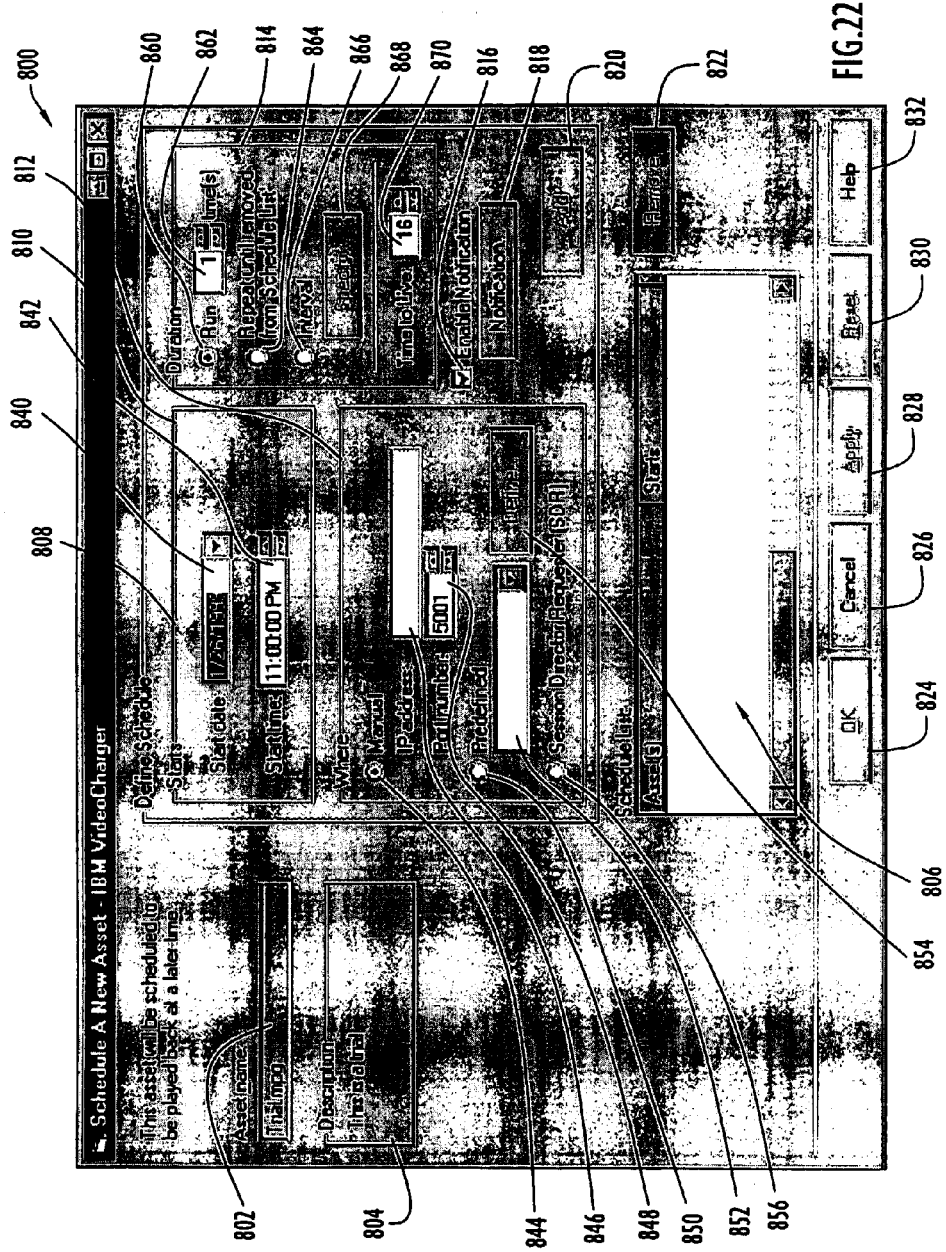
FIG. 22 is a block diagram illustrating a playback scheduling GUI screen.

FIG. 22 shows a block diagram illustrating a playback scheduling GUI screen at 800 for scheduling a playback, or streaming, operation for a newly encoded asset. The GUI screen 800 is activated and displayed upon selection of the schedule playback option button 486 (FIG. 12) of the encoding GUI screen. The GUI screen 800 provides for scheduling an asset to be played back at a later time after encoding of the asset as described above with reference to the encoding GUI screen 420 (FIG. 12). The GUI screen 800 includes: an asset name text box 802 which displays the asset name which is also displayed in the asset name text box 476 (FIG. 12) of the encoding GUI screen, the text box 802 being non-editable; a description text box 804 which is also non-editable, and which displays a description of the asset to be recorded, the description matching the one displayed in the description text box 478 (FIG. 12) of the GUI screen; and a schedule list box 806 for displaying a list of schedule entries, each including graphical information indicative of an asset name for an associated asset, a start date and start time for beginning a play-back schedule for the associated asset, a duration and interval of the play-back schedule, and destination information indicative of a destination or group of destination addresses for the corresponding play-back operation.

The GUI screen 800 also includes a define schedule box 808 including: a start group box 810 providing interface components allowing for the user to define a start date and time for beginning a play-back schedule as further explained below; a destination address group box 812 providing interface components allowing for the user to specify one or more destinations to which the asset is to be streamed in accordance with the play-back operation; a duration group box 814 providing interface components allowing for the user to specify a duration and interval of the play-back schedule as further explained below; an enable notification check box 816 enabling a notification button 818 which is used to activate a GUI screen for defining notification options for notifying selected end users, and selected groups of end users, regarding specified events under selected circumstances; an add button 820 for adding schedule entries to the schedule list 806; a cancel button 826; an apply button 828; a reset button 830; and a help button 832.

The start group box 810 of the define schedule box 808 includes: a start date drop down list 840 providing for the user to select a start date for the playback schedule, and a start time spin button 842 for selecting a starting time for the playback schedule. The destination group box 812 includes: a manual option button 844 which enables an IP address window 846 for entering a destination IP address, and a port number spin button 848 for selecting a destination port number; a predefined option button 850 which enables a predefined drop down list 852 for selecting a predefined group of destination IP addresses and port numbers, and a define button 854 further explained below; and an SDR button 856.

The duration group box 814 includes: a run option button 860 which enables a run time spin button 862 allowing for the user to specify a play-back scheduled defined by a loop count value as further explained below; a repeat option button 864 allowing the user to define the duration of the playback schedule such that the asset is played repeatedly until the schedule entry associated with the asset is removed from the schedule list 806; and an interval option button 866 which enables a specify button 868 for activating another GUI screen for the purpose of specifying an interval play-back schedule as further explained below; and a time to live spin button 870 for specifying a number of routers that the stream can pass through.

Figure 23A:
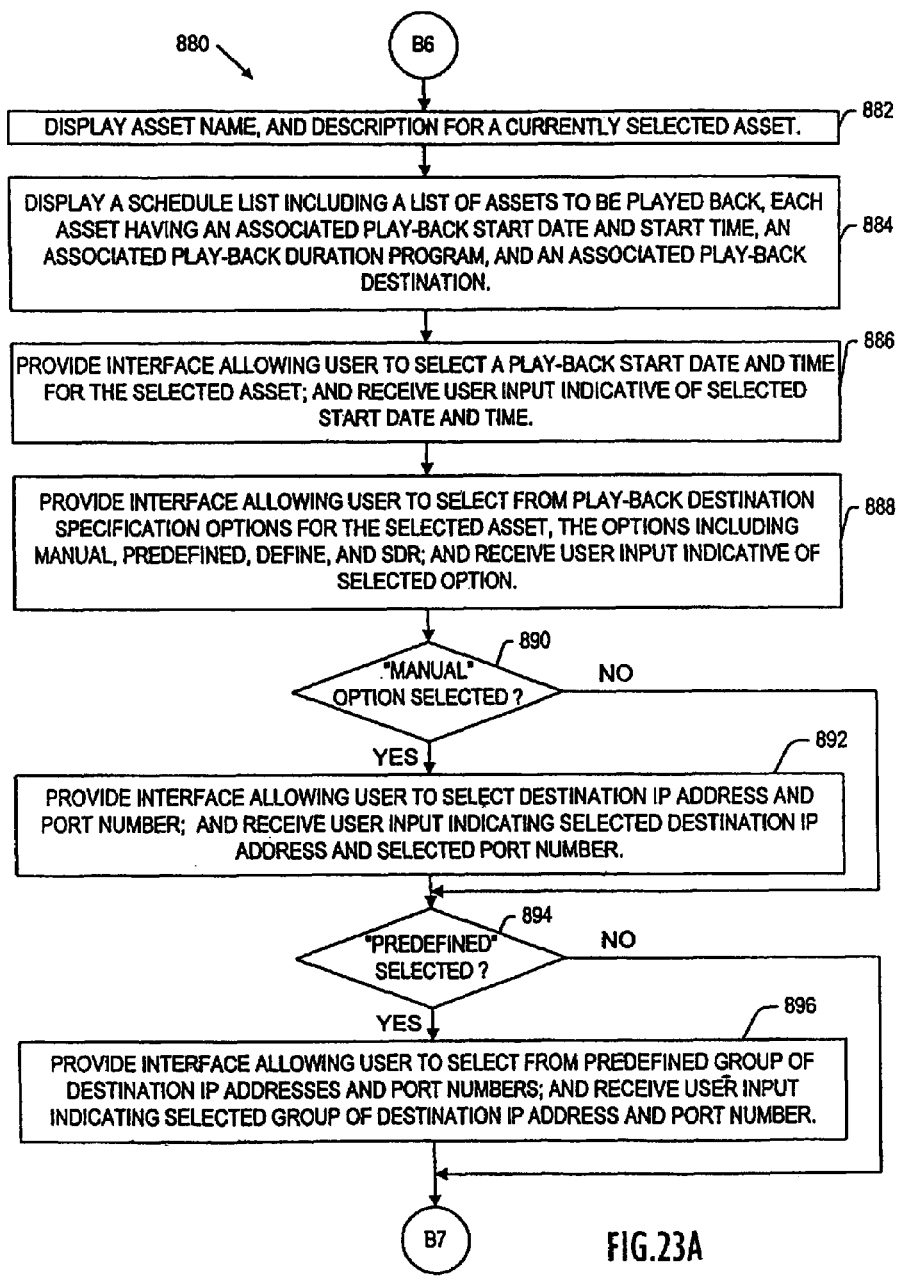
FIGS. 23A through 23D are flow diagrams illustrating a play-back sub-process for defining and scheduling a streaming operation for streaming a new asset using the scheduling GUI screen of FIG. 22.

FIG. 23A shows a flow diagram illustrating a sub-process at 880 for scheduling playback of a new asset. The depicted sub-process proceeds from "B6" (from FIG. 21) to step 882 in which an asset name and description associated with a currently selected asset is displayed. In the preferred embodiment, the sub-process 880 is implemented using the GUI screen 800 (FIG. 22). From step 882, the sub-process proceeds to step 884 in which a schedule list is displayed. The schedule list includes: a list of assets to be played back, each asset having an associated playback start date and start time, an associated playback duration program, and an associated playback destination. In the preferred embodiment, the schedule list is implemented by the schedule list box 806 of the scheduling GUI screen 800 (FIG. 22). From step 884, the sub-process proceeds to step 886 in which an interface, allowing the user to select a playback start date and start time for the selected asset, is provided. Also in step 886, user input indicative of the selected start date and start time is received. In the preferred embodiment, step 886 is implemented using the start schedule group box 810 (FIG. 22) of the play-back scheduling GUI screen. From step 886, the sub-process proceeds to step 888 in which an interface, allowing the user to select from playback destination specification options for the selected asset, is provided. The destination specification options include: a manual option, a predefined destination option, a define destination option, and a session director requester (SDR) option. Also in step 888, user input indicative of the selected destination specification option is received. In the preferred embodiment, step 888 is implemented using the destination specification group box 812 (FIG. 22) of the play-back scheduling GUI screen.

From step 888, the sub-process proceeds to 890 at which it is determined whether the manual destination specification option has been selected, and if so, the sub-process proceeds to step 892 in which an interface, allowing the user to select a destination IP address and destination port number, is provided. Also in step 892, user input indicative of the selected destination IP address and selected port number is received. In the preferred embodiment, step 892 is implemented using the IP address text box 846 and the port number spin button 848 (FIG. 22) of the play-back scheduling GUI screen.

Alternatively, if it is determined at 890 that the manual destination specification option has not been selected, the sub-process proceeds from 890 to 894 at which it is determined whether the predefined destination specification option has been selected, and if so, the sub-process proceeds to step 896 in which an interface, allowing the user to select from predefined groups of destination IP addresses and port numbers, is provided. Also in step 896, user input indicative of the selected group of destination IP addresses and port numbers is received. From step 896, the process proceeds to "B7" (to FIG. 23B).

Figure 23B:
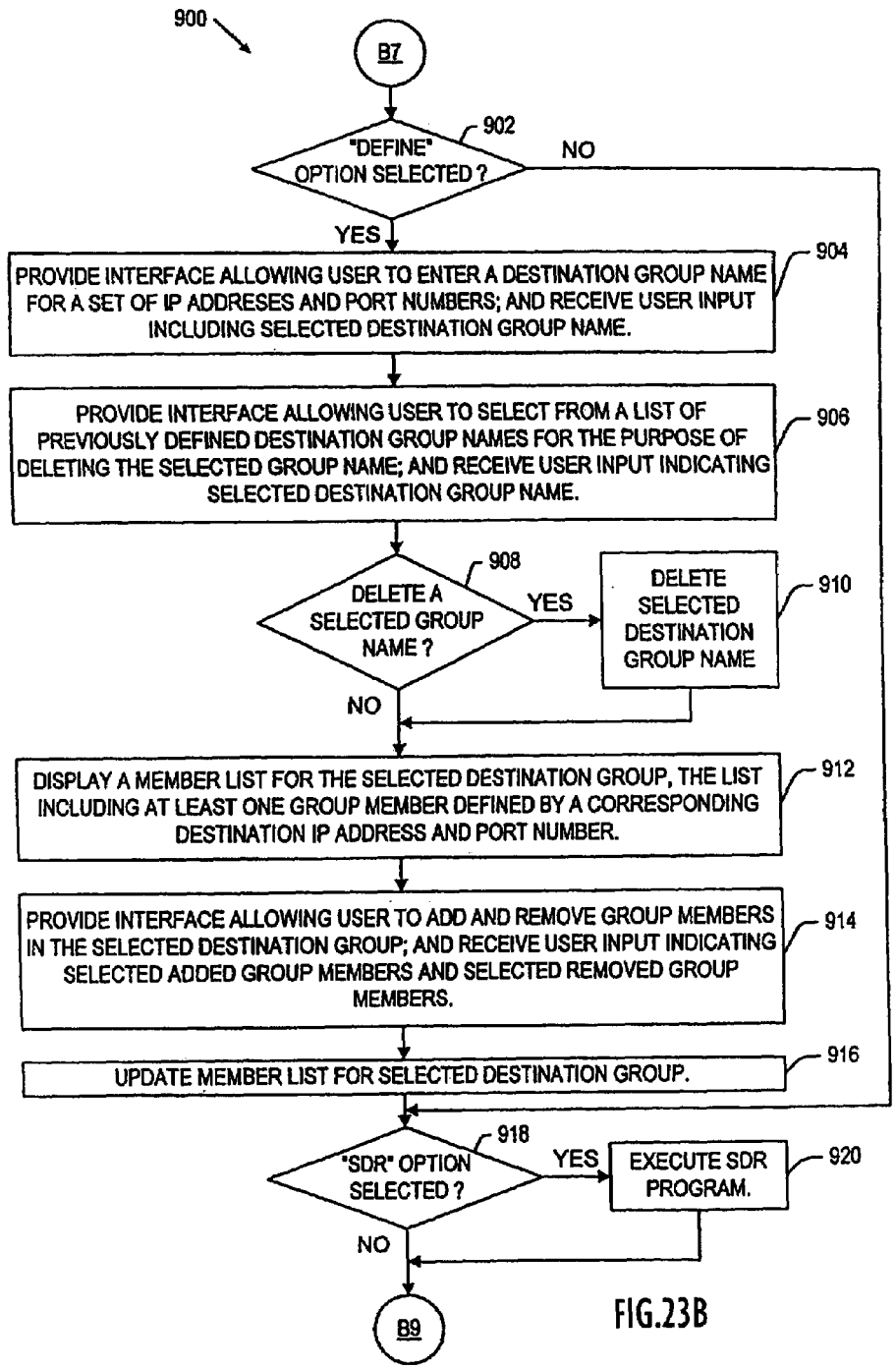

FIG. 23B shows a flow diagram illustrating further steps of the sub-process 880 (FIG. 23A) for scheduling playback of an asset. The depicted sub-process proceeds from "B7" (from FIG. 23A) to 902 at which it is determined whether the define option has been selected, and if so, the sub-process proceeds to step 904. In step 904, an interface allowing the user to enter a destination group name for a set of IP addresses and port numbers, is provided. Also in step 904, user input including the selected destination group name is received. In the preferred embodiment, step 904 is implemented using the define groups GUI screen 720 (FIG. 19). From step 904, the sub-process proceeds to step 906 in which an interface, allowing the user to select from a list of previously defined destination group names for the purpose of deleting the selected group name is provided. Also in step 906, user input indicative of the selected destination group name is received. In the preferred embodiment, step 906 is implemented using the remove button 732 of the define groups GUI screen 720 (FIG. 19). From step 906, the sub-process proceeds to 908 at which it is determined whether a selected group name is to be deleted, and is so, the sub-process proceeds to step 910 in which the selected destination group name is deleted.

In step 912, a member list for the selected destination group is displayed. The list includes at least one group member defined by a corresponding destination IP address and port number. In the preferred embodiment, the member list is implemented using the member list box 734 (FIG. 19). From step 912, the sub-process proceeds to step 914 in which an interface, allowing the user to add and remove group members in the selected destination group, is provided. Also in step 914, user input indicative of the selected added group members and selected removed group members is received. In step 916, the member list for the selected destination group is updated. From step 916, and also from 902 if it is determined that the define option has not been selected, the sub-process proceeds to step 918 at which it is determined whether the SDR option has been selected. If it is determined at 918 that the SDR option has been selected, the sub-process proceeds to step 920 to execute the SDR program, after which the process proceeds to "B9" (to FIG. 23C).

Figure 23C:
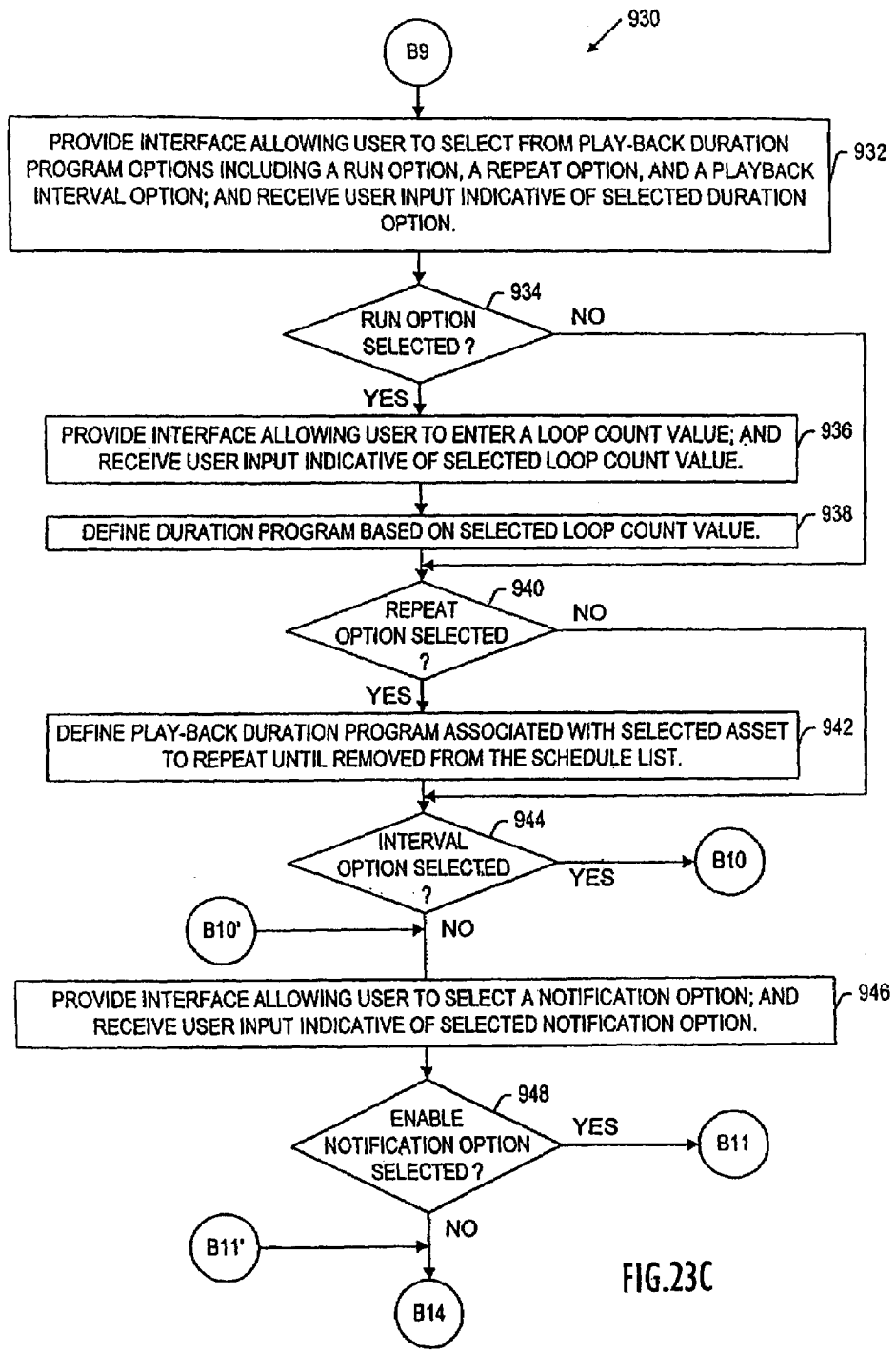

FIG. 23C shows a flow diagram illustrating a sub-process at 930 for defining the duration of a play-back schedule for a play-back of an asset. The depicted proceeds from "B9" (from FIG. 23B) to step 932 in which an interface, allowing the user to select from playback schedule duration specification options, is provided. The playback schedule duration specification options include a run option, a repeat option, and a playback interval option. Also in step 932, user input indicative of the selected duration option is received. In the preferred embodiment, step 932 is implemented using the duration box 814 (FIG. 22) of the scheduling GUI screen 800 which includes the run option button 860, the repeat until removed option button 864, and the interval option button 866. From step 932 the sub-process proceeds to step 934 at which it is determined whether the run option has been selected, and if so, the sub-process proceeds to step 936. In step 936, an interface allowing the user to enter a loop count value is provided. The loop count value indicates a number of times that the asset is to be played back. Also in step 936, user input indicative of the selected loop count value is received. In the preferred embodiment, step 936 is implemented using the spin button 862 (FIG. 22) of the scheduling GUI screen 800. In step 938, a duration program is defined based on the selected loop count value selected in step 936.

If it is determined at 934 that the run option has not been selected, the sub-process proceeds from 934 to 940 at which it is determined whether the repeat option has been selected. If it is determined at 940 that the repeat option has been selected, the sub-process proceeds to step 942 in which a playback duration program associated with the selected asset is defined to repeat until removed from the schedule list 806 (FIG. 22).

If it is determined at 940 that the repeat option has not been selected, the sub-process proceeds to 944 at which it is determined whether the interval option has been selected, and if so, the process proceeds to "B10" (to FIG. 25) to execute a sub-process of defining a playback interval for playing back the to be encoded asset. Alternatively, if it is determined at 944 that the interval option has not been selected, the sub-process proceeds to step 946.

In step 946, an interface allowing the user to select a notification option is provided. Also in step 946, user input indicative of the selected notification option is received. In the preferred embodiment, step 946 is implemented using the enable notification check box 816 (FIG. 22). From step 946, the sub-process proceeds to step 948 at which it is determined whether the notification option has been selected, and if so, the process proceeds to "B11" (to FIG. 27). Alternatively, if it is determined at 948 the notification option has not been selected, the process proceeds to "B14" (to FIG. 23D).

Figure 23D:
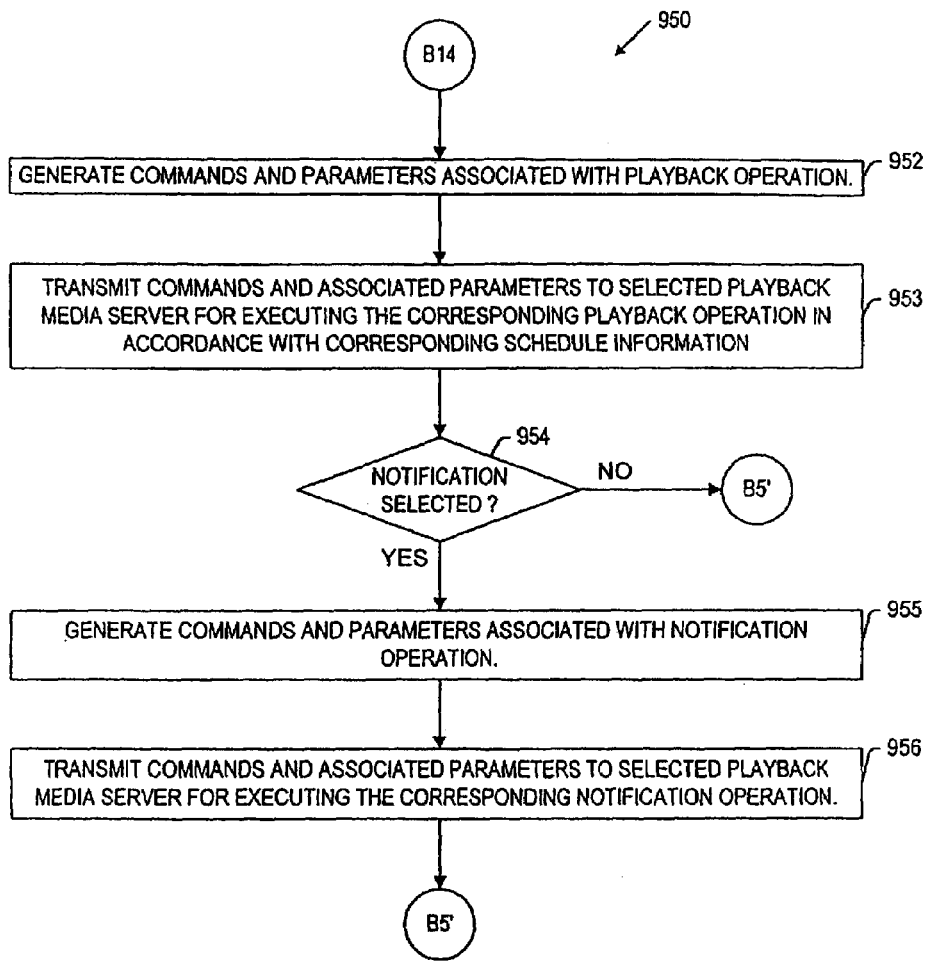

FIG. 23D shows a flow diagram illustrating a sub-process at 950 illustrating further steps of the sub-process 880 (FIG. 23A) for scheduling playback of a new asset. The depicted proceeds from "B14" (from FIG. 23C) to step 952 in which a set of play-back commands and associated parameters is generated for each defined play-back action. Each set of play-back commands and parameters is generated based on: play-back schedule information including the play-back start date and start time defined for the associated play-back action, and the play-back duration program defined for the associated play-back action; and the associated play back-destinations defined for the associated play-back action. From step 952, the sub-process proceeds to step 953 in which the commands and associated parameters associated with each of the play-back actions are transmitted from the administrator terminal 12 (FIG. 1) to the corresponding selected play-back media server for executing a corresponding play-back operation in accordance with the play-back schedule information.

For example, in the preferred embodiment, a set of play-back commands and parameters is transmitted from the administrator terminal to a selected play-back media server associated with the "record-to" location selected using the "record-to" drop down list and window 472 (FIG. 12). The set of play-back commands and parameters programs the selected encoder to execute play-back operations beginning on the play-back start date and start time specified using the start box 810 (FIG. 22), in accordance with a play-back schedule specified by the user via the GUI components of the duration box 814 (FIG. 22). Each iteration of the play-back operation includes: reading the new asset from the "record-to" location specified using the "record-to" drop down list and window 472 (FIG. 12); and streaming the asset to the play-back destination locations specified by the user via the destination specification box 812 (FIG. 22) of the play-back scheduling GUI screen.

Figure 26:
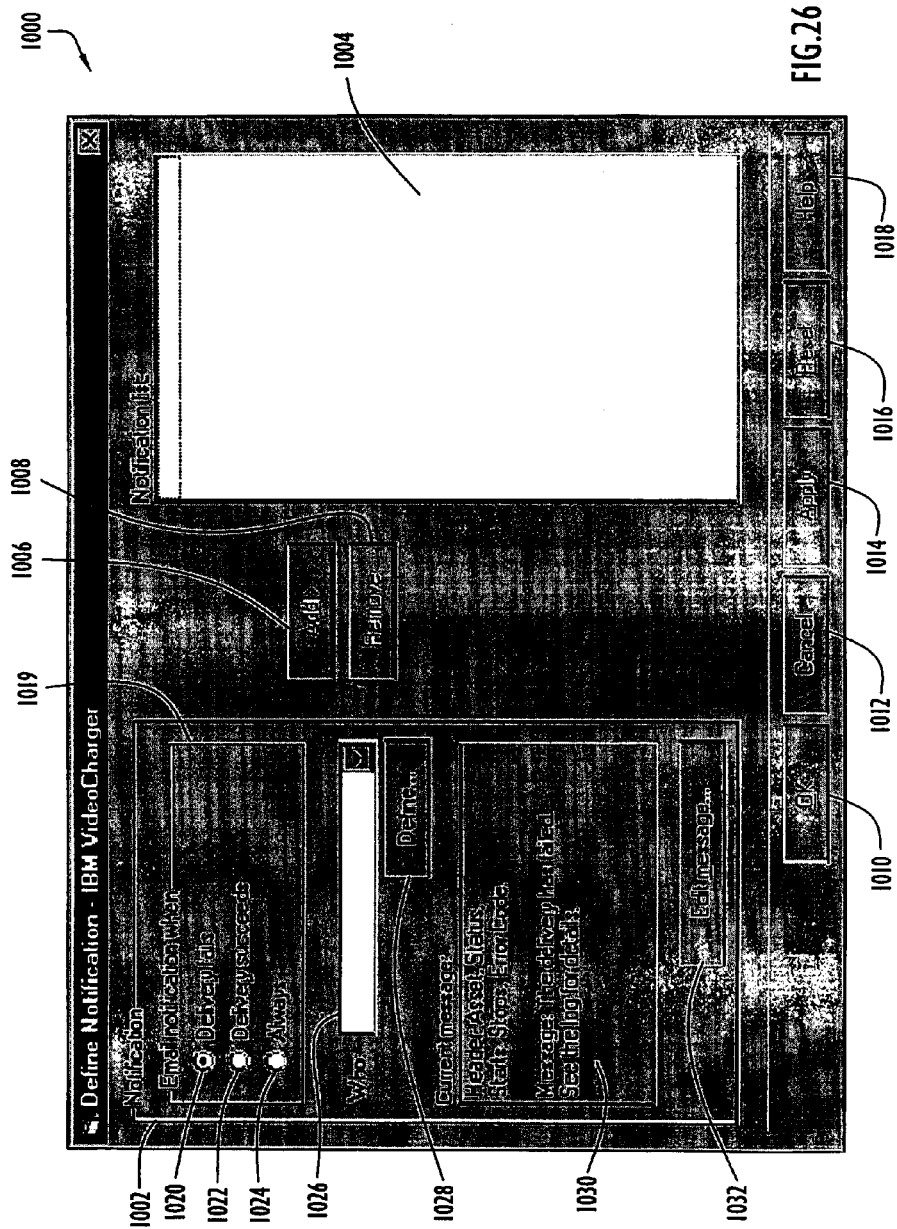
FIG. 26 is a block diagram illustrating a GUI screen for defining notification e-mail messages to be sent to selected end users upon detection of a selected event associated with streaming operations.
Figure 27:
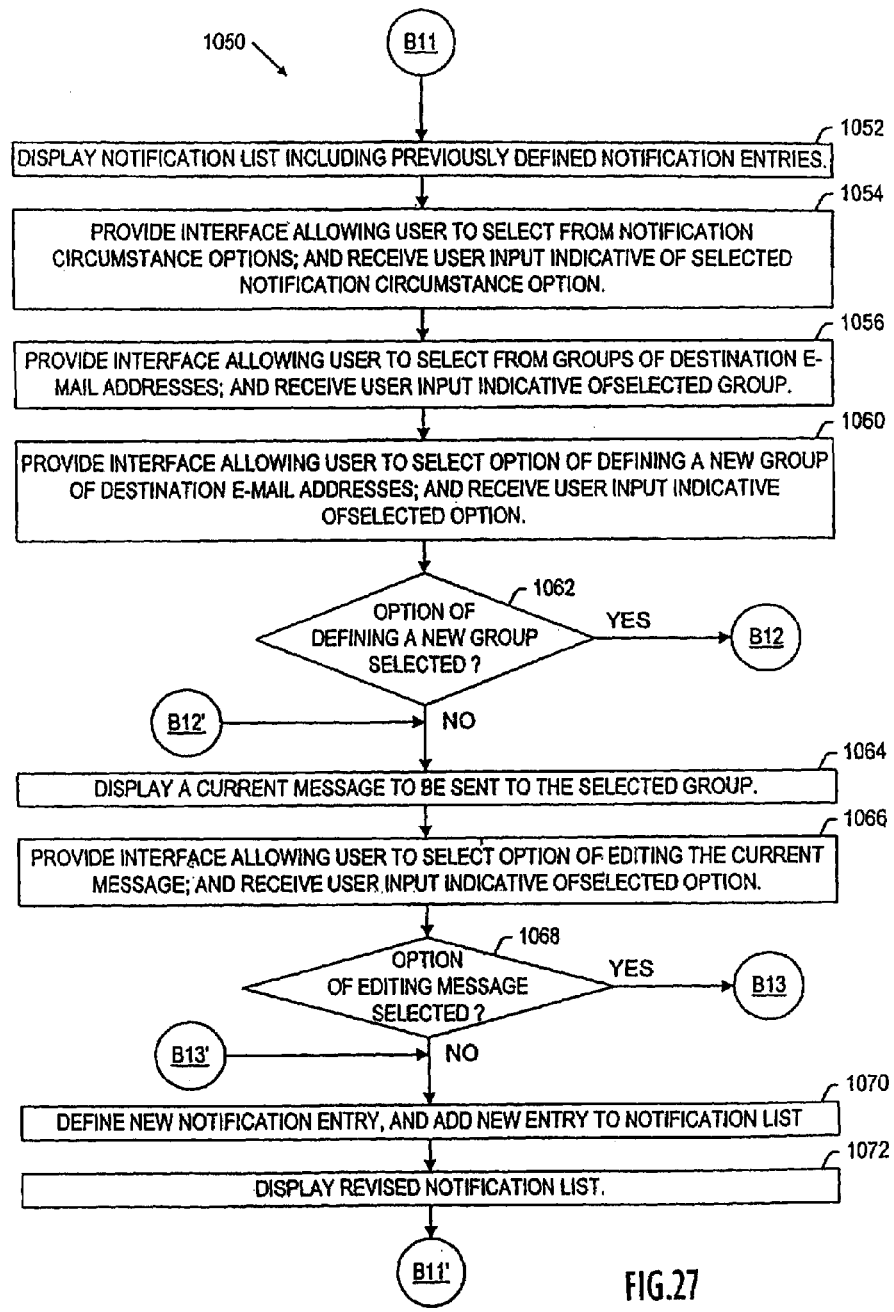
FIG. 27 is a flow diagram illustrating a process of specifying events for which notification e-mail messages are to be sent to selected end users.

From step 953, the sub-process proceeds to step 954 in which it is again determined whether the notification option has been selected, and if not, the process proceeds to "B5'" (to FIG. 27). In the preferred embodiment, step 954 is implemented using the enable notification check box 816 (FIG. 22). Alternatively, if it is determined at 954 that the notification option has been selected, the sub-process proceeds to step 955 in which a set of notification commands and associated notification parameters is generated for each defined notification action. Each set of notification commands and notification parameters is generated based on user input received in response to GUI screens for defining selected circumstances under which selected notification messages are to be provided to selected end users as further described below with respect to figs. 26 though 30. From step 955, the sub-process proceeds to step 956 in which the notification commands and associated notification parameters associated with each of the play-back actions are transmitted from the administrator terminal 12 (FIG. 1) to the corresponding selected play-back media server for executing a corresponding notification operation.

Figure 24:
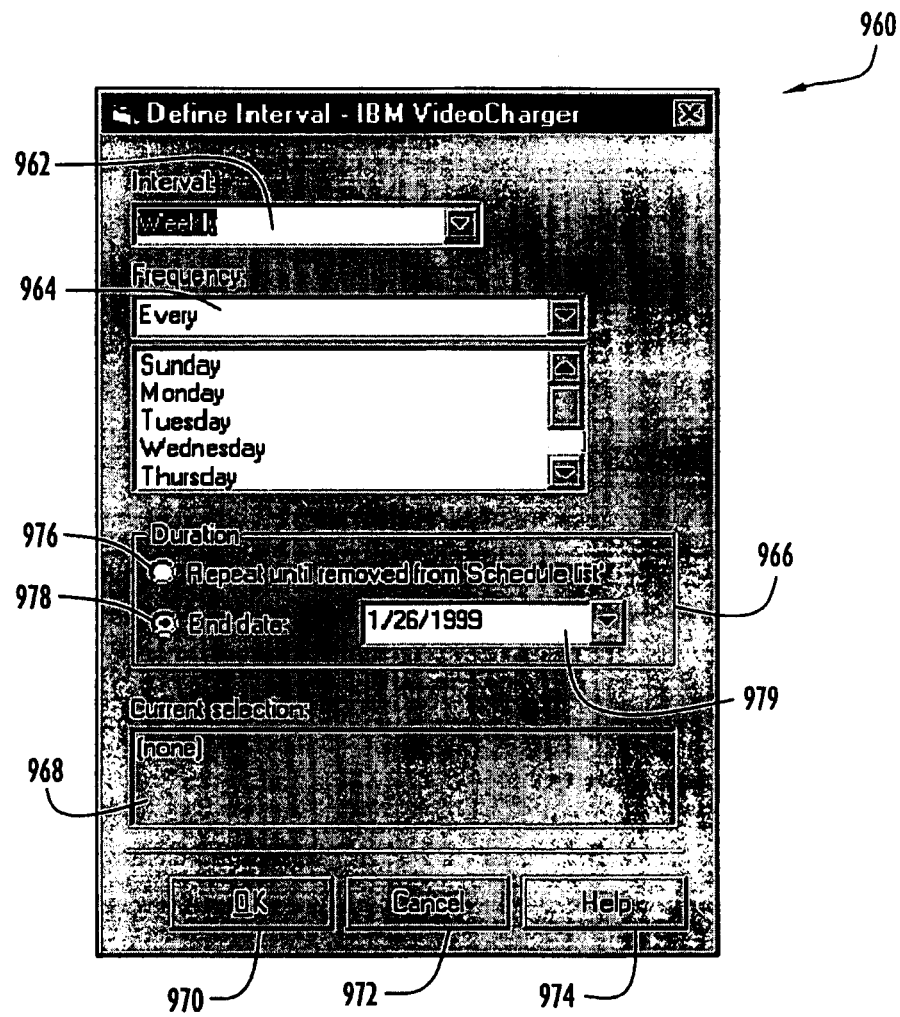
FIG. 24 is a block diagram illustrating a GUI screen for defining an interval for a playback schedule.

FIG. 24 shows a block diagram illustrating a GUI screen 960 for defining an interval for a playback schedule. The GUI screen 960 is displayed, and activated, upon activation of the interval option button 866 (FIG. 22). The GUI screen 960 includes: an interval drop down list 962 for selecting an interval from intervals including hourly, daily, weekly, monthly (dates), monthly (days), and yearly; a frequency drop down list 964 allowing the user to select a value associated with the selected interval (i.e., if the selected interval is weekly, the frequency drop down list allows the user to select one of the seven days of the week); a duration box 966 for defining a time at which the defined interval is to end as further explained below; a current selection text box for displaying the current selection at 968; an OK button 970; a cancel button 972; and a help button 974. The duration box 966 includes: a repeat option button 976 for specifying that the interval is to repeat until removed from the schedule list; and an end date option button 978 which enables a drop down date picker 979 for allowing the user to specify an end date. In the preferred embodiment, the drop down date picker 979 activates a selectable calendar GUI screen as further explained below.

Figure 25:
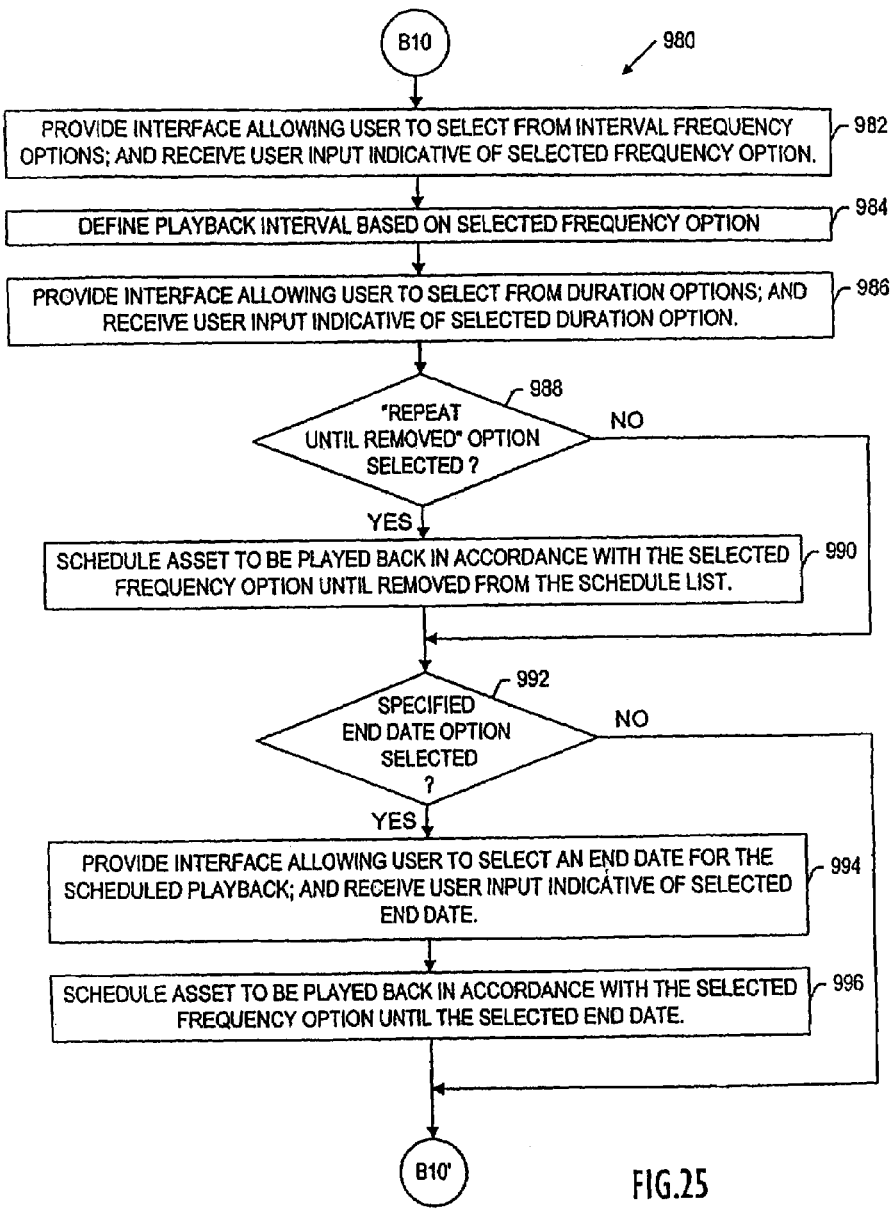
FIG. 25 is a flow diagram illustrating a sub-process for defining a playback schedule interval using the screen of FIG. 24.

FIG. 25 shows a flow diagram illustrating a sub-process at 980 for defining a playback schedule interval. The sub-process 980 proceeds from "B10" (from FIG. 23C) to step 982 in which an interface, allowing the user to select from interval frequency options, is provided. Also in step 982, user input indicative of the selected frequency option is received. In the preferred embodiment, sub-process 980 is implemented using the define interval GUI screen 960 (FIG. 24). Specifically, step 982 is implemented using the interval drop down list 962 (FIG. 24) and the frequency drop down list 964 (FIG. 24) of the define interval GUI screen. From step 982, the sub-process proceeds to step 984 in which a playback interval is defined based on the interval frequency options selected in step 982. For example, the user may select the weekly interval in the interval drop down list 962 (FIG. 24), and the "every Sunday" frequency using the drop down list 964 (FIG. 24).

From step 984, the sub-process proceeds to step 986 at which an interface, allowing the users to select from duration options, is provided. Also in step 986, user input indicative of the selected duration option is received. In the preferred embodiment, step 986 is implemented using the duration box 966 (FIG. 24) of the defined interval GUI screen 960. From step 986, the sub-process proceeds to step 988 at which it is determined whether the repeat option has been selected. In the preferred embodiment, the repeat option is selected by activating the repeat option button 976 (FIG. 24). If it is determined at 988 that the repeat option has been selected, the sub-process proceeds to step 990 in which an asset is scheduled to be played back in accordance with the selected frequency option, selected in step 982, until removed from the schedule list.

Alternatively, if it is determined at 988 that the repeat option has not been selected, the sub-process proceeds to step 992 in which it is determined whether the end date option has been selected, and if so, the sub-process proceeds to step 994. In step 994, an interface, allowing the user to select an end date for the scheduled playback, is provided. Also in step 994, user input indicative of the selected end date is received. In the preferred embodiment, the end date is selected by the user using the drop down list 979 (FIG. 24).

From step 994, the sub-process proceeds to step 996 in which an asset to be played back in accordance with the selected frequency option until the selected end date. From step 996, the process proceeds back to "B10"' (back to FIG. 23C).

FIG. 26 shows a block diagram illustrating a GUI screen 1000 for defining notification e-mail messages to be sent to selected persons, and users, in predefined circumstances. The GUI screen 1000 is activated, displayed, upon activating the notification button 818 (FIG. 22) of the asset scheduling GUI screen. The GUI screen 1000 includes: a notification box 1002 having user interface means for defining the circumstances under which e-mail notification is to be sent, specifying destination end users to whom the e-mail messages are to be sent, and defining and editing the contents of the messages to be sent; a notification list window 1004 which displays a list of persons, or end users, to who are to be notified; an add button 1006 for adding notification entries defined using the notification box 1002 to the notification list 1004; a remove button 1008 for removing selected notification entries from the notification list 1004; an OK button 1010; a cancel button 1012; and a apply button 1014; a reset button 1016; and a help button 1018.

The notification box 1002 includes: a notification circumstances option window 1019 having a plurality of option buttons for defining circumstances under which e-mail notification is to be provided to selected persons, the notification option buttons including a delivery fails option button 1020 for specifying an e-mail is to be sent to selected persons when streaming of the asset fails, a deliver succeeds button 1022 specifying that notification are to be sent to the selected persons upon success of (??), and an always notification option button 1024 specifying that e-mail messages are to be sent to the selected persons in the event of failure or success; a drop down list 1026 allowing the user to select who they want an e-mail notification sent to (groups?); a define button 1028 for activating a define groups GUI screen for defining groups of e-mail addresses as further explained below; a current message text box 1030 which is a non-editable for displaying the e-mail message to be sent to the selected destination addresses; and an edit message button 1032 for activating an edit message GUI screen for editing the current message to be sent as further explained below.

FIG. 27 shows a flow diagram illustrating a sub-process at 1050 of providing a user interface allowing a user to define circumstances under which notification e-mail messages are to be sent to selected persons, user interface also allowing the user to draft and edit the e-mail messages and select the destination e-mail addresses to which the messages are to be sent. In the preferred embodiment, the sub-process 1050 is implemented using the GUI screen 1000 (FIG. 26). The depicted sub-process proceeds from "B11" (from FIG. 23C) to step 1052 in which a notification list including previously defined notification entries is displayed. In the preferred embodiment, the notification list is implemented using the notification list box 1004 (FIG. 26) of the define notification GUI screen. From step 1052, the sub-process proceeds to step 1054 in which an interface, allowing the user to select from notification circumstance options, is provided. Also in step 1054 user input indicative of a selected notification circumstance option is received. In the preferred embodiment, step 1054 is implemented using the notification circumstance option window 1019 (FIG. 26) which provides for the user to select from the options of sending e-mail notification messages when delivery fails, when delivery succeeds, and when delivery fails or succeeds, that is always. From step 1054, the sub-process proceeds to step 1056 in which an interface, allowing the user to select from groups of destination e-mail addresses, is provided. Also in step 1056, user input indicative of a selected group is received. In the preferred embodiment, step 1056 is implemented using the drop down list 1026 (FIG. 26) which provides a list of predefined groups of destination e-mail addresses.

From step 1056, the sub-process proceeds to step 1060 in which an interface, allowing the user to select an option of defining a new group of destination e-mail addresses, is provided. Also in step 1060, user input indicative of the selected option is received. From step 1060, the sub-process proceeds to 1062 at which it is determined whether the option of defining a new group has been selected, and if so, the process proceeds to "B12" (to FIG. 29) to execute a sub-process of defining a group of destination e-mail addresses as further explained below.

Alternatively, if it is determined at 1062 that the option of defining a new group has not been selected, the sub-process proceeds to step 1064 in which a current message to be sent to the selected group is displayed. In the preferred embodiment, the current message is displayed in the current message window 1030 (FIG. 26). From step 1064, the sub-process proceeds to step 1066 in which an interface, allowing the user to select the option of editing the current message, is provided. Also in step 1066 user input indicative of the user's response to the option is received. In the preferred embodiment, the option of editing the messages provided by the edit message box 1032 (FIG. 26). From step 1066, the sub-process proceeds to step 1068 at which it is determined whether the option of editing the message has been selected, and if so, the process proceeds to "B13" (to FIG. 31) to execute a sub-process of providing a user interface for editing the message to be sent. Note that the current message box 1030 is not editable.

In step 1070, a new notification entry is defined based on the user selected notification circumstances, selected notification destination e-mail addresses, and the contents of the current message. Also in step 1070, the new notification entry is added to the notification list. From step 1070, the sub-process proceeds to step 1072 in which the revised notification list is displayed. In the preferred embodiment, the revised notification list is displayed in the notification list box 1004 (FIG. 26). From step 1072, the process proceeds back to "B11" (back to FIG. 23C).

Figure 28:
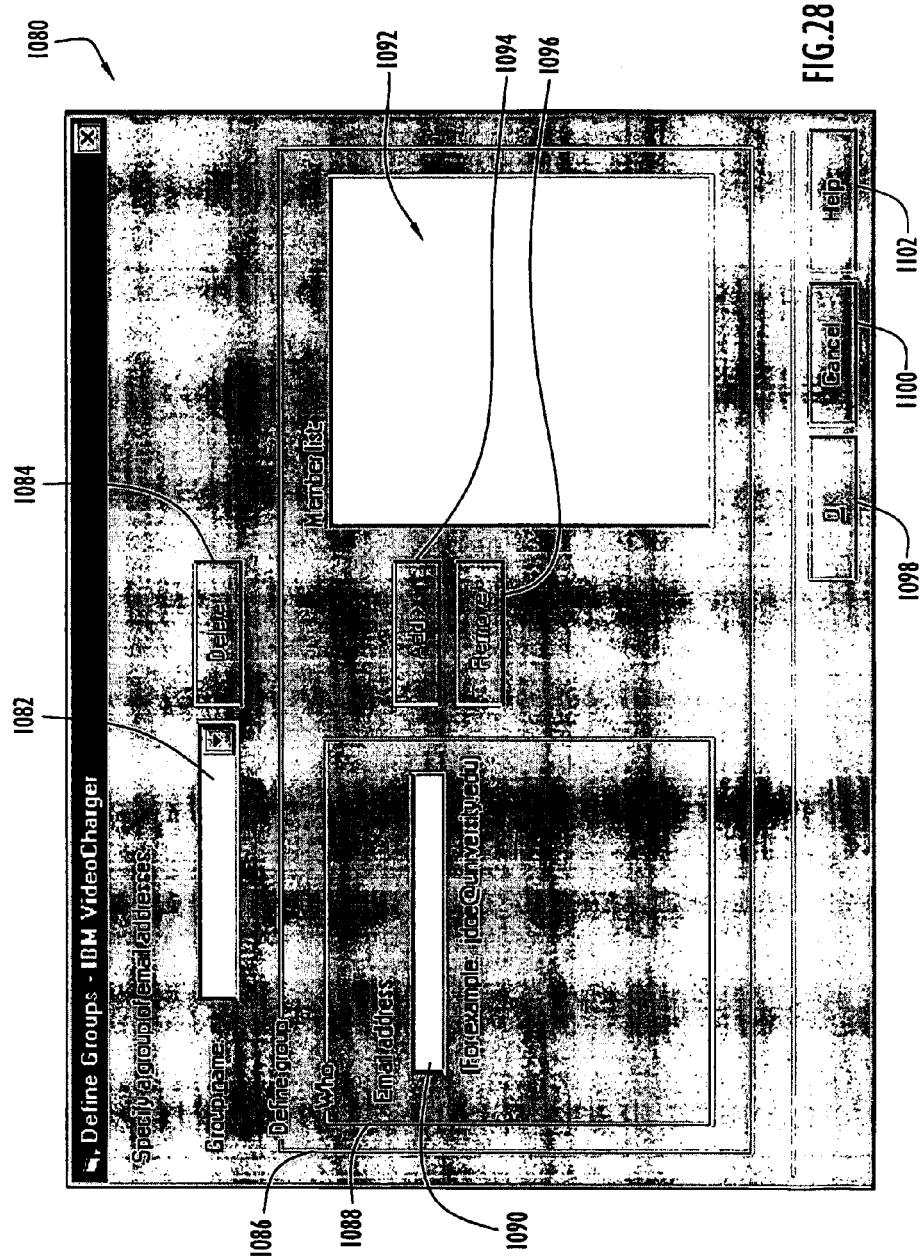
FIG. 28 is a block diagram illustrating a GUI screen for defining groups of destination e-mail addresses for the purpose of sending notification messages to the destination addresses.

FIG. 28 shows a block diagram illustrating a GUI screen 1080 for defining groups of destination e-mail addresses for the purpose of sending notification messages to the destination addresses. The GUI screen 1080 is displayed and activated upon activation of the define button 1028 (FIG. 26) of the define notification GUI screen. The GUI screen 1080 includes: a group name text box 1082 providing for the user to enter a name for a set of e-mail addresses; a delete button 1084 which is enable if there are previously defined groups listed in the drop down list 1082, the delete button providing for deleting a selected group name including the e-mail addresses associated with the selected group name; a define group box 1086 providing user interface means used for defining a set of e-mail addresses associated with the group name displayed in the group name text box 1082.

The defined group box 1086 includes: an e-mail address text box 1090 providing for the user to enter a destination e-mail address; a member list box 1092 for displaying a list of e-mail addresses associated with the group name displayed in the group name text box 1082, the member list box being multi-selectable; an add button 1094 for adding the destination e-mail address listed in the address box 1090 to the member list displayed in the member list box 1092; a remove button 1096 for removing selected ones of the e-mail addresses listed in the member list from the member list; an OK button 1098; a cancel button 1100; and a help button 1102.

Figure 29:
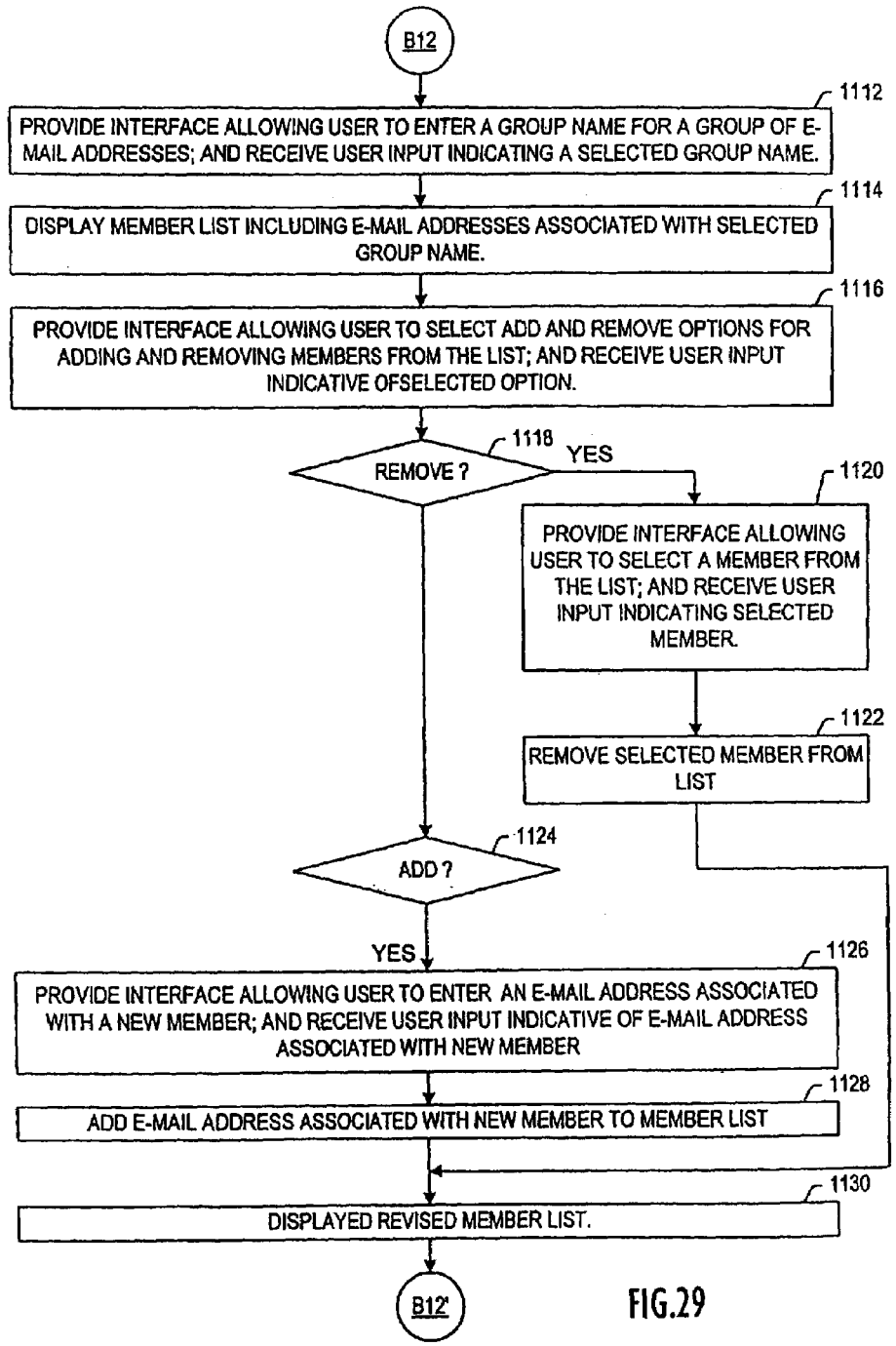
FIG. 29 is a flow diagram illustrating a sub-process of defining a group of destination e-mail addresses.

FIG. 29 shows a flow diagram illustrating a sub-process at 1110 for defining a group of destination e-mail addresses for the purpose of sending notification messages to the group. In the preferred embodiment, the sub-process 1110 is implemented using the define groups GUI screen 1080 (FIG. 28). The sub-process 1110 proceeds from "B12" (from FIG. 27) to step 1112 in which an interface, allowing the user to enter a group name for a new group of e-mail addresses, is provided. Also in step 1112, user input indicative of a group name is received. In the preferred embodiment, step 1112 is implemented using the group name text box and drop down list 1082 (FIG. 28). From step 1112, the sub-process proceeds to step 1114 in which the member list including e-mail addresses associated with the selected group name is displayed. In the preferred embodiment, the member list is displayed in the member list box 1092 (FIG. 28). From step 1114, the sub-process proceeds to step 1116 in which an interface, allowing the user to select add and remove options for adding and removing members from the current member list, is provided. Also in step 1116, user input indicative of the selected add/remove option is received. In the preferred embodiment, step 1116 is implemented using the add and remove buttons 1094 and 1096 (FIG. 28) of the define groups GUI screen. From step 1116, the sub-process proceeds to 1118 at which it is determined whether the remove option has been selected, and if so, the sub-process proceeds to step 1120 in which a user interface, allowing the user to select a member from the member list, is provided. Also in step 1120, user input indicative of the selected member is received. In the preferred embodiment, members listed in the member list box 1092 (FIG. 28) are multi-selectable (shift-contiguous; CTRL-disjoint selection). Also in step 1120, user input indicative of a selected member is received.

From step 1120, the sub-process proceeds to step 1122 in which the selected member is removed from the list.

If it is determined at 1118 that the remove option has not been selected, it is assumed that the add option has been selected, and the sub-process proceeds to step 1126 in which a user interface, allowing the user to enter an e-mail address associated with a new member is provided. Also in step 1126 user input indicative of an e-mail address associated with a new member is received. From step 1126, the sub-process proceeds to step 1128 in which the e-mail associated with the new member is added to the member list displayed in the member list box 1092 (FIG. 28). From step 1128, the sub-process proceeds to step 1130 in which the revised member list is displayed. In the preferred embodiment, the revised member list is displayed in the member list box 1092 (FIG. 28) of the define groups GUI screen. From step 1130, the process proceeds back to "B12'" (back to FIG. 27).

Figure 30:
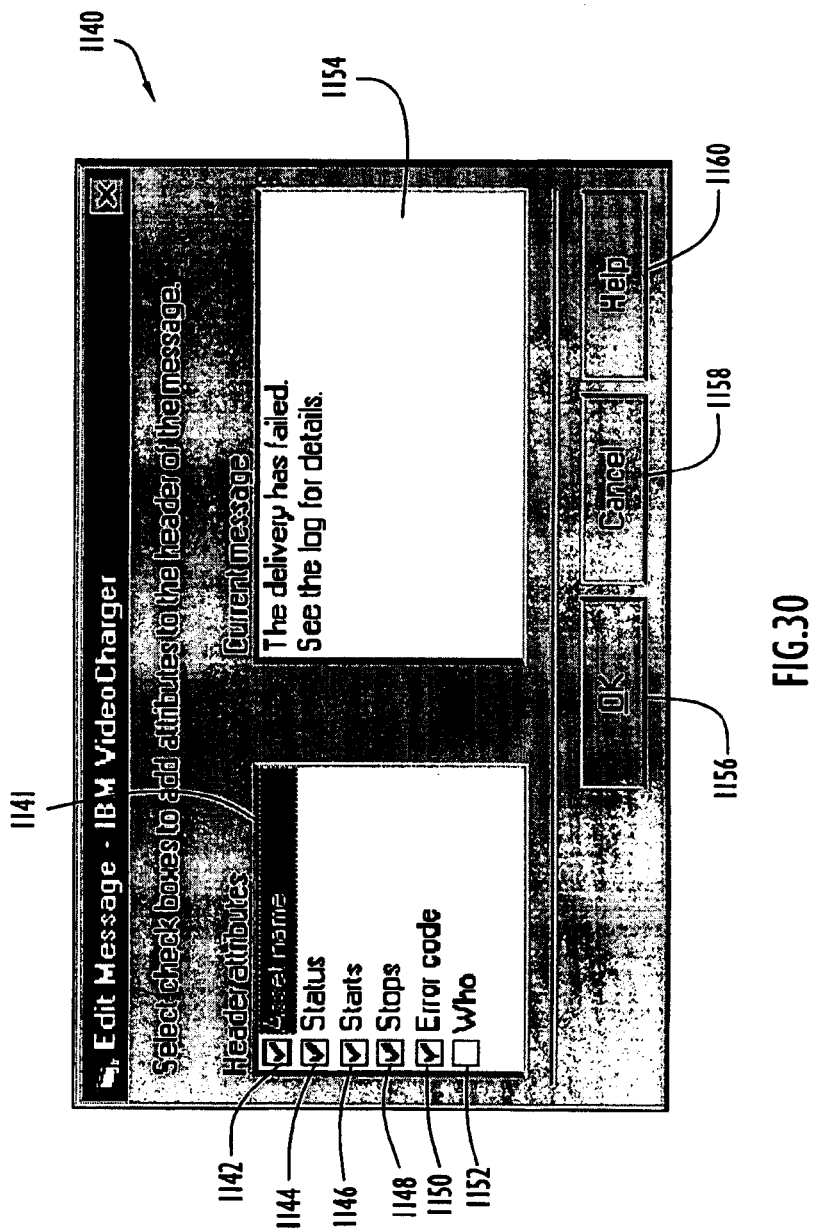
FIG. 30 is a block diagram illustrating an edit message GUI screen.

FIG. 30 shows a block diagram illustrating an edit message GUI screen 1140. The screen 1140 is activated in response to the user activating the edit message button 1032 (FIG. 26) of the defined notification GUI screen. The edit message GUI screen 1140 includes: header attributes including an asset name check box 1142 for including an asset name in the message; a status attribute check box 1144 for including the status of the message; a start check box 1146 for specifying that the start date and time of a multicast is to be included in the e-mail message; a error code check box 1150 for specifying a predefined error code indicative of a failure in delivery of a multicast; and a destination box 1152 for specifying the destination e-mail address of or associated with the message. The GUI screen 1140 further includes a current message text box 1154 for displaying a current message, the contents of the current message text box being editable by the user; an OK button 1156; a cancel button 1158; and a help button 1160.

Figure 31:
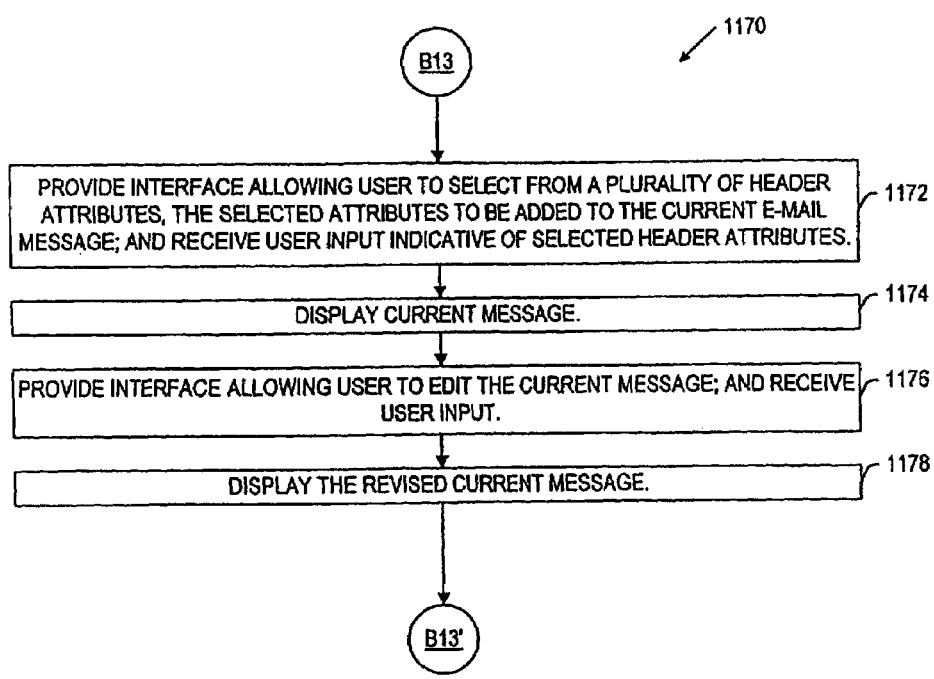
FIG. 31 is a flow diagram illustrating a process of editing a message using the screen of FIG. 30.

FIG. 31 shows a flow diagram illustrating a sub-process at 1170 for editing a message to be sent to selected e-mail destination addresses. The depicted sub-process proceeds from "B13" (from FIG. 27) to step 1172 in which an interface, allowing the user to select from a plurality of header attributes, is provided. The selected attributes are to be added to the e-mail message. Also in step 1172, user input indicative of selected header attributes are received. In the preferred embodiment, step 1172 is implemented using the header attributes box 1141 of the edit message GUI screen 1140 (FIG. 30).

From step 1172, the sub-process proceeds to step 1174 in which the current message is displayed. In step 1176, an interface allowing the user to edit the current message is provided. Also in step 1176 user input for editing the current is received. In step 1178, the revised current message is displayed. In the preferred embodiment, the steps 1174, 1176, and 1178 are implemented using the current message text box 1154 of the edit message GUI screen 1140 (FIG. 30). From step 1178, the process proceeds to "B13'" (back to FIG. 27).

Figure 32:
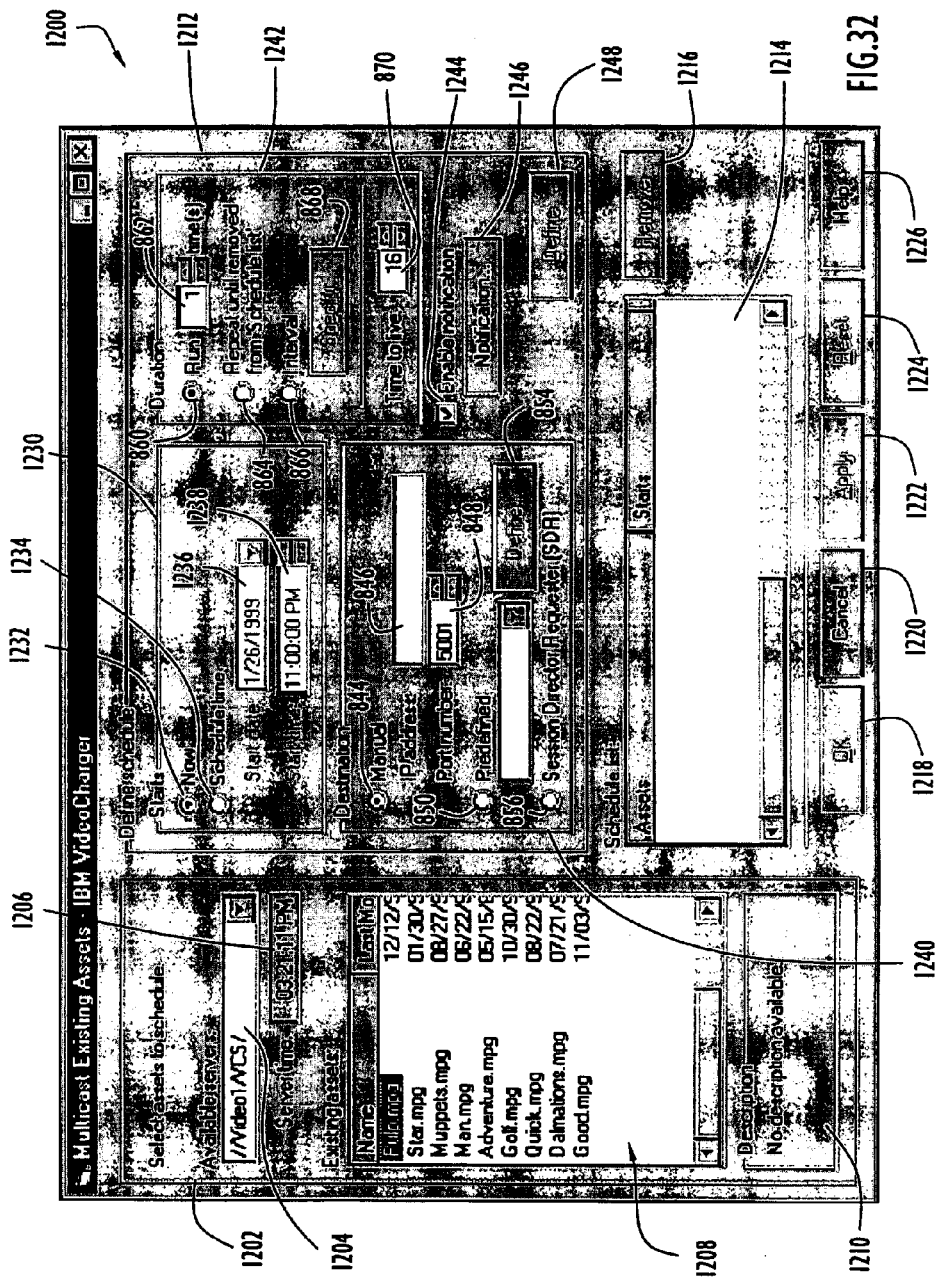
FIG. 32 is a block diagram illustrating a GUI screen providing an interface for defining and scheduling multi-casting operations.

FIG. 32 shows a block diagram illustrating a GUI screen 1200 which provides an interface for multicasting existing assets. The multicasting GUI screen 1200 is activated upon selection of the multicast option. The GUI screen 1200 includes an asset select box 1202 for selecting an existing asset located at a selected one of the available media servers (i.e., SERVER_1 or SERVER_2 of FIG. 1), the box 1202 including: an available server drop down list 1204 providing for the user to select a media server that contains assets; a server time text box 1206 for displaying the local time at the selected server, the server time being active (the seconds are clicking away in real time); an existing assets list box 1208 for displaying a list of asset names associated with assets located at the selected server, and also displaying the date and time that the corresponding asset was last modified; and a description label box 1210 for displaying graphical information indicative of a description of the selected asset located at the selected server.

The GUI screen 1200 further includes: a define schedule box 1212 providing user interface means for defining a schedule including a start date and time, a duration, and destination end users associated with the selected asset at the selected media server and also for defining notification messages to be sent to selected persons under selected circumstances as further explained below; a schedule list 1214 for displaying a list of schedule entries each of the schedule entries including an asset name, a start date and time for multicasting the asset, a duration for the scheduled program associated with the asset, and destination locations to which the asset is to be streamed; a remove button 1216 for removing selected ones of the scheduled entries from the schedule list 1214; an OK button 1218; a cancel button 1220; an apply button 1222; a reset button 1224; and a help button 1226.

The define schedule box 1212 is substantially similar to the define schedule box 808 of the playback scheduling GUI screen 800 (FIG. 22), and includes a start box 1230. The start box 1230 includes: a start now option button 1232 for specifying that the selected asset is to be multicasted from the selected server immediately; and a schedule time option button 1234 for specifying a start date and start time for a program for multicasting the selected asset from the selected server. The schedule time option button 1234 enables a start date drop down date picker 1236 allowing the user to select a date via a selectable calendar view as further explained below and a start time spin button 1238 allowing for the user to select a start time for beginning the mutlicasting schedule.

The GUI screen 1200 further includes: a destination group box 1240 which is identical to, and which includes all of the same interface components as, the destination group box 812 of the playback scheduling GUI screen 800 (FIG. 22); and a duration group box 1240 which is identical to, and which includes all of the same interface components as, the duration group box 814 of the playback scheduling GUI screen 800 (FIG. 22).

An enable notification check box 1244 enables a notification button 1246 which is used to activate a GUI screen for defining notification options for notifying selected end users, and selected groups of end users, regarding specified events under selected circumstances. Selecting the notification button 1246 causes the GUI process to activate the GUI screen 1000 (FIG. 26) for defining notification e-mail messages to be sent to selected persons, and users, in predefined circumstances. A define button 1248 provides for adding schedule entries to the schedule list 1214.

Figure 33A:
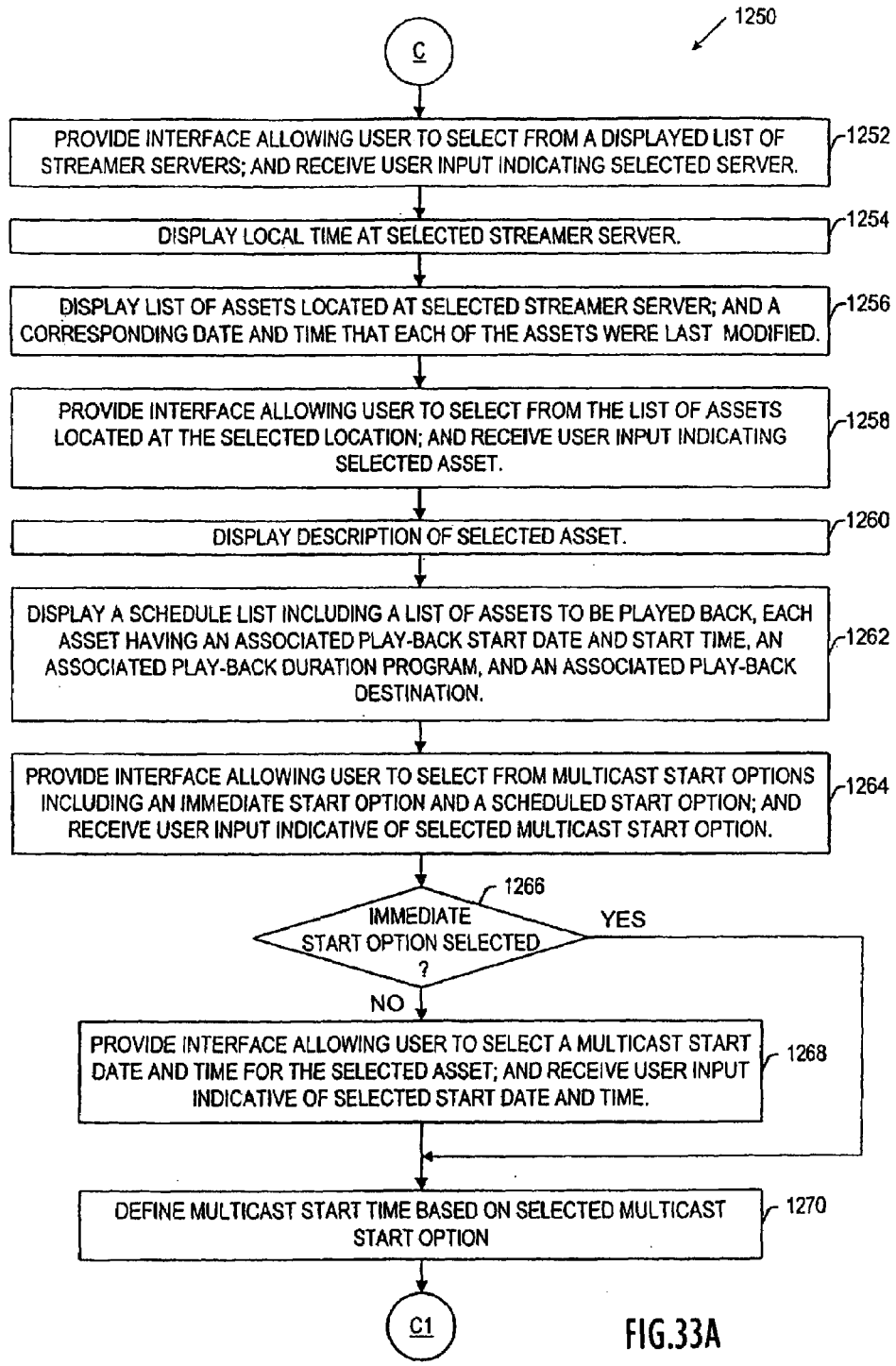
FIGS. 33A through 33E are flow diagrams illustrating a sub-process of defining and scheduling streaming operations in accordance with the present invention using the GUI screen of FIG. 32.

FIG. 33A shows a flow diagram illustrating a multicasting sub-process at 1250 in accordance with the present invention. The sub-process 1250 proceeds from "C" (from FIG. 4) to step 1252 in which an interface, allowing the user to select from a displayed list of media servers is provided. Also in step 1252, user input indicative of a selected one of a media servers is received. In the preferred embodiment, the sub-process 1250 is implemented using the multicasting GUI screen 1200 (FIG. 32). From step 1252, the sub-process proceeds to step 1254 in which the local time at the selected media server is displayed. In the preferred embodiment, the local time is displayed in the server time window 1206 (FIG. 32) of the multicasting GUI screen.

From step 1254, the sub-process proceeds to step 1256 in which a list of assets located at the selected media server is displayed. Also in step 1256, a corresponding date and time that each of the assets were last modified is displayed. In the preferred embodiment, step 1256 is implemented using the existing assets display box 1208 (FIG. 32) of the multicasting GUI screen. From step 1256, the sub-process proceeds to step 1258 in which a user interface, allowing the user to select from the list of assets located at the selected location, is provided. Also in step 1258, user input indicative of the selected asset is received. From step 1258, the sub-process proceeds to step 1260 in which a description of the selected asset is displayed. In the preferred embodiment, the description of the selected asset is displayed in the description box 1210 (FIG. 32) of the multicasting GUI screen. From step 1260, the sub-process proceeds to step 1262 in which a schedule list, including a list of assets to be played back, is displayed. Each of the listed assets has an associated start date and time, and associates playback duration program, and an associated playback destination, all of which are displayed along with the schedule list. In the preferred embodiment, step 1262 is implemented using the schedule list display box 1214 (FIG. 32) of the multicasting GUI screen. In step 1264, a user interface, allowing the user to select from multicast start options, is provided.

The multicasting start options include an immediate start option, and a scheduled start option. Also in step 1264, user input indicative of the selected multicast start option is received. In the preferred embodiment, step 1264 is implemented using the start box 1230 (FIG. 32) of the multicasting GUI screen.

From step 1264, the sub-process proceeds to step 1266 at which it is determined whether the immediate start option has been selected. The determination at 1266 is made and the preferred embodiment by determining the "now" option button 1232 (FIG. 32) has been selected. If it is determined at 1266 that the immediate start option has not been selected, the sub-process proceeds to step 1268 at which an interface, allowing the user to select a multicast start date and start time for the selected asset, is provided. Also in step 1268, user input indicative of the selected start date and start time is received. In the preferred embodiment, step 1268 is implemented using the start date drop down list 1236 and the start time spin button 1238 (FIG. 32) of the multicasting GUI screen. Alternatively, if it is determined at 1266 that the immediate start option has been selected, the sub-process proceeds from 1266 to step 1270 in which a multicast start time is defined based on the selected multicast start option. If the immediate start option has been selected, the multicast start time is defined to be a time immediately upon selection of the OK button 1218 (FIG. 32). If the scheduled start option has been selected, the start time is defined to be the selected start date and selected start time. From step 1270, the process proceeds to "C1" (to FIG. 33B).

Figure 33B:
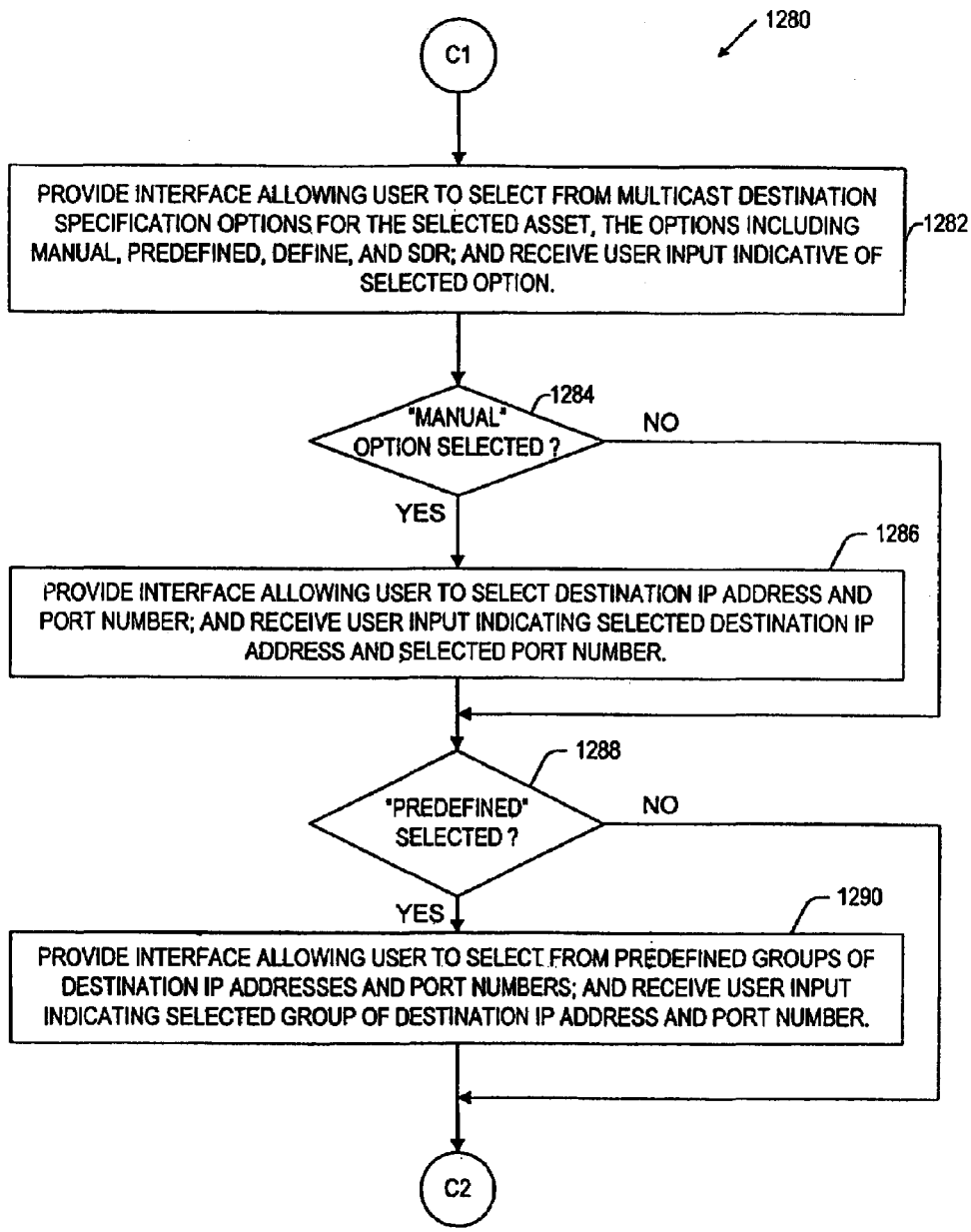

FIG. 33B shows a flow diagram illustrating a sub-process 1280 for specifying destinations to which the existing asset is to be multicasted, or streamed. In the preferred embodiment, the sub-process 1280 is implemented using the destination box 1240 (FIG. 32) of the multicasting GUI screen. The sub-process 1280 proceeds from "C1" (from FIG. 33A) to step 1282 in which an interface, allowing the user to select from multicast destination specification options, is provided. The multicast destination specification options include a manual specification option, a predefined option, a defined option, and an SDR option. Also in step 1282, user input indicative of the selected option is received. From step 1282, the sub-process proceeds to step 1284 at which it is determined whether the manual option has been selected. In the preferred embodiment, the manual option is determined to be selected if the manual option button 844 (FIG. 32) has been selected by the user. If it is determined at 1284 that the manual option has been selected, the sub-process proceeds to step 1286 in which an interface, allowing the user to select a destination IP address and destination port number, is provided. Also in step 1286, user input indicative of the selected destination IP address and selected port number is received. In the preferred embodiment, step 1286 is implemented using the IP address text box 846 and the port number spin button 1246 (FIG. 32). Alternatively, if it is determined at 1284 that the manual option has not been selected, the sub-process proceeds to 1288 at which it is determined whether the predefined option has been selected.

In the preferred embodiment, the predefined option is determined to be selected if the predefined option button 850 (FIG. 32) has been selected by the user.

If it is determined at 1288 that the predefined option button has been selected, the sub-process 1280 proceeds to step 1290 in which an interface, allowing the user to select from predefined of group of destination specification IP addresses and port numbers, is provided. Also in step 1290, user input indicating a selected group of destination IP addresses and port numbers is received. In the preferred embodiment, step 1290 is implemented using the predefined group drop down list 852 (FIG. 32) of the multicasting GUI screen. From step 1290, the process proceeds to "C2" (to FIG. 33C).

Figure 33C:
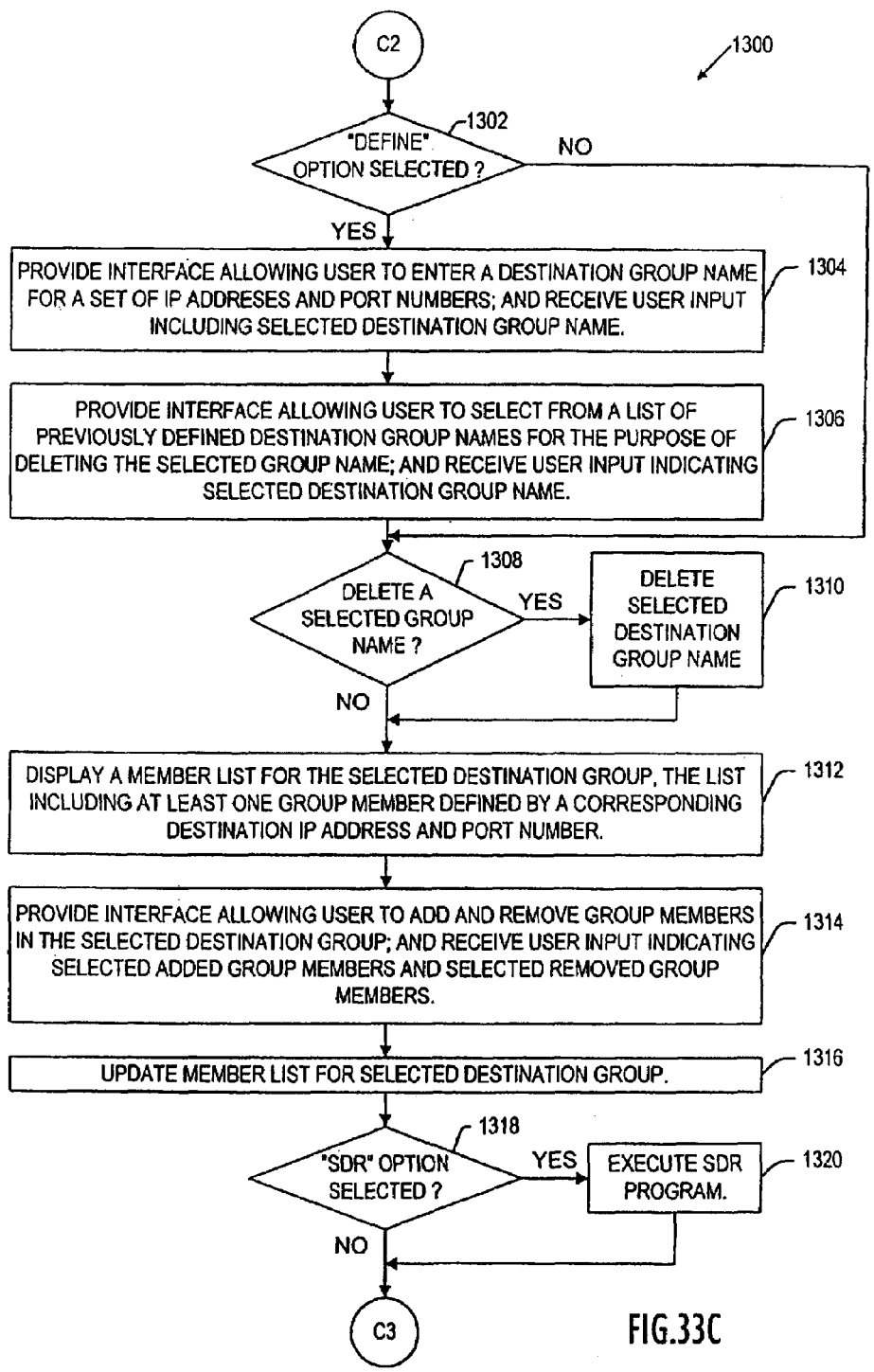

FIG. 33C shows a flow diagram illustrating further steps of the destination specification and multicasting sub-processes. The sub-process 1300 proceeds from "C2" (from FIG. 33B) to 1302 at which it is determined whether the define destination specification option has been selected. In the preferred embodiment, the define option is determined to be selected if the define button 854 (FIG. 32) has been selected by the user.

If it is determined at 1302 that the define option has been selected, the sub-process proceeds to step 1304 in which an interface, allowing the user to enter a destination group name for a corresponding set of IP addresses and port numbers is provided. Also in step 1304, user input indicative of a selected destination group name is received. In the preferred embodiment, step 1304 is implemented using the define groups GUI screen 720 (FIG. 19).

From step 1304, the sub-process proceeds to step 1306 in which an interface, allowing the user to select from a list of previously defined destination group names for the purpose of deleting the selected group name, is provided. Also in step 1306, user input indicative of the selected destination group name is received. In the preferred embodiment, step 1306 is implemented using the member list box 734 (FIG. 19) and the remove button 732 (FIG. 19) of the define group GUI screen. From step 1306, the depicted sub-process proceeds to step 1308 at which it is determined whether a selected group name is to be deleted, and if so, the sub-process proceeds to step 1310 in which the selected destination group name is deleted.

Alternatively, if it is determined at 1308 that a selected destination group name is not to be deleted, the sub-process proceeds to step 1312 in which a member list is displayed for the selected destination group. The member list includes a least one group member defined by a corresponding destination IP address and destination port number. In the preferred embodiment, step 1312 is implement using the member list box 734 (FIG. 19) of the defined groups GUI screen. From step 1312, the sub-process proceeds to step 1314 in which an interface, allowing the user to add and remove group members in the selected destination group, is provided. Also in step 1314 user input indicative of the selected added group members and selected remove group members is received. In the preferred embodiment, step 1314 is implemented using the member list box 734 (FIG. 19) which allows for selecting members from the member list, the add button 730 (FIG. 19), and a remove button 732 (FIG. 19).

From step 1314, the sub-process proceeds to step 1316 in which a member list associated with the selected destination group is updated. From step 1316, the sub-process proceeds to step 1318 at which it is determined whether the SDR option has been selected, and if so, the sub-process proceeds to step 1320 to execute an SDR program. Alternatively, if it is determined at 1318 that the SDR option has not been selected, the process proceeds to "C3" (to FIG. 33D).

Figure 33D:
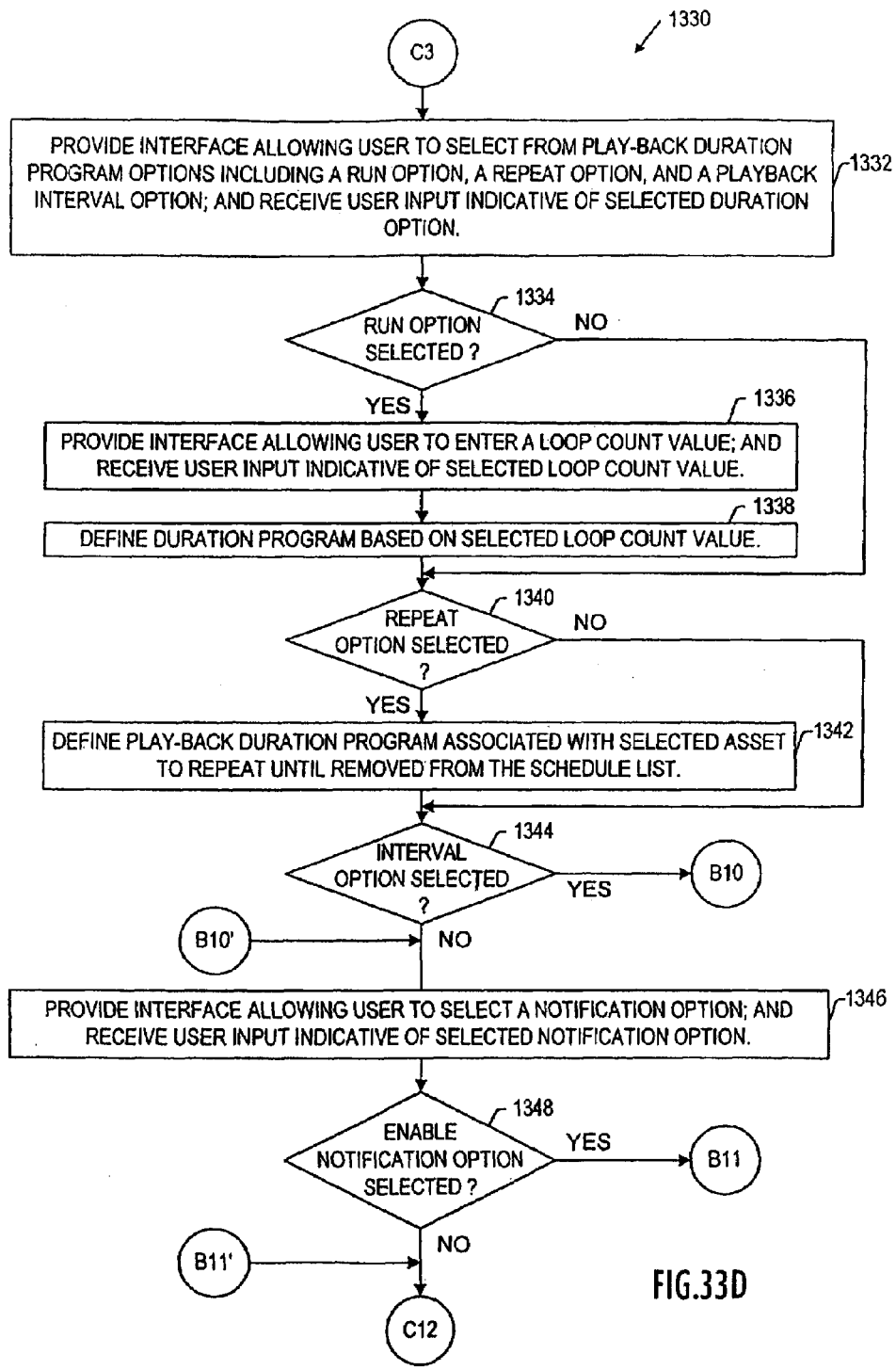

FIG. 33D shows a flow diagram illustrating a sub-process at 1330 for defining a duration for a schedule multicasting existing assets. The sub-process 1330 proceeds from "C3" (from FIG. 33C) to step 1332 in which an interface, allowing a user to select playback duration program options, is provided. The playback duration program options include a run option, a repeat option, and a playback interval option. Also in step 1332, user input indicative of a selected duration option is received. The sub-process 1330 is identical to the sub-process 930 (FIG. 23C).

Figure 33E:
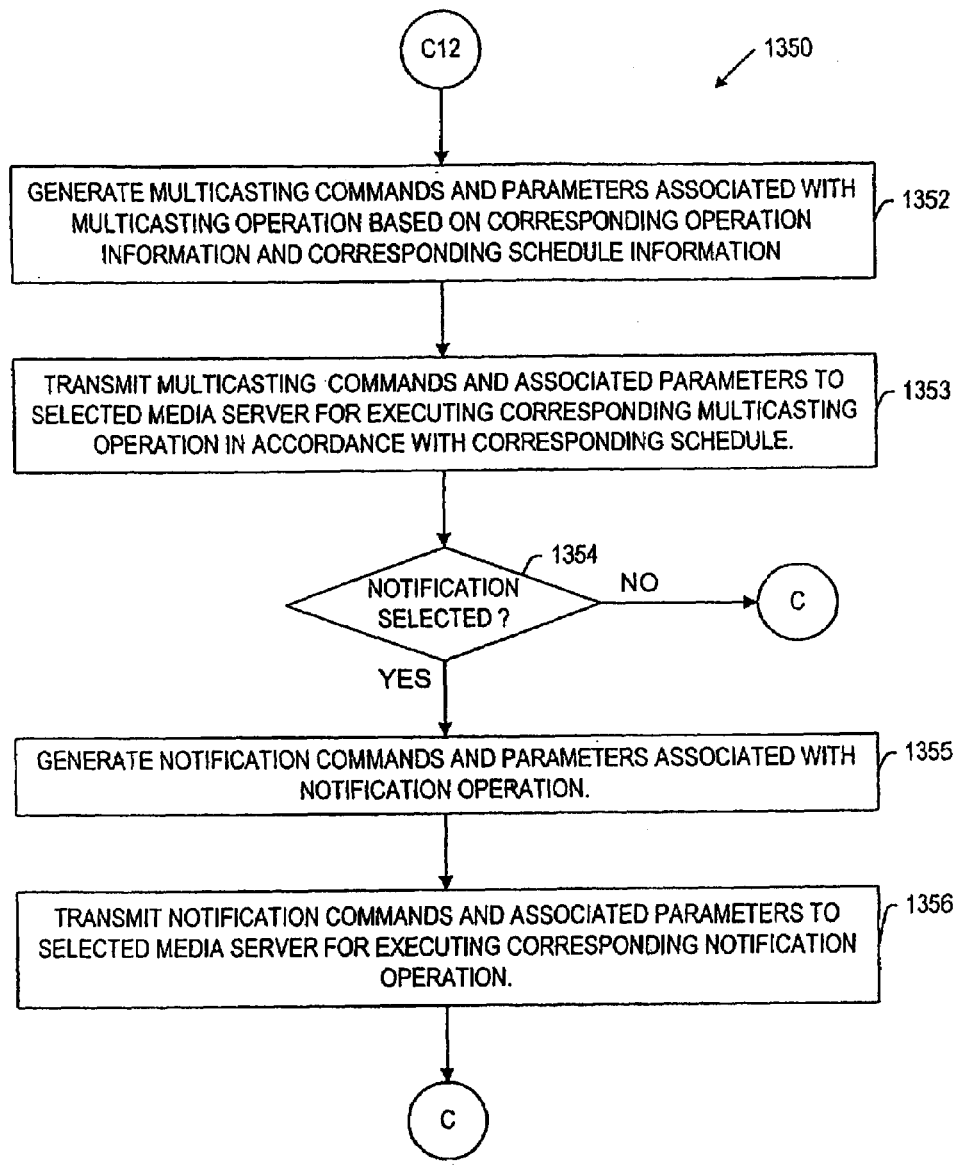

FIG. 33E shows a flow diagram illustrating a sub-process at 1350 illustrating further steps of the sub-process 1250 (FIG. 33A) for defining and scheduling a multicast operation. The depicted process proceeds from "C12" (from FIG. 33D) to step 1352 in which a set of multi-casting commands and associated parameters is generated for each defined multi-casting action. Each set of multi-casting commands and parameters is generated based on: multi-casting schedule information including the multi-casting start date and start time defined for the associated multi-casting action, and the multi-casting duration program defined for the associated multi-casting action; and the associated multi-casting destinations defined for the associated multi-casting action. From step 1352, the sub-process proceeds to step 1353 in which the commands and associated parameters associated with each of the multi-casting actions are transmitted from the administrator terminal 12 (FIG. 1) to the corresponding selected multi-casting media server for executing a corresponding multi-casting operation in accordance with the multi-casting schedule information.

For example, in the preferred embodiment, a set of multi-casting commands and parameters is transmitted from the administrator terminal to a selected media server. The set of multi-casting commands and parameters programs the selected media server to execute multi-casting operations beginning on the play-back start date and start time specified using the start box 1236 (FIG. 32), in accordance with a multi-casting schedule specified by the user via the GUI components of the duration box 1260 (FIG. 32). Each iteration of the multi-casting operation includes streaming the asset to the multi-casting destination locations specified by the user via the destination specification box 1240 (FIG. 32) of the multi-casting GUI screen.

From step 1353, the sub-process proceeds to 1354 at which it is again determined whether the notification option has been selected, and if not, the process proceeds to "C" (to FIG. 27). In the preferred embodiment, the determination at 1354 is implemented using the enable notification check box 1244 (FIG. 32). Alternatively, if it is determined at 1354 that the notification option has been selected, the sub-process proceeds to step 1355 in which a set of notification commands and associated notification parameters is generated for each defined notification action. Each set of notification commands and notification parameters is generated based on user input received in response to GUI screens for defining selected circumstances under which selected notification messages are to be provided to selected end users. From step 1355, the sub-process proceeds to step 1356 in which the notification commands and associated notification parameters associated with each of the play-back actions are transmitted from the administrator terminal 12 (FIG. 1) to the corresponding selected media server for executing a corresponding notification operation.

Figure 34:
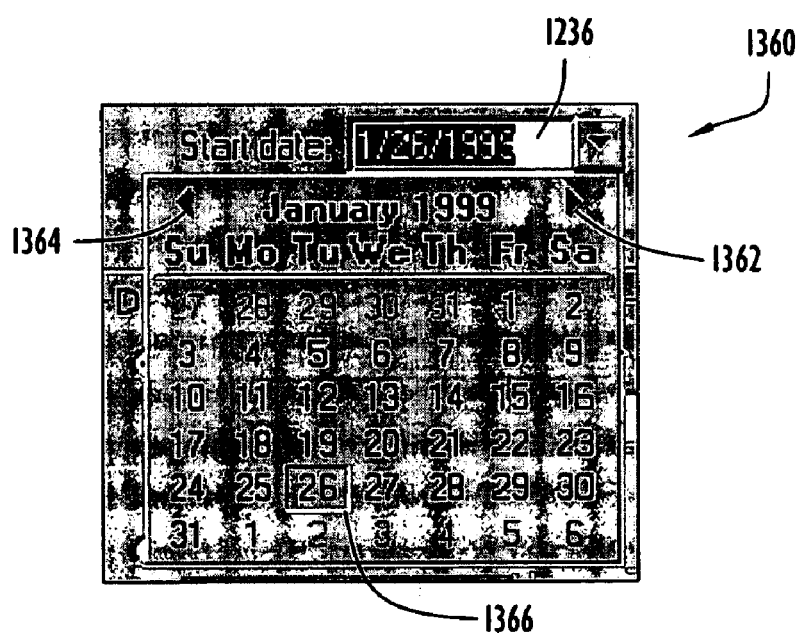
FIG. 34 is a block diagram illustrating a GUI screen providing an interface for selecting a date.

FIG. 34 shows a block diagram of a selectable calendar GUI screen at 1360, the screen 1360 including forward and reverse selection buttons 1362 and 1364 for displaying days and dates of successive months in a calendar view. The user may pick a date by selecting a number representing a date as indicated at 1366. The screen 1360 is displayed and activated upon activation of the start date drop down list 1236 (FIG. 32) of the multicasting GUI screen.

Figure 35:
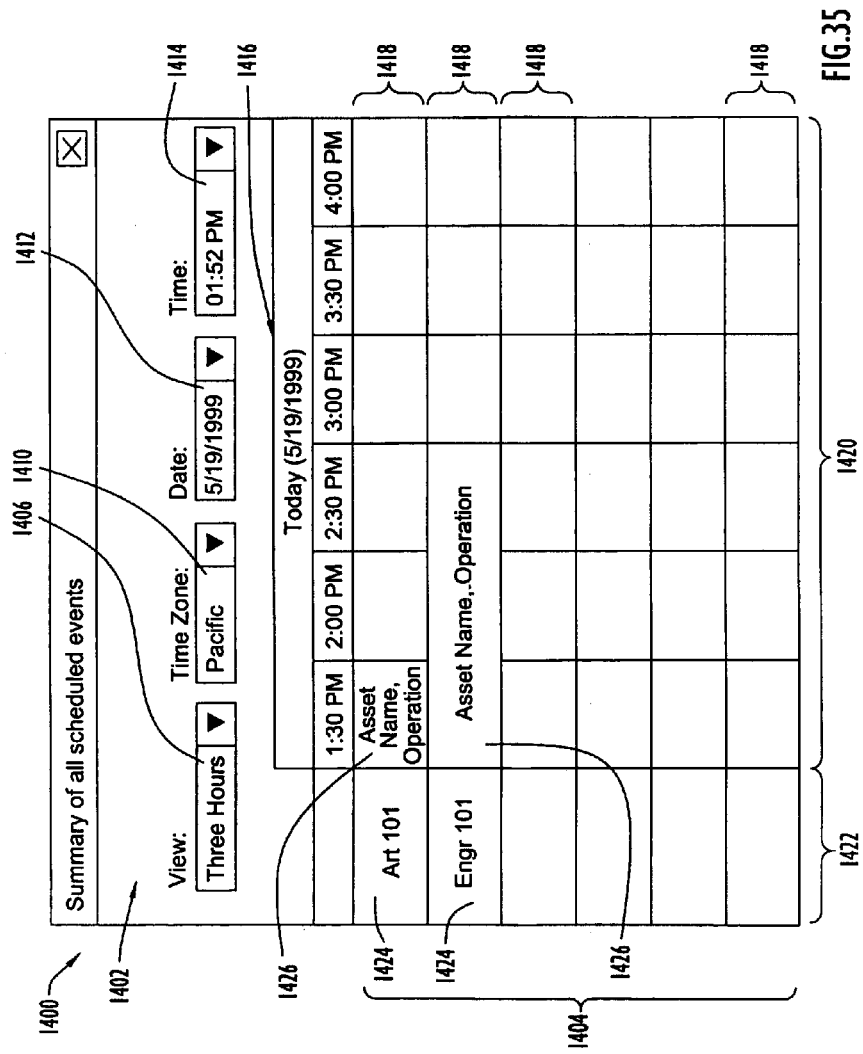
FIG. 35 is a block diagram illustrating a global schedule summary Web document in accordance with the present invention.

FIG. 35 shows a block diagram illustrating a global schedule summary Web document at 1400 in accordance with the present invention, the Web document 1400 including graphical information indicative of a plurality of events, or operations, which have been scheduled for execution at corresponding media servers by a particular user, or administrator, using the media asset management and scheduling GUI process of the present invention as described above. The Web document 1400 is provided by a global asset management server which receives the server identification information, schedule information, and operation information associated with each media operation scheduled by authorized users, or administrators. In order to provide the Web document 1400, the asset management and scheduling GUI process of the present invention includes further steps for transmitting the server identification information, schedule information, and operation information associated with each user defined media operation from the administrator terminal 12 (FIG. 1) to the global asset management server. The global asset management server stores a global schedule summary file for each authorized user, the summary file including all server identification information, operation information, and scheduling information associated with each operation, or event, scheduled by the corresponding user via the asset management and scheduling GUI process of the present invention described above.

In one embodiment of the present invention, the Web document 1400 is provided by SERVER_1 (FIG. 1) which executes the asset management and scheduling program 23 (FIG. 1), and which serves as the global asset management server. In this embodiment, SERVER_1 receives the server identification information, schedule information, and operation information associated with each media operation from the administrator terminal 12 (FIG. 1) at the same time that the commands and associated parameters associated with the media operations are transmitted to the media server indicated by the server identification information. The global asset management server provides a centralized location for storage of information associated with all scheduled media operations. The Web document 1400 may be accessed by a user via a Web browser application executed by the administrator terminal 12 (FIG. 1) using a corresponding URL. In a preferred embodiment of the present invention, the Web document 1400 is a HTML document including embedded Java applets which are executed upon activation of corresponding active areas of the HTML document as further explained below.

The Web document 1400 includes: a schedule time interval selection area 1402 providing a group of GUI components which allow the user to select a time interval, a time zone, a date, and a start time for defining a selected time interval of the global schedule summary; and a global schedule display area 1404 for displaying event programming information indicative of media operations scheduled for execution during the selected time interval defined using the GUI components of the time interval selection area 1402 as further explained below.

The time interval selection area 1402 includes: a time interval drop down list 1406 allowing the user to select a time interval; a time zone drop down list 1410 allowing the user to select from a plurality of time zones, the selected time zone providing a reference for the selected time interval; a date drop down list 1412 allowing the user to select a date for the selected time interval of the global schedule summary associated with the particular user; and a start time drop down list 1414 allowing the user to select a start time for defining the selected time interval of the global schedule summary associated with the particular user.

The program schedule area 1404 includes: a plurality of entries 1418 for displaying graphical indicia indicative of information associated with corresponding media operations which have been defined and schedule by the particular user for execution by a selected media server during the selected time interval; a plurality of time interval columns 1420 delineating time sub-intervals of the selected time interval of the global event schedule summary; and a subject column 1422 for displaying graphical subject indicia indicative of a subject associated with at least one corresponding media operation which has been defined and scheduled by the particular user to be executed by a selected media server during the selected time interval.

For each of the entries 1418, the program schedule area includes corresponding subject indicia 1424 indicative of a subject associated with at least one corresponding media operation, and corresponding operation indicia 1426 indicative of corresponding media operations to be performed by corresponding selected media servers during a corresponding time sub-interval indicated by the particular time interval columns 1420 between which the operation indicia 1426 is located. Each operation indicia 1426 is associated with an active area as further explained below.

For example, an entry of the subject column 1422 may include a subject indicia 1424 indicative of a particular course offered by an educational institution (e.g., Engineering 101), and an operation indicia 1426 indicative of a selected media operation to be performed on an asset comprising audio and video data representing a lecture associated with the particular course. The selected media operation indicated by the operation indicia 1426 may be selected from the above defined media operations including copy operations, delete operations, encoding operations, multicasting operations, and notification operations.

Upon selection of one of the active areas associated with one of the operation indicia 1426, an applet is activated, and interpreted by a Web browser at the administrative terminal 12 (FIG. 1), the applet providing at least a portion of the asset management and scheduling GUI process of the present invention. Clicking on, or activating, one of the active areas associated with one of the operation indicia 1426 causes the GUI process of the present invention to be executed, and initialized to display a corresponding one of the GUI screens described above which is associated with defining and scheduling the media operation associated with the selected operation indicia 1426. The user may then use the GUI process of the present invention to redefine, reschedule, or cancel the corresponding media operation associated with the selected operation indicia 1426 as further explained below.

Figure 36:
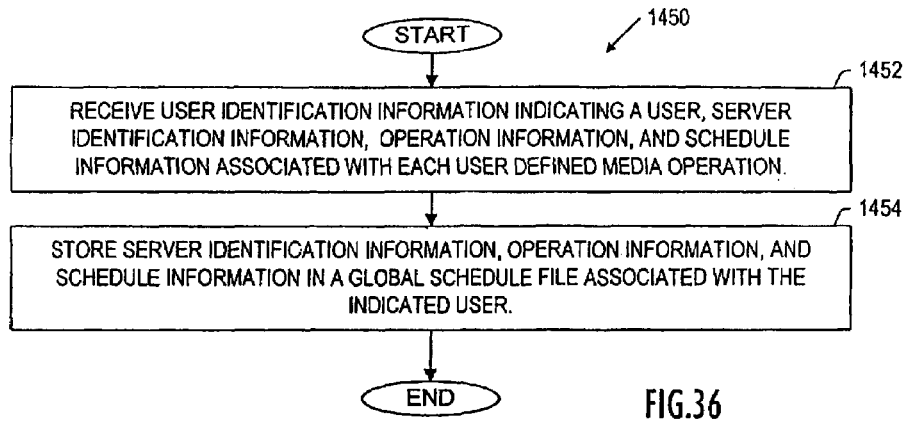
FIG. 36 is a flow diagram illustrating a process for managing global schedule information in accordance with the present invention.

FIG. 36 shows a flow diagram illustrating a process at 1450 for managing global schedule information in accordance with the present invention. In one embodiment, the process 1450 is implemented as computer readable code executed by the processing unit of SERVER_1 (FIG. 1) which provides a global asset management server. The process 1450 begins with step 1452 in which summary information associated with a particular media operation is received from the administrator terminal 12 (FIG. 1). The summary information includes: user identification information indicating a corresponding user who has defined and scheduled the particular media operation using the asset management and scheduling GUI process described above; server identification information indicating a selected media server scheduled to execute the particular media operation; operation information defining a particular media operation (e.g., defining the particular media operation as a copy asset operation, a delete asset operation, an encoding asset operation, a multicasting operation, or a notification operation); and schedule information specifying a schedule for executing the particular media operation. In an embodiment, the summary information associated with each particular media operation is transmitted from the administrator terminal 12 to SERVER_1 (FIG. 1) at the same time that the commands and associated parameters associated with the particular media operation are transmitted from the administrator terminal to the selected media server which is indicated by the server identification information.

From step 1452, the process proceeds to step 1454 in which the server identification information, operation information, and schedule information associated with the particular media operation is stored in a global schedule file associated with the indicated user. In an embodiment, the global schedule file associated with the indicated user is stored on the local disk 22 (FIG. 1) of SERVER_1.

Figure 37:
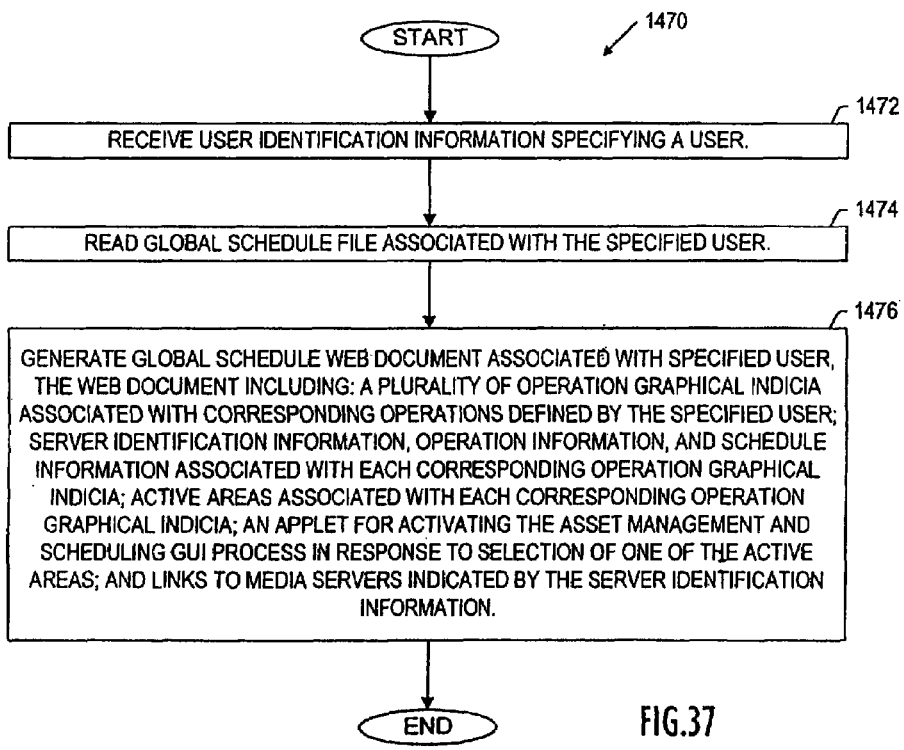
FIG. 37 is a flow diagram illustrating a process for generating the global schedule Web document of FIG. 35.

FIG. 37 shows a flow diagram illustrating a process at 1470 for generating a global schedule Web document in accordance with the present invention. In the described embodiment, the process 1470 is implemented as computer readable code executed by the processing unit of SERVER_1 (FIG. 1) which acts as the global asset management server. The process 1470 begins with step 1472 in which user information specifying a user, or administrator, is received at SERVER_1 from the administrator terminal 12 (FIG. 1) via the network. From step 1472, the process proceeds to step 1474 in which the global asset management server reads a global schedule file associated with the user specified in step 1472. From step 1474, the process proceeds to step 1476 in which the global asset management server generates a global schedule Web document associated with the specified user based on the global schedule file associated with the user. The global schedule Web document includes: a plurality of operation graphical indicia associated with corresponding operations defined by the specified user; server identification information, operation information, and schedule information associated with each corresponding operation graphical indicia; active areas associated with each corresponding operation graphical indicia; an applet providing the asset management and scheduling GUI process of the present invention; and links to media servers indicated by the server identification information. In one embodiment, the global schedule Web document 1400 (FIG. 35) provides the format for the document generated in step 1476.

Figure 38:
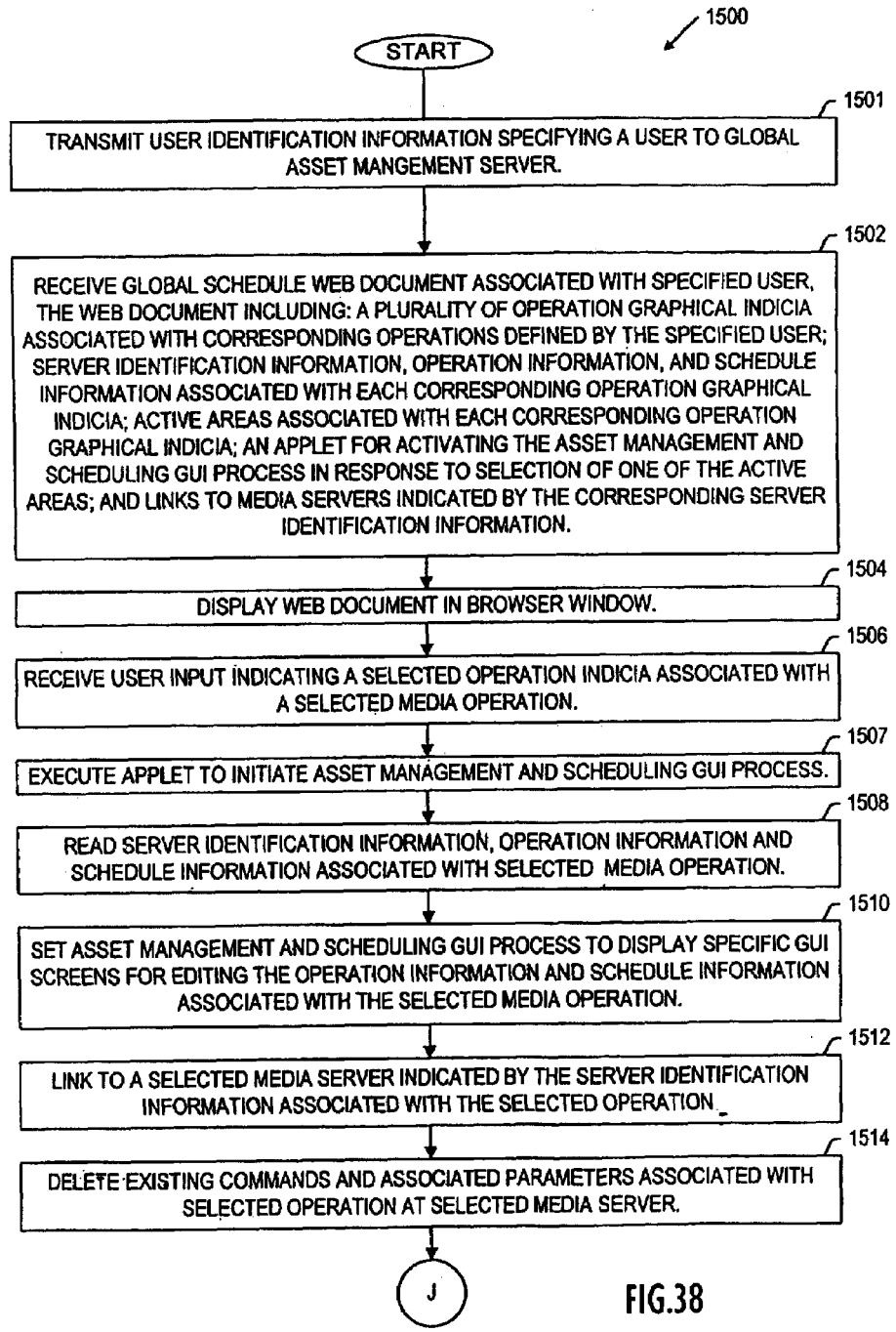
FIG. 38 is a flow diagram illustrating a process for reviewing a summary of all scheduled media operations associated with a particular user of the asset management and scheduling GUI process of the present invention.

FIG. 38 shows a flow diagram illustrating a process at 1500 for reviewing a summary of all scheduled media operations associated with a particular user of the asset management and scheduling GUI process of the present invention, the process 1500 also providing for editing operation information and schedule information associated with selected ones of the scheduled media operations associated with the particular user. In the described embodiment, the process 1500 is implemented as computer readable code executed by the processing unit of the administrator terminal 12 (FIG. 1). The process 1500 begins with step 1501 in which user identification information specifying a user is transmitted from the administrator terminal 12 (FIG. 1) to the global asset management server, that is SERVER_1 (FIG. 1) in the described embodiment. In one embodiment, step 1501 includes accessing SERVER_1 via the Web browser using a predetermined uniform resource locator (URL). From step 1501, the process proceeds to step 1502 in which a global schedule Web document associated with the specified user is received at the administrator terminal 12 (FIG. 1). The global schedule Web document includes: a plurality of operation graphical indicia associated with corresponding operations defined by the specified user; server identification information, operation information, and schedule information associated with each corresponding operation graphical indicia; active areas associated with each corresponding operation graphical indicia; an applet providing the asset management and scheduling GUI process of the present invention; and links to media servers indicated by the server identification information. In the preferred embodiment, the Web document is implemented by the Web document 1400 (FIG. 35).

In step 1504, the Web document is displayed in a browser window of the administrative terminal 12 (FIG. 1). From step 1504, the process proceeds to step 1506 in which user input indicating a selected operation graphical indicia, associated with a selected media operation, is received. In the preferred embodiment, the user selects an operation graphical indicia 1426 (FIG. 35) by selecting (e.g., "clicking on") an active area which is coincident with the selected operation graphical indicia (FIG. 35). In step 1507, an applet embedded in the Web document is executed at the administrator terminal to provide the asset management and scheduling GUI process of the present invention as described above. In the preferred embodiment, the applet is a Java applet which is embedded in the Web document 1400 (FIG. 35).

In step 1508, operation information and schedule information associated with a selected scheduled event is read. In step 1510, the asset management and scheduling GUI process of the present invention is initiated to display specific GUI screens for editing the operation information and schedule information associated with the selected scheduled event. In step 1510, the asset management and scheduling GUI process advances to the GUI screen associated with the scheduled event. For example, if the scheduled event is a copy action or a delete action, the asset management and scheduling GUI process proceeds to "A" (to FIG. 6). As another example, if the selected scheduled event is a scheduled encoding operation, the process proceeds to "B" (to FIG. 13A). As yet a further example, if the selected scheduled event is a scheduled multicasting operation, the process proceeds to "C" (back to FIG. 33A). In any of these cases, the GUI process displays the appropriate GUI screen having the operation information and schedule information associated with the selected media operation displayed therein for editing.

From step 1510, the process proceeds to step 1512 in which a link is established with the media server indicated by the server identification information associated with the selected media operation. In step 1514, existing commands and associated parameters associated with the selected event are deleted at the source media server associated with the selected event. From step 1514, the process proceeds to "J" (to FIG. 4) to execute the asset management and scheduling GUI process in order to redefine, reschedule, or cancel the selected media operation.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for managing execution of operations performed on media data by selected ones of a plurality of media servers of a network, the process comprising the steps of:
   at a node of the network, receiving information input by the user specifying a selected one of the media servers for scheduling operations to be performed, wherein said node resides in a first time zone and said selected media server resides in a second time zone, and wherein there is a time difference between said first and second time zones;
   at said node, displaying graphical information indicative of a current local time at said selected media server.

2. A method as recited in claim 1 wherein said node is an administrator terminal, the method further comprising the steps of:
   displaying a graphical user interface at the administrator terminal, the interface including a plurality of interface components enabling a user to specify and schedule operations to be performed by selected ones of the media servers; and
   receiving information input by the user specifying an operation to be performed by the selected media server, and a schedule for performing the operation.

3. A method as recited in claim 2 wherein each of the media servers is capable of accessing at least one corresponding memory device for storing media data, and wherein said interface components include a source selection interface component enabling the user to select a source location by browsing a list of available locations including predetermined mapped ones of the media servers and predetermined mapped ones of the memory devices, and wherein if the selected source location is a memory device, then said selected server is a media server corresponding with the selected memory device.

4. A method as recited in claim 1 wherein the network is an internet protocol (IP) network.

5. A method as recited in claim 2 wherein the administrator terminal also includes a processing unit, a browser application executed by the processing unit, and a display unit, and wherein said process is initiated by performing the steps of:
   transmitting an applet to the administrator terminal via the network; and
   executing said applet over the processing unit of the administrator terminal;
   whereby said graphical user interface is displayed within a browser window generated by said browser application on the display unit.

6. A method as recited in claim 2 wherein the network further includes a plurality of end user terminals communicatively coupled to the administrator terminal and to the servers, each of the servers being further operative to stream media data to selected ones of the end user terminals, and wherein at least one of the media servers is further operative to encode media data received from a corresponding multimedia device, and wherein said operations include:
   multicasting operations for streaming portions of media data from selected ones of the media servers to selected ones of the end user terminals via the network; and
   encoding operations for encoding media data received by selected ones of the media servers.

7. A method as recited in claim 3 wherein the media operations include copy operations for copying selected portions of media data from selected source locations in the network to selected destination locations in the network, and wherein said steps of displaying a graphical user interface, and receiving information further comprise the steps of:
   displaying a source selection interface component enabling the user to select a source location by browsing a list of available locations including predetermined mapped ones of the media servers and predetermined ones of the memory devices;
   receiving information input by the user indicative of a selected source location;
   displaying an asset selection interface component enabling the user to select a portion of media data from a list of portions of media data stored at said selected source location;
   receiving information input by the user indicative of a selected portion of media data;
   determining a corresponding list of possible destination locations associated with said selected source location; and
   displaying a destination selection interface component enabling the user to select a destination location from said corresponding list of possible destination locations.

8. A method as recited in claim 7 wherein said steps of displaying a graphical user interface, receiving information, and generating commands further comprise the steps of:
   displaying scheduled copying interface components enabling the user to select a start time and a start date for a scheduled copying operation;
   receiving information input by the user indicative of a selected start time and a selected start date; and
   generating a copy command and associated copy parameters for instructing said selected media server to copy said selected portion of media data from said selected source location to said selected destination location at said selected start time on said selected start date.

9. A method as recited in claim 2 wherein the network further includes at least one multimedia device operative to generate media data, each of the multimedia devices being communicatively coupled with a corresponding specified one of the media servers which is further operative to selectively activate the corresponding multimedia device, and further operative to encode a selected portion of media data generated by the multimedia device, and wherein the operations include encoding operations, and wherein said information input by the user includes encoding operation information indicative of a selected server and a corresponding selected multimedia device, and wherein said commands and associated parameters include an encoding command and associated encoding parameters for instructing said selected server to encode media data received from said selected media device.

10. A method as recited in claim 9 wherein said steps of displaying a graphical user interface, receiving information, and generating commands further comprise the steps of:
   displaying scheduled encoding interface components enabling the user to select a start time and a start date for a scheduled encoding operation;
   receiving information input by the user indicative of a selected start time and a selected start date for initiating the scheduled encoding operation; and generating encoding commands and associated encoding parameters for instructing said selected media server to encode media data received from said selected multimedia device at said selected start time on said selected start date.

11. A method as recited in claim 10 wherein said steps of displaying scheduled encoding interface components, and receiving information further comprise the steps of:
displaying duration interface components enabling the user to select from time duration specification options including,
a first option of selecting a scheduled stop date and stop time for terminating said encoding operation, and
a second option of selecting a time duration for which said scheduled encoding operation is to continue following said selected start time on said selected start date; and
receiving information input by the user indicative of a selected time duration specification option.

12. A method as recited in claim 11 wherein said operations further include recording operations for recording selected portions of encoded media data that are encoded during an encoding operation, and wherein said steps of displaying a graphical user interface, and receiving information further comprise the steps of:
displaying a record-to selection interface component enabling the user to select a storage location from a list of available storage locations including predetermined mapped ones of at least one memory device associated with said selected server; and
receiving information input by the user indicative of the selected storage location;
wherein said commands and associated parameters further include a record command and associated record parameters for instructing said selected server to store the encoded media data at said selected storage location.

13. A method as recited in claim 12 wherein said operations further include playback operations for streaming the stored portion of encoded media data from said selected server to corresponding selected ones of the end user terminals via the network, and wherein said steps of displaying a graphical user interface, and receiving information further comprise the steps of:
displaying playback destination selection interface components enabling the user to select at least one of the end user terminals as a destination for streaming said encoded portion of media data;
receiving information input by the user indicative of at least one selected end user;
displaying play-back schedule interface components enabling the user to define a play-back schedule; and
receiving information input by the user indicative of a user defined play-back schedule;
wherein said commands and associated parameters further instruct said selected server to stream said stored portion of encoded media data to said selected end users via the network in accordance with said play-back schedule.

14. A method as recited in claim 13 wherein said play-back schedule interface components comprise:
a first group of components enabling the user to select a start time and a start date for said play-back schedule; and
a second group of components enabling the user to select from a plurality of options for specifying a play-back schedule duration.

15. A method as recited in claim 14 wherein said options for specifying a playback schedule duration comprise:
a first option of specifying a loop count value for repeating the streaming of said stored portion of media data a number of times equal to the loop count value;
a second option of specifying a repeat schedule wherein said streaming of said stored portion of media data is repeated until the stored portion of media data is removed from a schedule list; and
a third option of specifying an interval schedule wherein said streaming of said stored portion of media data is performed in accordance with a user defined schedule.

16. A method as recited in claim 13 wherein said operations further include notification operations associated with corresponding ones of the playback operations, said notification operations for sending notification messages to selected network addresses associated with selected ones of the end user terminals and the administrator terminal.

17. A method as recited in claim 2 wherein said operations further include multicasting operations for streaming selected portions of media data from selected media servers to corresponding selected ones of a plurality of end user terminals via the network, and wherein said steps of displaying a graphical user interface, and receiving information further comprise the steps of:
displaying multicasting destination selection interface components enabling the user to select at least one of the end user terminals as a destination for multicasting said selected portion of media data in accordance with a user defined multicasting schedule;
displaying multicasting schedule interface components enabling the user to define a multicasting schedule; and
receiving information input by the user indicative a user defined multicasting schedule;
wherein said commands and associated parameters further include a multicasting command and associated multicasting parameters for instructing said selected media server to stream said selected portion of media data to said selected end users via the network in accordance with said multicasting schedule.

18. A method as recited in claim 17 wherein said multicasting schedule interface components comprise:
a first group of components enabling the user to select a start time and a start date for a multicasting schedule; and
a second group of components enabling the user to select from a plurality of options for specifying a multicasting schedule duration.

19. A machine readable storage device having stored therein encoding instructions for executing a process of managing execution of operations performed on media data by selected ones of a plurality of media servers of a network, the process comprising the steps of:
at a node of the network, receiving information input by the user specifying a selected one of the media servers for scheduling operations to be performed, wherein said node resides in a first time zone and said selected media server resides in a second time zone, and wherein there is a time difference between said first and second time zones;
at said node, displaying graphical information indicative of a current local time at said selected media server.

20. A machine readable storage device as recited in claim 19 wherein said node is an administrator terminal, the method further comprising the steps of:
displaying a graphical user interface at the administrator terminal, the interface including a plurality of interface components enabling a user to specify and schedule operations to be performed by selected ones of the media servers; and receiving information input by the user specifying an operation to be performed by the selected media server, and a schedule for performing the operation.

21. A machine readable storage device as recited in claim 20 wherein each of the media servers is capable of accessing at least one corresponding memory device for storing media data, and wherein said interface components include a source selection interface component enabling the user to select a source location by browsing a list of available locations including predetermined mapped ones of the media servers and predetermined mapped ones of the memory devices, and wherein if the selected source location is a memory device, then said selected server is a media server corresponding with the selected memory device.

22. A machine readable storage device as recited in claim 19 wherein the network is an internet protocol (IP) network.

23. A machine readable storage device as recited in claim 20 wherein the administrator terminal also includes a processing unit, a browser application executed by the processing unit, and a display unit, and wherein said process is initiated by performing the steps of:

transmitting an applet to the administrator terminal via the network; and executing said applet over the processing unit of the administrator terminal;

whereby said graphical user interface is displayed within a browser window generated by said browser application on the display unit.

24. A machine readable storage device as recited in claim 20 wherein the network further includes a plurality of end user terminals communicatively coupled to the administrator terminal and to the servers, each of the servers being further operative to stream media data to selected ones of the end user terminals, and wherein at least one of the media servers is further operative to encode media data received from a corresponding multimedia device, and wherein said operations include:

multicasting operations for streaming portions of media data from selected ones of the media servers to selected ones of the end user terminals via the network; and encoding operations for encoding media data received by selected ones of the media servers.

25. A machine readable storage device as recited in claim 21 wherein the media operations include copy operations for copying selected portions of media data from selected source locations in the network to selected destination locations in the network, and wherein said steps of displaying a graphical user interface, and receiving information further comprise the steps of:

displaying a source selection interface component enabling the user to select a source location by browsing a list of available locations including predetermined mapped ones of the media servers and predetermined mapped ones of the memory devices;

receiving information input by the user indicative of a selected source location;

displaying an asset selection interface component enabling the user to select a portion of media data from a list of portions of media data stored at said selected source location;

receiving information input by the user indicative of a selected portion of media data;

determining a corresponding list of possible destination locations associated with said selected source location; and displaying a destination selection interface component enabling the user to select a destination location from said corresponding list of possible destination locations.

26. A machine readable storage device as recited in claim 25 wherein said steps of displaying a graphical user interface, receiving information, and generating commands further comprise the steps of:

displaying scheduled copying interface components enabling the user to select a start time and a start date for a scheduled copying operation;

receiving information input by the user indicative of a selected start time and a selected start date; and generating a copy command and associated copy parameters for instructing said selected media server to copy said selected portion of media data from said selected source location to said selected destination location at said selected start time on said selected start date.

27. A machine readable storage device as recited in claim 20 wherein the network further includes at least one multimedia device operative to generate media data, each of the multimedia devices being communicatively coupled with a corresponding specified one of the media servers which is further operative to selectively activate the corresponding multimedia device, and further operative to encode a selected portion of media data generated by the multimedia device, and wherein the operations include encoding operations, and wherein said information input by the user includes encoding operation information indicative of a selected server and a corresponding selected multimedia device, and wherein said commands and associated parameters include an encoding command and associated encoding parameters for instructing said selected server to encode media data received from said selected media device.

28. A machine readable storage device as recited in claim 27 wherein said steps of displaying a graphical user interface, receiving information, and generating commands further comprise the steps of:

displaying scheduled encoding interface components enabling the user to select a start time and a start date for a scheduled encoding operation;

receiving information input by the user indicative of a selected start time and a selected start date for initiating the scheduled encoding operation; and generating encoding commands and associated encoding parameters for instructing said selected media server to encode media data received from said selected multimedia device at said selected start time on said selected start date.

29. A machine readable storage device as recited in claim 28 wherein said steps of displaying scheduled encoding interface components, and receiving information further comprise the steps of:

displaying duration interface components enabling the user to select from time duration specification options including, a first option of selecting a scheduled stop date and stop time for terminating said encoding operation, and a second option of selecting a time duration for which said scheduled encoding operation is to continue following said selected start time on said selected start date; and receiving information input by the user indicative of a selected time duration specification option.

30. A machine readable storage device as recited in claim 29 wherein said operations further include recording operations for recording selected portions of encoded media data that are encoded during an encoding operation, and wherein said steps of displaying a graphical user interface, and receiving information further comprise the steps of:
 displaying a record-to selection interface component enabling the user to select a storage location from a list of available storage locations including predetermined mapped ones of at least one memory device associated with said selected server; and
 receiving information input by the user indicative of the selected storage location;
 wherein said commands and associated parameters further include a record command and associated record parameters for instructing said selected server to store the encoded media data at said selected storage location.

31. A machine readable storage device as recited in claim 30 wherein said operations further include playback operations for streaming the stored portion of encoded media data from said selected server to corresponding selected ones of the end user terminals via the network, and wherein said steps of displaying a graphical user interface, and receiving information further comprise the steps of:
 displaying playback destination selection interface components enabling the user to select at least one of the end user terminals as a destination for streaming said encoded portion of media data;
 receiving information input by the user indicative of at least one selected end user;
 displaying play-back schedule interface components enabling the user to define a play-back schedule; and
 receiving information input by the user indicative of a user defined play-back schedule;
 wherein said commands and associated parameters further instruct said selected server to stream said stored portion of encoded media data to said selected end users via the network in accordance with said play-back schedule.

32. A machine readable storage device as recited in claim 31 wherein said play-back schedule interface components comprise:
 a first group of components enabling the user to select a start time and a start date for said play-back schedule; and
 a second group of components enabling the user to select from a plurality of options for specifying a play-back schedule duration.

33. A machine readable storage device as recited in claim 32 wherein said options for specifying a playback schedule duration comprise:
 a first option of specifying a loop count value for repeating the streaming of said stored portion of media data a number of times equal to the loop count value;
 a second option of specifying a repeat schedule wherein said streaming of said stored portion of media data is repeated until the stored portion of media data is removed from a schedule list; and
 a third option of specifying an interval schedule wherein said streaming of said stored portion of media data is performed in accordance with a user defined schedule.

34. A machine readable storage device as recited in claim 31 wherein said operations further include notification operations associated with corresponding ones of the playback operations, said notification operations for sending notification messages to selected network addresses associated with selected ones of the end user terminals and the administrator terminal.

35. A machine readable storage device as recited in claim 20 wherein said operations further include multicasting operations for streaming selected portions of media data from selected media servers to corresponding selected ones of a plurality of end user terminals via the network, and wherein said steps of displaying a graphical user interface, and receiving information further comprise the steps of:
 displaying multicasting destination selection interface components enabling the user to select at least one of the end user terminals as a destination for multicasting said selected portion of media data in accordance with a user defined multicasting schedule;
 displaying multicasting schedule interface components enabling the user to define a multicasting schedule; and
 receiving information input by the user indicative a user defined multicasting schedule;
 wherein said commands and associated parameters further include a multicasting command and associated multicasting parameters for instructing said selected media server to stream said selected portion of media data to said selected end users via the network in accordance with said multicasting schedule.

36. A machine readable storage device as recited in claim 35 wherein said multicasting schedule interface components comprise:
 a first group of components enabling the user to select a start time and a start date for a multicasting schedule; and
 a second group of components enabling the user to select from a plurality of options for specifying a multicasting schedule duration.

37. A server operative to provide an applet to a client via a network, the applet including encoding instructions for executing a process of managing execution of operations performed on media data by selected ones of a plurality of media servers of a network, the process comprising the steps of:
 at the client, receiving information input by the user specifying a selected one of the media servers for scheduling operations to be performed, wherein said client resides in a first time zone and said selected media server resides in a second time zone, and wherein there is a time difference between said first and second time zones;
 at the client, displaying graphical information indicative of a current local time at said selected media server.

38. A server as recited in claim 37 further comprising the steps of:
 displaying a graphical user interface at the client, the interface including a plurality of interface components enabling a user to specify and schedule operations to be performed by selected ones of the media servers; and
 receiving information input by the user specifying an operation to be performed by the selected media server, and a schedule for performing the operation.

39. A server as recited in claim 38 wherein each of the media servers is capable of accessing at least one corresponding memory device for storing media data, and wherein said interface components include a source selection interface component enabling the user to select a source location by browsing a list of available locations including predetermined mapped ones of the media servers and predetermined mapped ones of the memory devices, and wherein if the selected source location is a memory device, then said selected media server is a media server corresponding with the selected memory device.

40. A server as recited in claim 37 wherein the network is an internet protocol (IP) network.

41. A server as recited in claim 38 wherein the network further includes a plurality of end user terminals communicatively coupled to the client and to the media servers, each of the media servers being further operative to stream media data to selected ones of the end user terminals, and wherein at least one of the media servers is further operative to encode media data received from a corresponding multimedia device, and wherein said operations include:
   multicasting operations for streaming portions of media data from selected ones of the media servers to selected ones of the end user terminals via the network; and
   encoding operations for encoding media data received by selected ones of the media servers.

42. A server as recited in claim 39 wherein the media operations include copy operations for copying selected portions of media data from selected source locations in the network to selected destination locations in the network, and wherein said steps of displaying a graphical user interface, and receiving information further comprise the steps of:
   displaying a source selection interface component enabling the user to select a source location by browsing a list of available locations including predetermined mapped ones of the media servers and predetermined ones of the memory devices;
   receiving information input by the user indicative of a selected source location;
   displaying an asset selection interface component enabling the user to select a portion of media data from a list of portions of media data stored at said selected source location;
   receiving information input by the user indicative of a selected portion of media data;
   determining a corresponding list of possible destination locations associated with said selected source location; and
   displaying a destination selection interface component enabling the user to select a destination location from said corresponding list of possible destination locations.

43. A server as recited in claim 42 wherein said steps of displaying a graphical user interface, receiving information, and generating commands further comprise the steps of:
   displaying scheduled copying interface components enabling the user to select a start time and a start date for a scheduled copying operation;
   receiving information input by the user indicative of a selected start time and a selected start date; and
   generating a copy command and associated copy parameters for instructing said selected media server to copy said selected portion of media data from said selected source location to said selected destination location at said selected start time on said selected start date.

44. A server as recited in claim 38 wherein the network further includes at least one multimedia device operative to generate media data, each of the multimedia devices being communicatively coupled with a corresponding specified one of the media servers which is further operative to selectively activate the corresponding multimedia device, and further operative to encode a selected portion of media data generated by the multimedia device, and wherein the operations include encoding operations, and wherein said information input by the user includes encoding operation information indicative of a selected media server and a corresponding selected multimedia device, and wherein said commands and associated parameters include an encoding command and associated encoding parameters for instructing said selected media server to encode media data received from said selected media device.

45. A server as recited in claim 44 wherein said steps of displaying a graphical user interface, receiving information, and generating commands further comprise the steps of:
   displaying scheduled encoding interface components enabling the user to select a start time and a start date for a scheduled encoding operation;
   receiving information input by the user indicative of a selected start time and a selected start date for initiating the scheduled encoding operation; and
   generating encoding commands and associated encoding parameters for instructing said selected media server to encode media data received from said selected multimedia device at said selected start time on said selected start date.

46. A server as recited in claim 45 wherein said steps of displaying scheduled encoding interface components, and receiving information further comprise the steps of:
   displaying duration interface components enabling the user to select from time duration specification options including,
      a first option of selecting a scheduled stop date and stop time for terminating said encoding operation, and
      a second option of selecting a time duration for which said scheduled encoding operation is to continue following said selected start time on said selected start date; and
   receiving information input by the user indicative of a selected time duration specification option.

47. A server as recited in claim 46 wherein said operations further include recording operations for recording selected portions of encoded media data that are encoded during an encoding operation, and wherein said steps of displaying a graphical user interface, and receiving information further comprise the steps of:
   displaying a record-to selection interface component enabling the user to select a storage location from a list of available storage locations including predetermined mapped ones of at least one memory device associated with said selected media server; and
   receiving information input by the user indicative of the selected storage location;
   wherein said commands and associated parameters further include a record command and associated record parameters for instructing said selected media server to store the encoded media data at said selected storage location.

48. A server as recited in claim 47 wherein said operations further include playback operations for streaming the stored portion of encoded media data from said selected media server to corresponding selected ones of the end user terminals via the network, and wherein said steps of displaying a graphical user interface, and receiving information further comprise the steps of:
   displaying playback destination selection interface components enabling the user to select at least one of the end user terminals as a destination for streaming said encoded portion of media data;
   receiving information input by the user indicative of at least one selected end user;
   displaying play-back schedule interface components enabling the user to define a play-back schedule; and receiving information input by the user indicative of a user defined play-back schedule;

wherein said commands and associated parameters further instruct said selected media server to stream said stored portion of encoded media data to said selected end users via the network in accordance with said play-back schedule.

49. A server as recited in claim 48 wherein said play-back schedule interface components comprise:

a first group of components enabling the user to select a start time and a start date for said play-back schedule; and a second group of components enabling the user to select from a plurality of options for specifying a play-back schedule duration.

50. A server as recited in claim 49 wherein said options for specifying a playback schedule duration comprise:

a first option of specifying a loop count value for repeating the streaming of said stored portion of media data a number of times equal to the loop count value;

a second option of specifying a repeat schedule wherein said streaming of said stored portion of media data is repeated until the stored portion of media data is removed from a schedule list; and a third option of specifying an interval schedule wherein said streaming of said stored portion of media data is performed in accordance with a user defined schedule.

51. A server as recited in claim 48 wherein said operations further include notification operations associated with corresponding ones of the playback operations, said notification operations for sending notification messages to selected network addresses associated with selected ones of the end user terminals and the client.

52. A server as recited in claim 38 wherein said operations further include multicasting operations for streaming selected portions of media data from selected media servers to corresponding selected ones of a plurality of end user terminals via the network, and wherein said steps of displaying a graphical user interface, and receiving information further comprise the steps of:

displaying multicasting destination selection interface components enabling the user to select at least one of the end user terminals as a destination for multicasting said selected portion of media data in accordance with a user defined multicasting schedule;

displaying multicasting schedule interface components enabling the user to define a multicasting schedule; and receiving information input by the user indicative a user defined multicasting schedule;

wherein said commands and associated parameters further include a multicasting command and associated multicasting parameters for instructing said selected media server to stream said selected portion of media data to said selected end users via the network in accordance with said multicasting schedule.

53. A server as recited in claim 52 wherein said multicasting schedule interface components comprise:

a first group of components enabling the user to select a start time and a start date for a multicasting schedule; and a second group of components enabling the user to select from a plurality of options for specifying a multicasting schedule duration.

* * * * *